US012370393B2

(12) United States Patent
Wagner

(10) Patent No.: US 12,370,393 B2
(45) Date of Patent: Jul. 29, 2025

(54) SYSTEM AND METHODS FOR AUTONOMOUS CONTINUOUS MONITORING, CHARACTERIZING, DETECTING, EVALUATING, SELECTING, AND RESPONDING TO BOTH IMPENDING AND EXISTING FIRE EVENTS

(71) Applicant: Critical Communications, Controls and Instruments, LLC, Exeter, NH (US)

(72) Inventor: Charles Joseph Wagner, Stratham, NH (US)

( * ) Notice: Subject to any disclaimer, the term of this patent is extended or adjusted under 35 U.S.C. 154(b) by 0 days.

(21) Appl. No.: 18/985,409

(22) Filed: Dec. 18, 2024

(65) Prior Publication Data

US 2025/0186821 A1 Jun. 12, 2025

Related U.S. Application Data

(62) Division of application No. 18/409,314, filed on Jan. 10, 2024.

(60) Provisional application No. 63/438,526, filed on Jan. 11, 2023.

(51) Int. Cl.
*A62C 35/11* (2006.01)
*A62C 37/36* (2006.01)

(52) U.S. Cl.
CPC .............. *A62C 35/11* (2013.01); *A62C 37/36* (2013.01)

(58) Field of Classification Search
CPC ................................ A62C 35/11; A62C 37/36
See application file for complete search history.

(56) References Cited

U.S. PATENT DOCUMENTS

| | | | | | |
|---|---|---|---|---|---|
| 4,566,542 | A * | 1/1986 | Enk | A62C 3/08 | 169/62 |
| 7,861,947 | B1 * | 1/2011 | Watson, Sr. | B05B 15/74 | 239/281 |
| 8,678,101 | B2 * | 3/2014 | Gatsonides | A62C 99/0018 | 169/61 |
| 2004/0129434 | A1 * | 7/2004 | Tan | A62C 37/40 | 239/69 |
| 2007/0044979 | A1 * | 3/2007 | Popp | G01J 5/0014 | 169/56 |
| 2011/0048747 | A1 * | 3/2011 | Gastonides | A62C 35/02 | 169/66 |
| 2012/0012346 | A1 * | 1/2012 | Chattaway | A62C 99/0018 | 169/43 |
| 2012/0217028 | A1 * | 8/2012 | Chattaway | A62C 99/0018 | 169/62 |
| 2016/0030784 | A1 * | 2/2016 | Tsutaki | A62C 3/0292 | 169/61 |
| 2016/0263410 | A1 * | 9/2016 | Enk, Sr. | A62C 99/0036 | |
| 2017/0014656 | A1 * | 1/2017 | Smith | B64C 19/00 | |

(Continued)

*Primary Examiner* — Joseph A Greenlund

(74) *Attorney, Agent, or Firm* — Patent Negotiator, PLLC; Sarita L. Pickett

(57) ABSTRACT

The present invention generally provides systems and methods for autonomous space characterization, data analysis, anomaly detection, hazard probability assessment, and profile deviance assessment and incident response action, and firefighting employing robotically controlled firefighting equipment, autonomous selection and release of firefighting agent, and the autonomous prediction, detection, classification, and location of existing and impending threats and fire events.

5 Claims, 36 Drawing Sheets

(56) References Cited

U.S. PATENT DOCUMENTS

| | | | | |
|---|---|---|---|---|
| 2019/0099631 | A1* | 4/2019 | Hart | A62C 31/28 |
| 2019/0388832 | A1* | 12/2019 | Rheaume | A62C 99/0018 |
| 2020/0094089 | A1* | 3/2020 | Hagge | A62C 5/00 |
| 2020/0147426 | A1* | 5/2020 | Atkinson | H02J 7/0042 |
| 2021/0069538 | A1* | 3/2021 | Magnone | A62C 31/24 |
| 2021/0228926 | A1* | 7/2021 | Hofmann | A62C 37/04 |
| 2021/0322806 | A1* | 10/2021 | Fernandez-Orellana | G08B 17/10 |
| 2021/0322810 | A1* | 10/2021 | Diaz | A62C 37/38 |
| 2022/0016458 | A1* | 1/2022 | Macaraeg | A62C 35/68 |
| 2022/0161083 | A1* | 5/2022 | Bolz-Mendel | A62C 37/40 |
| 2022/0280824 | A1* | 9/2022 | Muhammad | A62C 37/44 |
| 2022/0407174 | A1* | 12/2022 | Sandahl | H01M 50/249 |
| 2023/0233890 | A1* | 7/2023 | Chandler | A62C 35/02<br>340/525 |
| 2024/0226621 | A1* | 7/2024 | Kim | H01M 50/24 |
| 2024/0226625 | A1* | 7/2024 | Wagner | A62C 35/11 |
| 2024/0342528 | A1* | 10/2024 | Wu | A62C 37/36 |

* cited by examiner

SYSTEM AND METHODS FOR AUTONOMOUS CONTINUOUS MONITORING, CHARACTERIZING, DETECTING, EVALUATING, SELECTING, AND RESPONDING TO BOTH IMPENDING AND EXISTING FIRE EVENTS

BACKGROUND OF THE INVENTION

1. Field of the Invention

The present invention relates generally to the field of detecting a fire event. More specifically, the present invention relates to response options during a fire event.

2. Description of the Prior Art

The application of monitoring equipment to detect anomalous or dangers activity, and the application of robotically controlled nozzles to provide fire-fighting capabilities is well documented in large systems such as buildings, fire trucks, and fire boats. In these systems the interpretation of the monitored activity and control of the response actions such as the use of robotic firefighting nozzles is provided by personnel operators who detect and locate the fire, and manually direct the stream of the firefighting agent, which is normally water, to the location of the fire, for the purpose of extinguishing it.

The standard methodologies of providing space monitoring and firefighting protection to a space prior to the arrival of the fire department, is through either, generally, personalized manual systems, or automated untargeted systems. For example, a personalized manual system may have the use of special purpose sensors to detect a fire event, cameras for providing visual information to an operator, and the manual employment of portable fire-fighting agents in a bottle by an operator.

Alternatively, automated systems may have the use of automatically triggered fixed systems providing water, foam, CO2, powder, water mist and wet chemical agents. These systems act by cooling, smothering, starving, or interrupting the combustion process to extinguish the fire. Fixed firefighting systems are typically comprised of large reservoirs of fire-fighting agent, a delivery system comprised of pipes, nozzles, pumps, and/or pressurized bottles, and an activation system that detects and releases the fire-fighting agent.

SUMMARY OF THE INVENTION

The present invention is similar to the prior art systems in that it is a system that is designed to be reactionary to the detection of an actual fire event. However, the present invention seeks to overcome the disadvantages of the fixed systems which are intended to protect an overall space and operation from the damage of a fire but result in a certain level of consequential damage themselves. For example, the application of large amounts of water, chemical, or foam agents into a space can irreversibly damage electronic equipment, paper supplies, and food inventories, and in general, anything stored in that space.

Table 1 provides an amended listing of fixed firefighting systems from the International Journal of Information Technology ISSN (2413-2950) Volume 1, 12 Dec. 2019 (amended by inventor with noted potential collateral damage sought to be overcome by the present invention).

TABLE 1

| Firefighting System Classification | Standards | System Description | Firefighting agent | Potential Collateral Damage |
|---|---|---|---|---|
| Sprinkler System | BS 9251, BAFSA TGNI BS EN 21045 OSHA 29 CFR 1910.160(a)(1) OSHA 29 CFR 1910.160(a)(2) | Sprinkler systems for residential and domestic occupancy For fixed systems with no risk to employees: 1910.160(a)(1) For fixed system with risk to employees: 1910.160(a)(2) | Water | Space deluge damages electronics, and various inventories including electronics, food, paper products, packaged goods, etc. |
| Water Mist System | DD 8458-1 DD 8489-4 DD 8489-5 DD 8489-6 DD 8489-7 NFPA 750 | Residential and domestic water mist systems, applications for liquid fires, combustion turbines, industrial oil cookers, and machinery spaces. Standard on Water Mist Fire Protection Systems | Water | Space deluge damages electronics, and various inventories including electronics, food, paper products, packaged goods, etc. |
| CO2 | BS 5306-4 NFPA 12 | Standard on Carbon Dioxide Extinguishing Systems | Gas | Minimal Damage, but does not provide good response to oil fires, battery fires. |
| Inert Gas | BS EN 15004-1 | Gas Extinguishing firefighting Systems | Gas | Potentially lethal to personnel in the space |
| Halocarbon Gas | BS EN 15004-1 NFPA 12A | Standard on Halon 1301 Fire Extinguishing Systems | Gas | Potentially lethal to personnel in the space |
| Powder | BS EN 12416-2 NFPA 17 | Standard for Dry Chemical Extinguishing System | Chemical | Severe damage to electronics |

TABLE 1-continued

| Firefighting System Classification | Standards | System Description | Firefighting agent | Potential Collateral Damage |
|---|---|---|---|---|
| Foam | BS EN 12565-2 NFPA 17A | Standard for Wet Chemical Extinguishing System | Chemical | Damages electronics, and various inventories including electronics, food, paper products, packaged goods, etc. |
| Aerosol | PD CEN/TR A5276-1 | Condensed Aerosol extinguishing systems | Chemical | Damages electronics, and various inventories including electronics, food, paper products, packaged goods, etc. |
| Kitchen Protection | LPS 1223 | Fixed Firefighting systems for catering equipment | Water or Chemical | Damages electronics, and various inventories including electronics, food, paper products, packaged goods, etc. |
| Permanent Displacement | PAS 95 | Hypoxic air fire prevention systems | O2 displacement by Nitrogen | Potentially lethal to personnel in space |

The same is true for other fire suppressing chemical agents as these systems are an essential fire safety tool, protecting the loss of property that results from a fire—but in the prior art usage there is no provision to prevent the loss of property that results from indiscriminate deployment of the agents themselves. Other approaches to evaluative threat prediction, detection, and response include the autonomous deployment of threat reduction actions and agents, including, but not limited to closure of doors, securing of fuel supplies, reduction of air flows, deployment of selected suppression agents, etc.

The present invention relates generally to equipping spaces with sensor packages, computational resources, and threat response equipment including firefighting extinguisher equipment, comprised of but not limited to firefighting agent bottles with controlled valves, robotic nozzle assemblies, communication capability, and sensor electronics that are able to predict, detect, classify and localize an emergent threat, including but not limited to an emergent/impending or actual fire event, and through the use of a suite of autonomously controlled equipment including but not limited to robotic nozzle positioning mechanisms, fire agent valves, firefighting agents, fire preventive agents, targeting software and control mechanisms, and related equipment control systems, autonomously predict, and respond to an impending or existing threat with the engagement and disbursement of a selected threat response agent, including but not limited to fire-fighting agent(s) onto a fire to extinguish it, or a preventive agent onto an enabling event, such as a fuel spill, oil spill, or other unintended flammable agent dispersant, to prevent the enabling event from developing into a more serious threat. The invention includes sophisticated software such as machine learning software to characterize normal space activity to be used to detect anomalous activity, and artificial intelligence software, to assess probability outcomes stemming from sensed space activities and provide and/or determine appropriate responses. It includes multiple communication capabilities to notify a receiver of detected anomalous activity in a space, provision of recommended response activities, and the activation of preventive measures, including the engagement of the automatic fire-fighting activity.

In all the circumstances of the prior art that the present invention seeks to overcome, the methodology for the detection and identification of anomalous activity in a space has been solely performed by the employment of sensors, including cameras, either actively monitored by an operator, or that trigger an operator intervention through the use of alarming. In most cases the identification of a fire and the activation of the fire-fighting response has been the triggering of an installed fixed fire suppression system via passive methods following the detection of an actual fire, or the sounding of an alarm following the detection and classification of a threat. Examples of these fire response methods are the increase in the temperature on a sprinkler head that causes a liquid in a glass bowl to shatter, and in doing so, to release the water into a space, in a wet system, or nitrogen in a dry system that then fills with water and sprinkles the area.

Other systems use a detector separate from the sprinkler head, that then causes the piping to the sprinkler head to fill with water and sprinkle the affected space. Other more integrated systems combine space sprinkling systems with dry chemical space suppression technologies, or clean agent extinguishing systems. Clean agent systems are designed to remove either the heat, the fuel source, or the oxygen from a fire. The most common agents for this purpose are inert gases, such as nitrogen, argon, or carbon dioxide, which remove the oxygen from the location of the fire; or FM-200 which is a gas that employs heat absorption to remove the heat element of a fire, or agents such as 3M Novec 1230, that is often used to suppress a fire with a colorless, non-toxic fluid that does not damage sensitive electronic equipment.

Each agent employed has advantages and disadvantages. The most general disadvantage is the application method utilized, which is typically the employment of a whole space flooding approach to extinguishing the fire. More specific disadvantages are related to the tendency to apply a single agent to an entire space, combined with other items such as dissipation time for some gaseous agents, oxygen displacement hazards to personnel from inert gas agents, and the incompatibility between agents.

Therefore, an apparatus and method according to the present invention, of pre-emptively detecting an anomalous activity, and specifically activities or events that lead to an active fire event, including a means of conducting pre-emptive deterrence, and active threat response, specifically for fire events, is needed. In the case of a fire event, the active threat response required is able to specifically target the exact location and cause of a fire, classify the type of fire, and respond with the most advantageous extinguishing agent that minimizes the amount of collateral damage to equipment and materials in the area of the fire, notify an operator, and take pre-emptive actions to limit the spread or growth of the fire, until additional response activities can be brought to bear.

Accordingly, it is an objective of the present invention to provide a system and methods for autonomous space monitoring, characterization, and situational evaluation, specifically directed to pre-emptive and event driven autonomous therapies including firefighting activities utilizing robotically controlled firefighting equipment, sensor packages, autonomous selection and release of firefighting agent, and the autonomous detection, classification, and location of existing and impending fire events and other threat events.

It is also an objective of the present invention to provide a means of monitoring and characterizing a space utilizing technologies such as machine learning to provide a foundational basis for normal space conditions, to be used in anomaly detection.

It is an objective of the present invention to provide a means of predicting the probability of a fire event, or other damaging event occurring, or a threat escalation, within a time frame that provides for the ability to provide corrective response leading to the prevention of the event.

It is an objective of the present invention to provide for a firefighting response that is able to provide immediate response in the event of a fire event detection, and to provide an immediate response in the event of a likely fire event prediction prior to an actual fire event.

It is an objective of the present invention to provide a fire-fighting capability that is able to detect an impending fire event, to detect an existing fire event, to classify the type of fire event whether impending or actual, and to apply the proper type of firefighting agent to the pending or existing fire event, and to guide and manage the deployment of the firefighting agent to the fire target location to contain, or eliminate the fire event.

It is an objective of the present invention to locate the fire, or threat in 3-D space.

It is an objective of the present invention to employ threat prediction, evaluation, assessment, and incident response actions, and probabilities of success employing those actions utilizing advanced software programs such as artificial intelligence methodologies, and to report those predictions, evaluations, assessments and incident response actions with probabilities of success to a supervisory system and or operator.

It is an objective of the present invention to provide a fire prediction, detection, classification, and firefighting system that consists of sensor modules located in various spaces, one or more fire agent bottles equipped with a processor, sensor package, and a robotically controlled nozzle and valve arrangement in various spaces, one or more remote operator interface and monitoring stations, and communication links from all sensor modules to remote monitoring stations.

It is an object of the present invention to know the pressures of the firefighting agents left in the storage reservoir to make adjustments as nozzle pressure decreases to maintain firefighting agent stream delivered to the location of the fire event.

It is another object of the present invention to provide a communication link to notify a fire department or other responding agent of the activation of the fire-fighting response, with detailed information on the type of agent selected, the classification of the type of fire, the time of activation, the current status of the fire, and any other information on the character of the fire as determined by the sensor package.

It is another object of the present invention to provide a robotic nozzle that is able to pan 0-350 degrees from the horizontal, and tilt 0-90 degrees in the vertical.

It is another object of the present invention to provide a means for the automatic and independent selection of one or more fire-fighting bottles, and agent types for application to the fire from the robotic nozzle.

It is another object of the present invention to provide a means for independently selecting from one or more robotic nozzles for the application of fire-fighting agents.

It is another object of the present invention to provide a means for opening and closing the valving for a specific firefighting agent bottle.

It is another object of the present invention to provide for the firefighting system to be a self-contained, carry-on system that is able to integrate into a larger fire-fighting system.

It is another object of the present invention to provide for the firefighting system to be able to provide firefighting capability into spaces and conditions where other firefighting systems are off-line, or not functioning.

It is another object of the present invention to characterize a space employing software tools such as machine learning (ML) as well as other sophisticated software techniques.

It is another object of the present invention to employ decision making algorithms that employ artificial intelligence (AI) methodologies as well as other sophisticated software techniques.

The present invention achieves these objectives and goals by providing an autonomous continuous fire-fighting system for monitoring and reacting to events within a designated space. This designated space often has precious cargo, a pre-existing system, and a designated reporting authority. The autonomous continuous fire-fighting system of the present invention has an agent delivery assembly connected to the control module. The agent delivery assembly has a nozzle module. The nozzle module has a nozzle, and a nozzle positioning assembly capable of moving and adjusting a position of the nozzle. A firefighting agent module has an agent bottle with an amount of a firefighting agent. The nozzle module also has an agent valve capable of releasably securing the agent bottle thereby controlling a flow of the firefighting agent from the agent bottle. The firefighting agent module also has a control cable assembly capable of providing commands to the agent valve thereby activating or deactivating the firefighting agent valve on command.

The nozzle module also has a firefighting agent bottle pressure sensor capable of determining an agent capacity value of the amount of the agent in the firefighting agent bottle. The system has a control module connected to the agent delivery assembly. The agent deliver assembly has an agent valve control module which is capable of providing instructions for controlling the agent valve. A sensor assembly which is capable of providing sensor data regarding the space. A communication interface is capable of providing messages to the designated reporting authority.

A processor module is capable of interpreting the sensor data, selecting the firefighting agent bottle, deselecting the firefighting agent bottle as it determines is appropriate, and constructing the messages from the sensor data to send to the designated authority. The system may also have a nozzle module which has a nozzle positioning assembly capable of moving and adjusting the position of the nozzle. In these embodiments, the system also has a control module with a telerobotic position control module capable of providing instructions for changing the position of the nozzle.

The nozzle position positioning assembly may have a pan assembly capable of moving and adjusting a position of the nozzle on a horizontal axis, and a tilt assembly capable of moving and adjusting a position of the nozzle on a vertical axis. In these embodiments, the telerobotic position control module is capable of providing instructions for changing the position of the nozzle along both a horizontal and vertical axis.

In one portable embodiment, the control module of the system is directly connected to the agent delivery assembly having a single housing, the firefighting agent module is the sole firefighting agent module; and the control module has an uninterruptible power supply battery.

In one embodiment of the autonomous continuous fire-fighting system, there is a first control module and a second control module. The system has a control cable assembly which connects the first control module, the second control module, and the agent delivery assembly.

In one embodiment, the autonomous continuous fire-fighting system has multiple subsystems, each with their own respective agent delivery assemblies and control modules. These systems can be installed and integrated in a large, designated space which has a pre-existing system. In these embodiments, the autonomous continuous fire-fighting system usually has a supervisory computer and operator interface connected to each of the pre-existing system and the subsystems. This facilitates the supervisory computer and operator interface with coordinating operations of each of the pre-existing system and the new subsystems. It also allows the system to provide communications regarding each of the pre-existing system and the new subsystems to the designated reporting authority, such as an operator.

A further embodiment of the invention is an autonomous continuous fire-fighting system for monitoring and reacting to threat events within a designated space, the designated space having precious cargo and a designated reporting authority. This autonomous continuous fire-fighting system has an agent delivery assembly with a nozzle module having a nozzle. The system has a firefighting agent module having an agent bottle having an amount of a firefighting agent. An agent valve capable of releasably securing the agent bottle thereby controlling a flow of the firefighting agent from the agent bottle; a first sensor capable of gathering a first set of sensor data about the space in relationship to the agent delivery assembly; and a firefighting agent bottle pressure sensor capable of detecting an agent capacity value of the amount of the agent in the firefighting agent bottle.

The system has a control module connected to the agent delivery assembly. The control module has an agent valve control module capable of providing instructions for controlling the agent valve. A sensor assembly has at least a second sensor capable of gathering a second set of sensor data, and a third sensor capable of gathering a third set of sensor data regarding the space. A processor module is capable of interpreting the first set of sensor data, the second set of sensor data, and the third set of sensor data; selecting the firefighting agent bottle depending upon a first set of conditions; and deselecting the firefighting agent bottle depending upon a second set of conditions.

In one embodiment, the first sensor is one of a camera and a range determination sensor; and the second and the third sensors are each one of a group of sensors consisting of a further camera, a further range determination sensor, a flame sensor, a thermal sensor, a combustible gas sensor, a photoelectric sensor, an ionization smoke sensor, an infrared spectrum sensor, an optical sensor, an image sensor, and a pressure sensor.

The present invention also includes a method for autonomously and continuously monitoring and responding to an event within a space, the space having items and firefighting equipment including a first and a second agent delivery assembly, and a control module with a sensor assembly. The method includes the steps of characterizing the space by creating a space characterization profile; monitoring the space with the sensor assembly, and collecting new sensor data from the sensor assembly for the space; assessing the new sensor data provided by the sensor assembly; determining that the event is one of a threat event or a nonthreat event; initiating preventative action when the event is determined to be the threat event; locating the threat event using the new sensor data; classifying the existing fire event using the new sensor data; selecting one of the first agent delivery assembly and the second agent delivery assembly based on an assessment of the space characterization profile, a first location of the first agent delivery assembly, a second location of the second agent delivery assembly, and the classification of the existing fire event; receiving further data from sensor assembly; assessing the further data from the sensor assembly to determine whether the threat event has concluded; initiating further preventative action if the threat event is determined to be ongoing; and discontinuing preventative action if the threat event is determined to be concluded.

Characterizing the space may further involve the steps of: obtaining an item data set containing data regarding the sensitivity of items, and the potential threat of items within the space; populating an item database with the item data set; obtaining a firefighting equipment data set containing data regarding the firefighting equipment within the space; populating a firefighting equipment database with the firefighting equipment data set; obtaining a variable data set containing data regarding variables within the space which alter according to a time of day and an operational tempo; populating a variable database with the variable data set; obtaining a tolerance data set containing data of predetermined tolerance levels; populating a tolerance level database with predetermined tolerance levels; and creating the standard space characterization profile from each of the item database, the firefighting equipment database, the variable database, and the tolerance database.

The steps of assessing the new sensor data, and initiating preventative action, may further involve: assessing the new sensor data provided by the sensor assembly by comparing the space characterization profile with the new sensor data; comparing a degree of difference between the space characterization profile and the new sensor data with the predetermined tolerance level; and initiating preventative action if the degree of difference is greater than the predetermined tolerance level.

The step of assessing the new sensor data may further include: continuously analyzing the data by evaluating the data received to detect deviance from the space characterization profile; continually providing a probability of a hazardous activity based on the space characterization profile; continuously providing a hazard probability assessment by evaluating the potential deviance between the new sensor data from the space characterization profile with respect to the probability of that hazardous activity; and providing an assessment of a preferred incident response action by determining the best courses of response for any deviance detected.

The step of locating the threat event may further include comparing the location of the existing fire event with a first location of the first agent delivery assembly and a second location of the second agent delivery assembly.

DETAILED DESCRIPTION OF THE PREFERRED EMBODIMENT

The preferred embodiments of the present invention are illustrated in FIGS. 1-30. The present invention generally provides systems and methods for autonomous space characterization, data analysis, anomaly detection, hazard probability assessment, and profile deviance assessment and incident response action subprocess, and firefighting employing robotically controlled firefighting equipment, autonomous selection and release of firefighting agent, and the autonomous prediction, detection, classification, and location of existing and impending threats and fire events, and the assessment of the efficacy of the firefighting action to the fire threat. FIGS. 1-6*d* illustrate various systems according to the present invention, and FIGS. 7-30 illustrate the methods and processes according to the present inventive methods.

Figure 1:
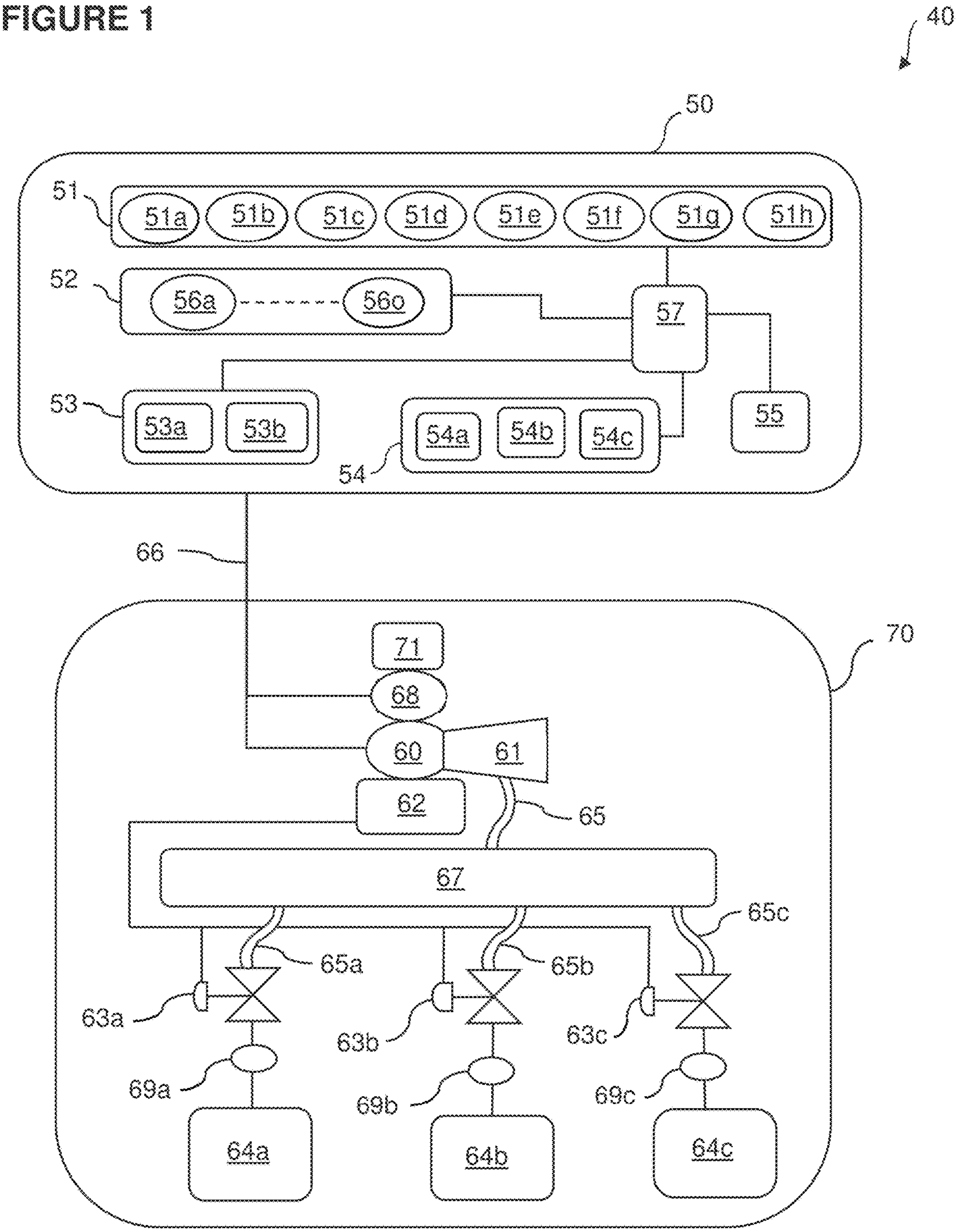
FIG. 1 is a block diagram of one embodiment of the present invention.

FIG. 1—Autonomous Inclusive System

FIG. 1 is a block diagram of one embodiment of the present inventive autonomous firefighting system 40, also known as the Firefighting Intelligent Robotic Equipment And Space Security Evaluative Ship System (FIRE-ASSESS)™. The system 40 includes a control module 50, and an agent delivery assembly 70. The control module 50 is also known as the Fire Control Module (FCM)™. The agent delivery assembly 70 is also known as the Tele-Robotic Fire Nozzle Agent Delivery Assembly (TFN-ADA)™.

Together this module and assembly make up the automated firefighting system 40 that provide the ability to perform space characterization, data analysis, anomaly detection, hazard probability assessment, profile deviance assessment, and incident response action, and autonomously predict, detect, classify, and respond to a threat including a fire or incipient fire event; and provide threat and fire type classification, and threat and fire-fighting status information to a supervisory system.

Note that while the system is designed to operate fully-automatically, the system includes the ability to be manually operated in all modes of operation if circumstances warrant operator intervention.

Control Module 50

The control module 50 contains a sensor assembly 51, a processor module 52, a telerobotic position control module 53, an agent valve control module 54, a communication interface module 55, and an uninterruptible power supply battery 57. These are each discussed in greater detail below.

Sensor Assembly 51

The sensor assembly 51 includes several sensor items, or any combination of sensors, including, but not limited to a flame sensor 51*a*, a thermal sensor 51*b*, combustible gas sensor 51*c*, photoelectric and/or ionization smoke sensor 51*d*, infrared spectrum or optical sensor 51*e*, image sensor/camera 51*f*, firefighting agent reservoir pressure sensor 51*g*, and a range sensor 51*h*.

The sensors included in the sensor assembly 51 are used to perform a number of functions, including, but not limited to:

a. Provide data to the processor assembly 52 b. Early detection of a fire, including the onset of a potential fire c. Location of a fire in a designated space d. Identification of the type of fire e. Provision of visual images of the fire f. Receiving fire agent pressure measurements.

The tasks performed by these sensors included in the sensor assembly 51 include, but are not limited to:

a. Flame detection b. Temperature measurement c. Combustible gas detection d. Smoke detection e. Infrared spectrum capture f. Image capture g. Firefighting agent reservoir pressure measurement h. Range measurement Essentially, the fire control module 50, contains a sensor assembly 51 that provides the sensory data required by the processor module 52, to perform program processing of algorithms 56*a*, 56*b*, 56*c*, 56*d*, 56*e*, 56*f*, 56*g*, 56*h*, 56*i*, 56*j*, 56*k*, 56*l*, 56*m*, 56*n*, 56*o* consisting of first characterizing the space, and subsequently identifying and assessing the risk potential of anomalous events, and subsequently to predict, detect, classify, and locate a threat and fire event in 3-d space, then to actively respond to the threat and fire event with the application of therapies, including firefighting agent to the location of a fire event, provide threat and fire event alert information to a supervisory system, and subsequently to evaluate the results of the active response efforts, and then, modify and control the active response as necessary as a function of the evaluation.

In the embodiment shown here, these sensors are portrayed as separate entities for ease of reference and clarity. However, in some embodiments, a single device acts as multiple sensors, performing the operation of more than one sensor. In some embodiments, video image data mining is employed for sensor data collection along with other sensors. A combination of video image mining and alternative sensor data collection is employed in yet other embodiments.

Processor Module 52

The processor module 52, interfaces to the sensor assembly 51, to the telerobotic position control module 53, the fire agent valve control module 54, and to the communication interface module 55.

The processor module 52 contains embedded software/firmware programs, 52*a*, that contain the machine learning and similar space characterization software, the artificial intelligence and similar decision-making subprocesses, which are facilitated by various algorithms, to analyze the information received from the sensor assembly 51, to predict, detect, localize, and determine the size, and type of fire or hazard 5, 6, 7, 8.

The processor module 52 also contains the control programs to position the pan and tilt drivers in the telerobotic position control module 53, to position the nozzle to the proper attitude necessary to place the fire agent onto the fire. It contains the control programs to open and close the valves using the agent valve control module 54, for the selection of the proper fire agent, and to open and close the valves on the fire agent bottles 64, in the fire-fighting activity.

In some embodiments, the processor module 52 also contains the messaging programs to the communication interface module 55, to report on the type, location, size, and status of the fire and the fire-fighting effort to a remote operator. It also contains the messaging programs to the communication interface module 55, to coordinate the synchronous operation of other telerobotic firefighting systems 20, in the fire-fighting effort, and to share information with other telerobotic firefighting systems 20 that may be useful in the fire-fighting effort (see for example, FIG. 6).

The processor module 52 is loaded with a series of proprietary software algorithms 56*a*, 56*b*, 56*c*, 56*d*, 56*e*, 56*f*, 56*g*, 56*h*, 56*i*, 56*j*, 56*k*, 56*l*, 56*m*, 56*n*, 56*o*. Specifically, these algorithms include:

Software algorithm 56*a*: threat and fire detection algorithm

Software algorithm 56*b*: threat and fire classification algorithm

Software algorithm 56*c*: threat and fire location algorithm

Software algorithm 56*d*: agent selection algorithm
Software algorithm 56*e*: agent valve controller algorithm
Software algorithm 56*f*: nozzle position controller algorithm
Software algorithm 56*g*: agent range and targeting algorithm
Software algorithm 56*h*: agent delivery assessment algorithm
Software algorithm 56*i*: success evaluation algorithm
Software algorithm 56*j*: space characterization algorithm
Software algorithm 56*k*: data analysis, anomaly detection, hazard probability assessment, and profile deviance assessment and incident response action algorithm
Software algorithm 56*l*: communication algorithm
Software algorithm 56*m*: manual control algorithm
Software algorithm 56*n*: fire prediction algorithm
Software algorithm 56*o*: reserve agent capacity algorithm While different embodiments may employ a different number of sensors, regardless of the number of sensors employed, the processor module 52 receives the data from the sensors, and performs all the computational algorithms as necessary to:

A) provide early detection of the onset of a fire,
B) detect an actual fire,
C) characterize the type of fire,
D) locate the fire in 3-d space,
E) monitor the status and or progression of the fire,
F) record images of the space and the fire,
G) provide the targeting function for the telerobotic fire-fighting nozzle,
H) select the correct fire-fighting agent to be applied to the fire,
I) control the release of the fire-fighting agent to the nozzle,
J) evaluate the effectiveness of the application of the firefighting agent,
K) re-adjust the nozzle position and attitude as necessary, or re-adjust the selection of fire-fighting agent as the case may indicate,
L) provide status on the fire to the communication module for the information and use of an operator or a supervisory system,
M) characterize the space, and
N) perform decision making on the threat level of the space and the recommended actions to reduce the threat level in the space if warranted.

As otherwise stated, the processor module 52 performs the following operations:

a. Receives data from all sensors in the space to characterize the space for various operating profiles. For each type of data, characterization includes characterizing (or determining) the normal operating profile for that type of data. For example, characterizing normal temperatures and signatures at specific locations in the space, including, but not limited to, time phased changes, and levels of condition detection, and other signature variations.
b. Receives data from the flame detection sensor 51*a* and continuously monitors the received flame detection sensor data, comparing that to the normal character data to detect the onset of a fire.
c. Receives continuous temperature data from the temperature sensor 51*b*, stores the data, and continuously analyzes the temperature data with respect to temperature levels and rate of change against probability models to predict the onset or detect the presence of a fire.
d. Receives data from the smoke detection sensor 51*d* and continuously monitors the received data to detect the presence of smoke indicating the onset of, or presence of, a fire.
e. Receives data from the infrared sensor 51*e*, and continuously monitors the received data to predict or detect the onset of a fire, and to characterize the type of fire.
f. Receives data from the cameras 51*f*, identifies the existence of a fire, and determines the location of the fire in 3-d space. Data received from the cameras may additionally be used to detect a flame 0047*b*, detect space temperature data 0047*c*, detect smoke data 0047*d*, detect infrared information 0047*e*, detect a fire 046*b*, characterize the fire 046*c*, locate the fire in 3d space 046*d*, record images of the space and fire 046*f*, and characterize the space 046*m*.
g. Receives pressure data from the pressure sensors 51*g* to continuously evaluate the pressure of the firefighting agent bottles, and to report on a) readiness to fight a fire when in standby mode, and b) available pressure to the firefighting nozzle 61 as the firefighting activity proceeds.
h. Receives range information from the range sensor 51*h*, or from the camera 51*f*, to determine the precise location of the fire event or other threat in the designated space.
i. Outputs multiple commands via the tele-robotic position control module 53 to the nozzle tilt assembly 60 and the nozzle pan assembly 62, to position the firefighting nozzle 61 to place firefighting agent on target.
j. Outputs multiple commands via the agent valve control module 54, to open and close the firefighting agent valves 63*a*, 63*b*, 63*c*, and to control the flow of firefighting agent to the firefighting nozzle 61, via the manifold 67, and the firefighting agent hose assemblies 65.
k. Performs data analysis, anomaly detection, hazard probability assessment, and profile deviance assessment for various space operational profile characterizations, and decision analysis on the monitored information to determine best incident response action.

In summary then, the control module 52 receives continuous data from the sensor assembly 51, to assess the progress of the threat response action. In addition, the control module 52 provides continuous control commands to the telerobotic position control module 53, and the valve control module 54, to continue the threat response assessment and action to a successful conclusion. The processor module 52 also provides status and activity information to the communication module 55 for uploading to a supervisory computer system 80. Finally, the control module 52 also receives command information from a supervisory system 80 via the communication module 55, for manual operation of the system 40, as may be required.

Telerobotic Position Control Module 53

The telerobotic position control module 53 is employed by the processor module 52 to drive the pan assembly 62 and the tilt (or azimuth) assembly 60 to properly position the nozzle 61, in the performance of the threat response to a threat, fire, or pre-threat or pre-fire event 5, 6, 7, 8.

Uninterruptible Power Supply Battery 57

The control module 50 is generally powered from local power. However, the control module 50 is also provided with an uninterruptible power supply 57 (such as a battery) which can provide emergency power in the case of an interruption of normal local power.

Valve Control Module 54

The valve control module 54, is utilized by the processor module 52 to select, open, and close the agent control valves 63*a*, 63*b*, 63*c*. In this manner, the processor module 52 can selectively control the release of a selected agent from a respective one of a series of firefighting agent bottles 64*a*, 64*b*, 64*c*. After selecting the selected agent, a respective one of the agent control valves 63*a*, 63*b*, 63*c* is opened so that the selected agent can travel via the appropriate hose 65 to the nozzle 61. A respective one of the agent sensors 69*a*, 69*b*, 69*c* is then instructed to provide agent reservoir pressure information, so that the valve control module 54 can evaluate the amount of selected response agent available.

If the remaining amount of selected response agent becomes insufficient to meet the remaining needs, a different agent may then be selected. The valve control module may in this way modify the selected agent as necessary to maintain agent on the threat or fire location. When the selected response agent is no longer needed or desired, the valve control module will then give instructions to close that selected valve.

Command and Control Cable Assembly 66

A control cable assembly 66 connects the control module 50 to the delivery assembly 70. Specifically, in the embodiment illustrated in FIG. 1, the delivery assembly 70 receives commands from the control module 50 via the command-and-control cable assembly 66. These commands include how to position the nozzle assembly 61 using the pan assembly 62 and the tilt assembly 60. The delivery assembly 70 provides image, position, and range information for the nozzle assembly 61 to the control module 50. Once properly positioned, the selected agent control valve 63*a*, 63*b*, 63*c* receives commands from the valve control module 54 to open. Once open, this provides a path for the selected firefighting agent to exit from the selected fire agent bottle, 64*a*, 64*b*, 64*c* through the respective connecting piping 65*a*, 65*b*, 65*c* to the manifold 67, through the main piping 65, and from there to the nozzle assembly 61.

The control cable assembly 66 may be a control wiring harness. One appropriate control wiring harness may be the Elkhart Brass RC10 Control Sensor Harness. The Elkhart Brass RC10 Control Handle Sensor Harness is a wiring harness designed to connect a sensor or switch to the Elkhart Brass RC10 Slow Closing Valve Control Handle. The harness allows the sensor or switch to communicate with the control handle, providing information on the status or position of the valve. The RC10 Control Handle Sensor Harness is typically used in applications where remote monitoring or automation of the valve is required. For example, in a fire protection system, a sensor could be installed to detect the presence of smoke or heat, triggering the valve to close automatically via the RC10 control handle. The sensor harness would transmit the signal from the sensor to the control handle, ensuring the valve closes quickly and safely.

Delivery Assembly 70

The delivery assembly 70 has a nozzle module 72, and three agent modules 74. The nozzle module 72 includes a nozzle tilt assembly 60, a nozzle 61, a pan assembly 62, a manifold assembly 67, a camera 68, and a range sensor 71. Each agent module 74 has a firefighting agent valve 63, a firefighting agent bottles 64, a firefighting agent hose assembly 65, a control cable assembly 66, and a firefighting agent bottle pressure sensor 69. This embodiment has three agent modules 74, so the delivery assembly 70 as a whole has a series of firefighting agent valves 63*a*, 63*b*, 63*c*, a series of firefighting agent bottles 64*a*, 64*b*, 64*c*, a firefighting agent hose assembly 65, and a series of firefighting agent bottle pressure sensor 69*a*, 69*b*, 69*c*. 63, 63*a*, 63*b*, 63*c*, In the preferred embodiment as illustrated in FIG. 1, the agent delivery assembly 70 receives commands from the control module 50 via the command-and-control cable assembly 66, to position the nozzle assembly 61 using the pan assembly 62 and the tilt assembly 60. The pan assembly 62 allows rotation on a horizontal axis (from one side to the other). The tilt assembly 60 allows movement on a vertical axis (from up to down).

The agent delivery assembly 70 provides position and range information for the nozzle assembly 61 to the control module 50. Once properly positioned, the agent control valves 63*a*, 63*b*, 63*c* receive commands from the valve control module 54 to open, providing a path for the selected agent to exit the agent bottles, 64*a*, 64*b*, 64*c* through the connecting piping 65 to the manifold 67, and from there to the nozzle assembly 61.

Camera 68

In the embodiment shown here, the camera 68 is mounted onto the pan assembly 60 and the tilt assembly 62. This enables the camera 68 to rotate with the nozzle 61, so that the field of view of the camera 68 changes with the field of spray of the nozzle 61.

The camera 68, along with the information from the sensor assembly 51, is used by the control module 50, to locate a threat, or impending threat event location, in 3D space. Then, the camera 68, again along with the information from the sensor assembly 51, provides visual and sensor feedback to the control module 50 that is utilized by the processor module 52, to assess the action of the agent on the threat and/or fire. While a camera 68 is shown here, it is to be understood that in other embodiments, this could be any comparable type of sensor, capable of providing sensor data, visual or otherwise, about the space in relationship to the agent delivery assembly for providing feedback to the control module 50 for evaluation.

In some embodiments, the camera 68 is not provided as part of the pan and tilt assembly 60, 62. Instead, cameras are only provided in the sensor package of 51*e*, 51*f*. In yet other assemblies, cameras 68 are provided as part of the pan and tilt assembly 60, 62, as well as being provided in the sensor package of 51*e*, 51*f*. This enables system 40 to have a firefighting nozzle 70 placed in a location where it is desirable to have a camera that can both pan and tilt. The sensor package 50 is intended to be fixed in a permanent location and located away from the nozzle to keep the view of the space clear. The sensor package 50 may or may not likewise be fixed onto a further pan and tilt assembly and therefore may or may not have a pan and tilt capability.

Hose Assembly 65

The firefighting agent hose assembly 65 may have one or more flexible hoses. Hoses appropriate for this might include those tested and listed for use with ANSUL® R-102 and PIRANHA Restaurant Fire Suppression Systems through Underwriters Laboratories (UL/ULC), and LPCB (Loss Prevention Certification Board). Typical hose diameter might be between 1 in. and ¼ in., and more typically about ½ in. (13 mm) and a length of between 10 ft and 0.5 ft, and more typically about 5 ft (1.5 m). For NPT/NPTF hose fittings, male NPT/NPTF swivels might be provided at hose ends for easy installation. NPSM swivel adapters may add versatility. May include 3 ft (0.9 m) long restraining cable, or other restraining cable hardware kit for various mounting options. Offers convenience of moving portion of delivery assembly for cleaning without disconnecting agent piping.

Fire Agent Modules 72

Each agent module 74 has a firefighting agent valve 63, a firefighting agent bottle 64, a firefighting agent hose assembly 65, and a firefighting agent bottle pressure sensor 69. This means that each of the series of fire agent control valves 63*a*, 63*b*, 63*c*, corresponds to a specific respective one of the series of firefighting agent bottles 64*a*, 64*b*, 64*c*. Likewise, each of the series of firefighting agent bottle pressure sensor 69*a*, 69*b*, 69*c*, corresponds to a specific respective one of the series of firefighting agent bottles 64*a*, 64*b*, 64*c*. Finally, each of the series of hoses 65*a*, 65*b*, 65*c*, corresponds to a specific respective one of the series of firefighting agent bottles 64*a*, 64*b*, 64*c*.

Firefighting Agent Bottles 64

Although this embodiment shows only three firefighting agent containers 64*a*, 64*b*, 64*c*, it is to be understood that there could be any number of containers. In this embodiment each of the three firefighting agent containers are understood to contain a different type of firefighting agent. The processor module 52 identifies each of the types of agents contained, as well as the class of fire present, and uses the database of recognized hazards to identify and employ the correct agent for each class of fire. Using the incorrect agent can create additional hazards or allow the fire to re-ignite after apparently being extinguished successfully.

Information regarding possible firefighting agents contained within firefighting agent bottles 64 of the present invention are provided below. The firefighting agent bottles 64 may contain both a water and a foam agent. This agent extinguishes fire by taking away the heat element of the fire triangle. Foam also separates the oxygen element from the other elements. The processor module 52 recognizes the potential hazards, i.e., as the discharge stream could spread the flammable liquid in a class B fire or could create a shock hazard on a class C fire, and so recognizes that water and foam agents are preferred for class A fires.

Firefighting agent bottles 64 may contain carbon dioxide which extinguishes fire by taking away the oxygen element of the fire triangle and also be removing the heat with a very cold discharge. The processor module 52 recognizes that this agent is usually ineffective on class A fires, so recognizes that this agent is preferred for class B & C fires.

Dry chemical fire agents are also possibly contained in firefighting agent bottles 64. These agents extinguish the fire primarily by interrupting the chemical reaction of the fire triangle and creating a barrier between the oxygen element and the fuel element on class A fires. Multipurpose dry chemical agent is effective on class A, B, and C fires. Ordinary dry chemical is for class B & C fires only.

Firefighting agent bottles 64 may contain wet chemical agents that extinguish the fire by removing the heat of the fire triangle and prevents re-ignition by creating a barrier between the oxygen and fuel elements. Wet chemical agents are preferred for class K fires and may also be used on class A fires.

Halogenated or clean agent are also possibly contained in firefighting agent bottles 64. These agents include the halon agents as well as the newer and less ozone depleting halocarbon agents. They extinguish the fire by interrupting the chemical reaction of the fire triangle. Clean agents are primarily preferred for class B & C fires.

Firefighting agent bottles 64 may contain dry powder agents, which are similar to dry chemicals. However, dry powder agents work by separating the fuel from the oxygen element or by removing the heat element of the fire triangle. This means that dry powder agents are ineffective on most classes of fires, and preferred for class D or combustible metal fires, only.

The traditional firefighting agent, water mist, is also a possibility. Though the use of this agent in firefighting agent bottles 64 is new, water mist works by taking away the heat element of the fire triangle. This is an alternative to the clean agent extinguishers where contamination is a concern. Water mist agents are primarily for class A fires, although they are safe for use on class C fires as well.

Firefighting agent bottles 64 may contain cartridge operated dry chemical agents which extinguish the fire primarily by interrupting the chemical reaction of the fire triangle. Like the stored pressure dry chemical agents, the multipurpose dry chemical is effective on class A, B, and C fires. This agent also works by creating a barrier between the oxygen element and the fuel element on class A fires.

Agents that are ABC rated means that the chemical agent inside of it will work on ordinary combustibles, flammable liquids, and objects which are electrically energized. Other chemical agents that would not work on ordinary combustibles (wood, paper, cloth) are less "corrosive" than that of the ABC agent and often better suited for a marine application in an emergency.

Range Determination Sensor 71

In some embodiments, the range determination sensor 71 is incorporated into the function of the camera. Using a subprocess to gather location data pinpointing two locations: the location of the nozzle and location of the sensor package. These locations can be utilized to determine the range from the nozzle to the location of a fire in the space.

In this embodiment, a range detector 71 is mounted on the nozzle pan 62 and nozzle tilt 60 assemblies. The range detector 71, as well as the camera 68 mounted on the nozzle pan 62 and nozzle tilt 60 assemblies, as well as the information from the sensor assembly 51, provides information to the processor module 52 to determine the range (or distance) to a location of a threat, fire event, potential fire event, or other anomaly detected.

Figure 1A:
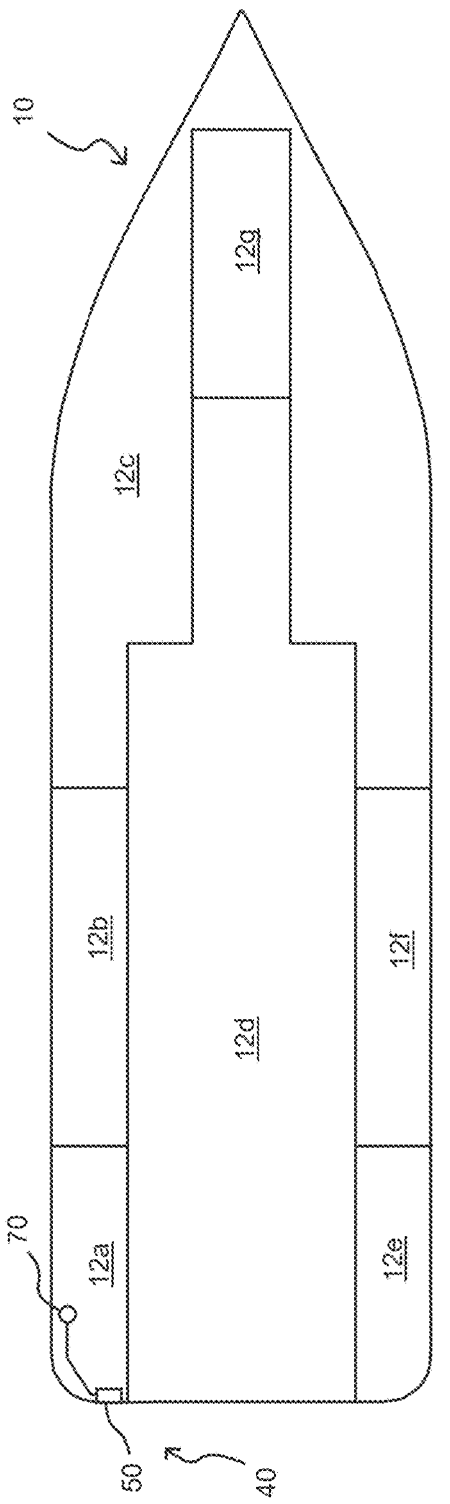
FIG. 1*a* is a diagram of the present invention as utilized according to the embodiment shown in FIG. 1.

FIG. 1*a*—Use of the Autonomous Continuous System Onboard a Ship

Ships 10 often have multiple spaces 12*a*, 12*b*, 12*c*, 12*d*, 12*e*, 12*f*, 12*g*. FIG. 1*a* is a block diagram illustrating the present system 40 as illustrated in FIG. 1 being used with a ship 10 in a first space 12*a*. As graphically illustrated, some distance may exist between the control module 50 and the delivery assembly 70 in this embodiment. This enables the delivery assembly 70 to be placed in the best location for overall disbursement of the firefighting agent.

Figure 1B:
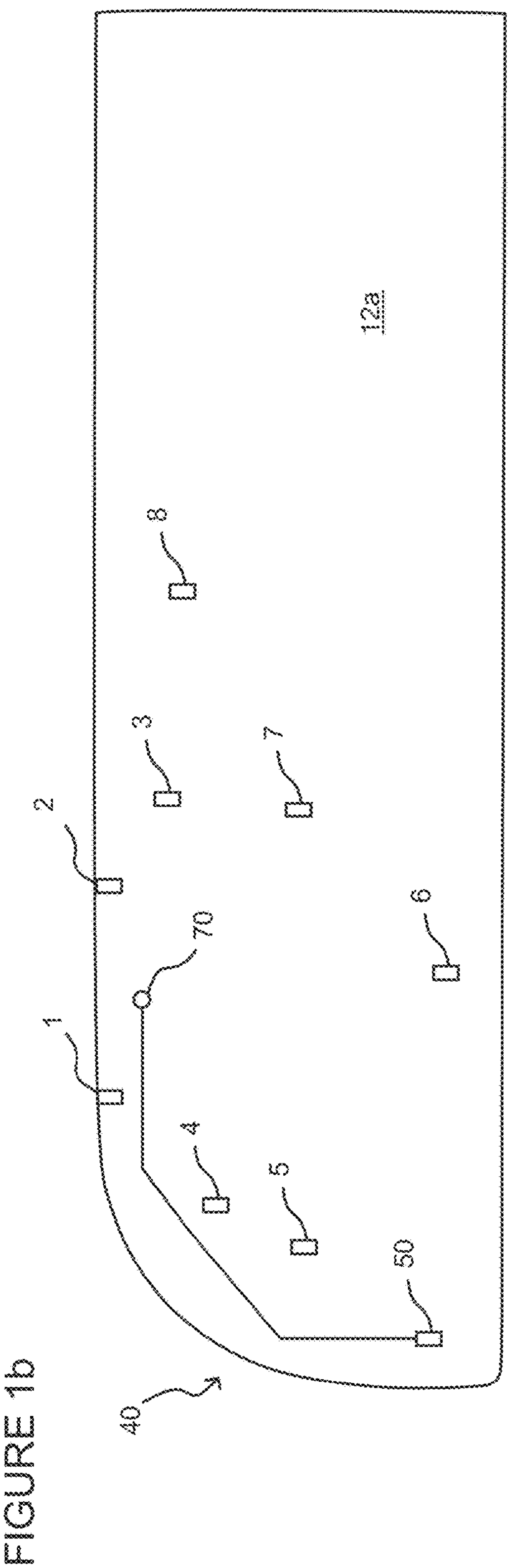
FIG. 1*b* is an enlarged diagram of the embodiment shown in FIG. 1*a*.

FIG. 1*b* is an enlarged diagram of space 12*a* shown in FIG. 1*a*, now also showing the placement of protected items of importance 1, 2, 3, 4 and potential sources of hazards 5, 6, 7, 8. As graphically illustrated, some care may be chosen to place the delivery assembly 70 closer to those protected items of importance 1, 2, 3, 4 while still maintaining proper placement to address any potential sources of hazards 5, 6, 7, 8. Again this enables the delivery assembly 70 to be placed in the best location for overall disbursement of the firefighting agent.

Figure 2:
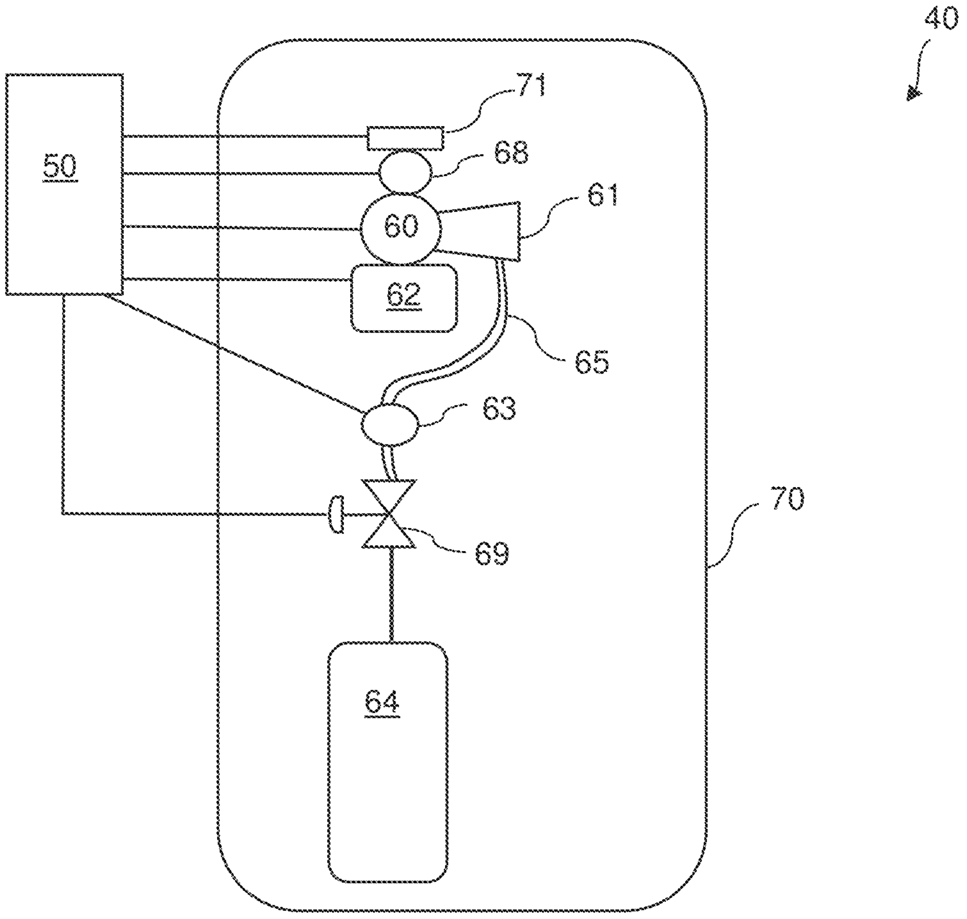
FIG. 2 is a block diagram of a portable version according to one embodiment of the system of the present invention.

FIG. 2—Portable or Temporary Systems

FIG. 2 is a block diagram of a portable (or temporary installation) of the present inventive system 40 having a single fire bottle. In this figure, the fire control module 50 interacts directly with an agent delivery assembly 70. Connected together in one unit housing, there is no need for an extended command and control cable assembly to bridge the distance between the control module 50 and the delivery assembly 70. In this embodiment, there is only one firefighting agent module, so only one firefighting agent bottle 64, one pressure sensor 69, and one firefighting agent control valve 63. This module is also directly connected with the control module 50. The presence of the uninterruptible power supply battery 57 ensures that the system can remain powered without being hardwired into a power supply system. Each of these features enables this embodiment to be particularly applicable as a portable, relatively lightweight version of the present system for use in temporary situations.

As before, this embodiment has a range detector 71 and camera 68 mounted on a nozzle assembly 61. The nozzle assembly 61 in turn is mounted on a pan assembly 62, and a tilt assembly 61. In alternative embodiments, this may be a combined pan and tilt assembly. Each of these: the nozzle pan assembly 62, the nozzle tilt assembly 61, the camera 68, and the range detector 71, provides information to the processor module 52 of the fire control module 50 to determine the range to a location of a threat, fire event, potential fire event, or other anomaly detected.

As before, the tele-robotic firefighting nozzle agent delivery assembly 70 provides image, position, and range information for the nozzle assembly 61 to the fire control module 50. Once properly positioned, the agent control valve 63 receives commands from the valve control module 54 to open. Once opened, control valve 63 provides a path for the selected firefighting agent to exit the fire agent bottles 64 through the connecting piping 65 to the nozzle assembly 61. However, in this embodiment, because there is only a single firefighting agent bottle 64, there is no need for a manifold 67, and there are a reduced number of hoses 65*a*, 65*b*, 65*c* in the overall hose assembly 65.

Figure 2A:
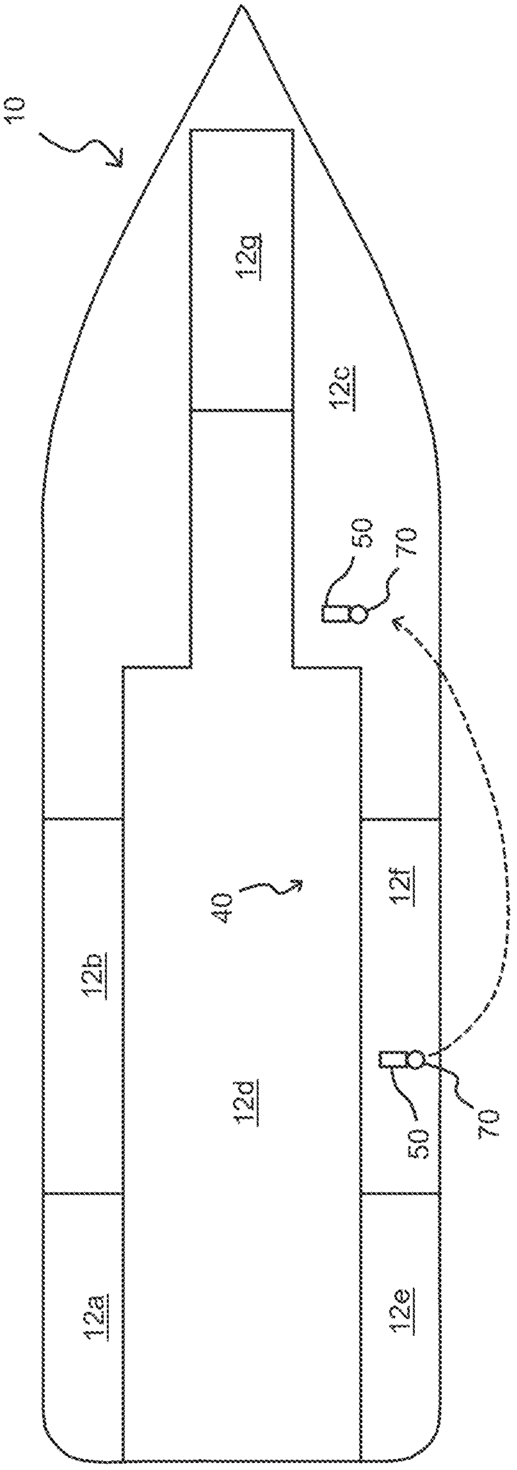
FIG. 2*a* is a diagram of the present invention as utilized according to the embodiment shown in FIG. 2.

FIG. 2*a*—Use of the Temporary System Aboard Ship

FIG. 2*a* again illustrates multiple installations of system 40 in separate locations on ship 10. Ship 10 again has multiple spaces 12*a*, 12*b*, 12*c*, 12*d*, 12*e*, 12*f*, 12*g*. As a block diagram, FIG. 2*a* generally illustrates the present system 40 as illustrated in FIG. 2 being moved about the ship 10 from a first installation in a first space 12*f* to a second installation in a second space 12*c*. As graphically illustrated, in this portable, temporary embodiment, no distance exists between the control module 50 and the delivery assembly 70. This enables the portable system 40 to be relocated with ease, and facilitates reversible installation.

Figure 3A:
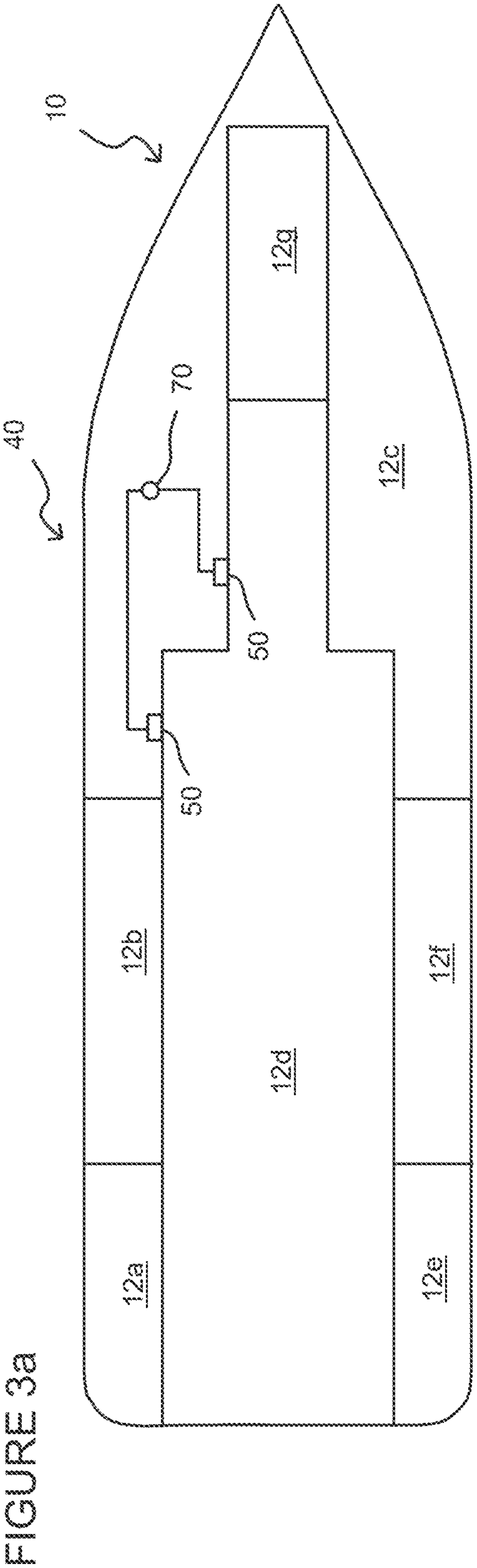
FIG. 3*a* is a diagram of the present invention as utilized according to the embodiment shown in FIG. 3.
Figure 3:
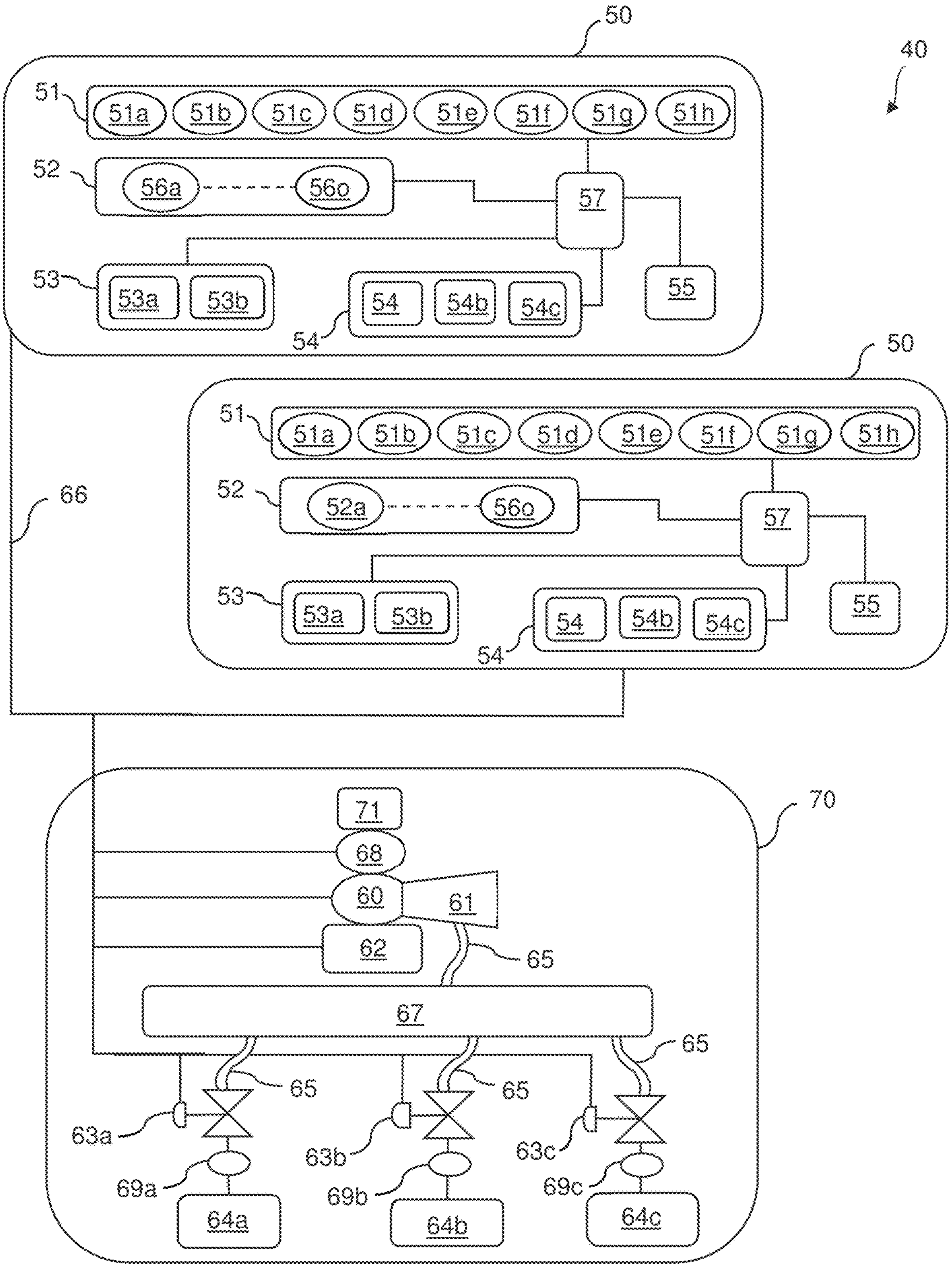
FIG. 3 is a block diagram of one embodiment of the system of the present invention for sensor occlusion.

FIG. 3—Systems for Structural Anomalies or Occlusions in Space

FIG. 3 is a block diagram of an embodiment of the present system 40 capable of counteracting the difficulties in providing accurate sensor coverage when there are structural anomalies within the space. As this embodiment is substantially the same as the embodiment shown in FIG. 1, only the differences will be discussed. For example, in this embodiment, two control modules 50 are provided for communicating and controlling one agent delivery assembly 70. In this case, one control module 50 would be placed on one side of the structural anomaly, while another control module 50 would be placed on another side of the structural anomaly. While this figure illustrates two control modules communicating and controlling one agent delivery assembly, any number of control modules 50 are possible. This embodiment is also applicable to locations where sensor coverage of part of a space by a single control module 50 in a space is occluded.

FIG. 3*a*—Use of the System Around Structural Anomalies

FIG. 3*a* illustrates system 40 as shown in FIG. 3, as in use upon ship 10. Ship 10 again has multiple spaces 12*a*, 12*b*, 12*c*, 12*d*, 12*e*, 12*f*, 12*g*. As a block diagram, FIG. 3*a* generally illustrates the present system 40 being used to provide sensor data about a space 12*c* around a structural anomaly within the ship. As graphically illustrated, in this embodiment, distance exists between the control modules 50 and the delivery assembly 70. This enables the system 40 to have control modules 50 to be placed in the best location for overall assessment of the space for the best distribution of firefighting agent from the delivery assembly 70. This might be preferable if there are multiple hazards in a space that are placed about a structural anomaly in a single space in a manner that makes it difficult for a single sensor to monitor continuously. Again, the purpose of the present method is not only to stop fires once they have started, but also to monitor potential hazards and hazardous situations in order to prevent the fire in the first place.

Figure 4:
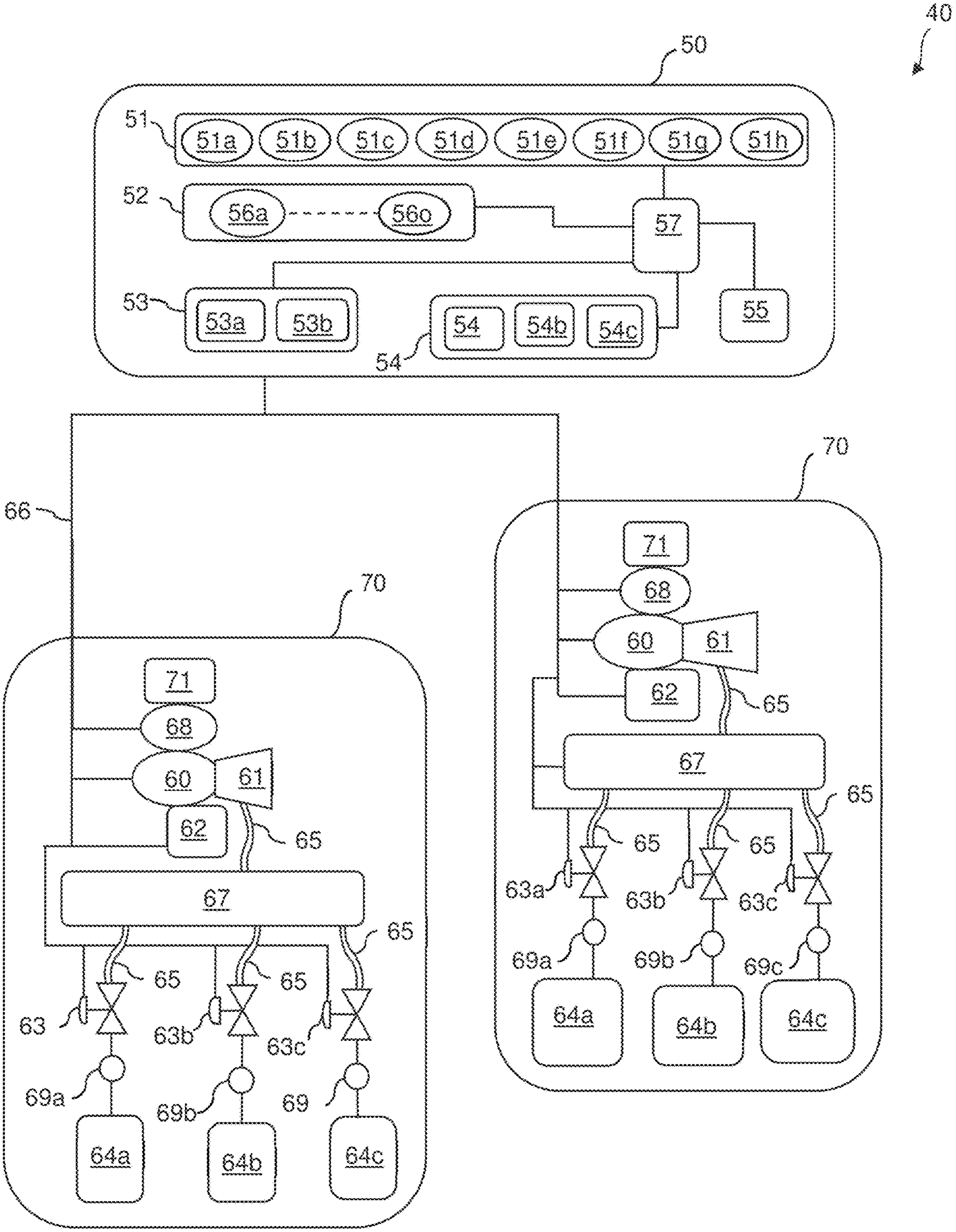
FIG. 4 is a block diagram of one embodiment of the system of the present invention for larger spaces.

FIG. 4—Systems for Larger Spaces

FIG. 4 is a block diagram of the present automated system 40 for covering larger spaces. As this embodiment is substantially the same as the embodiment shown in FIG. 1, only the differences will be discussed. Specifically, this system 40 has one control module 50 communicating and controlling two agent delivery assemblies 70. While this figure illustrates only one control module 50 communicating and controlling two agent delivery assemblies, it is to be understood that any number of tele-robotic fire nozzle agent delivery assemblies can be controlled by one control module 50.

Figure 4A:
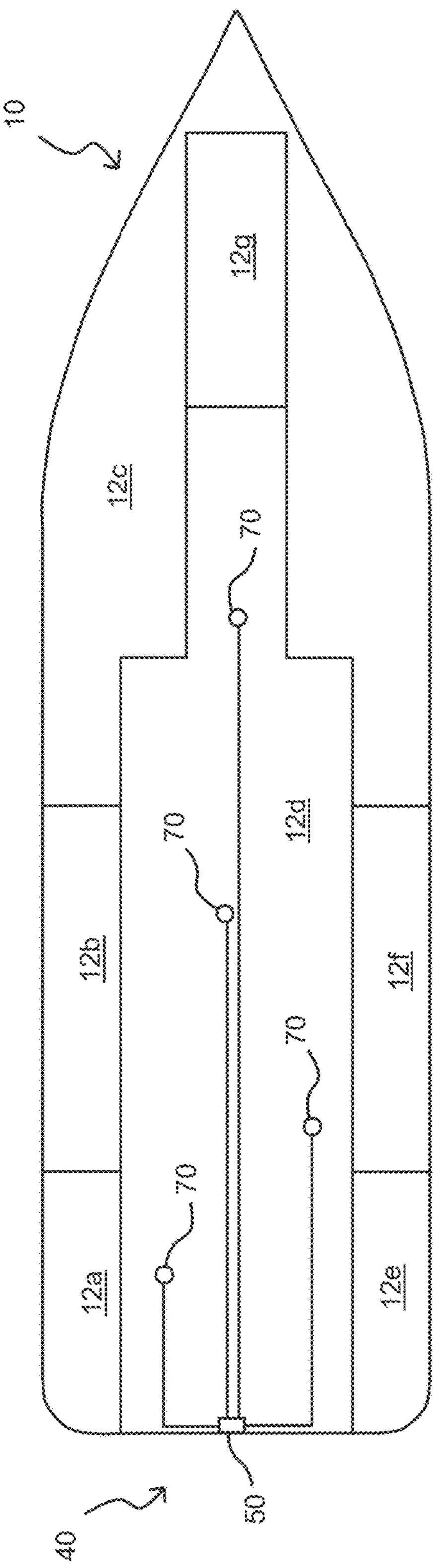
FIG. 4*a* is a diagram of the present invention as utilized according to the embodiment shown in FIG. 4.

FIG. 4*a*—Use of the System in Larger Areas

FIG. 4*a* illustrates system 40 as shown in FIG. 4, as in use upon ship 10. Ship 10 again has multiple spaces 12*a*, 12*b*, 12*c*, 12*d*, 12*e*, 12*f*, 12*g*. As a block diagram, FIG. 4*a* generally illustrates the present system 40 being used to provide sensor data about a large space 12*d* within the ship 10. As graphically illustrated, in this embodiment, there are four agent delivery assemblies 70 placed within the single larger space 12*d* of the ship 10. Different distances (20 ft, 50 ft, 75 ft, and 100 ft) exist between the control module 50 and the multiple delivery assemblies 70. This enables the system 40 to have delivery assemblies 70 to be placed evenly throughout the larger area 12*d* for equal disbursement and distribution of firefighting agents.

Figure 5A:
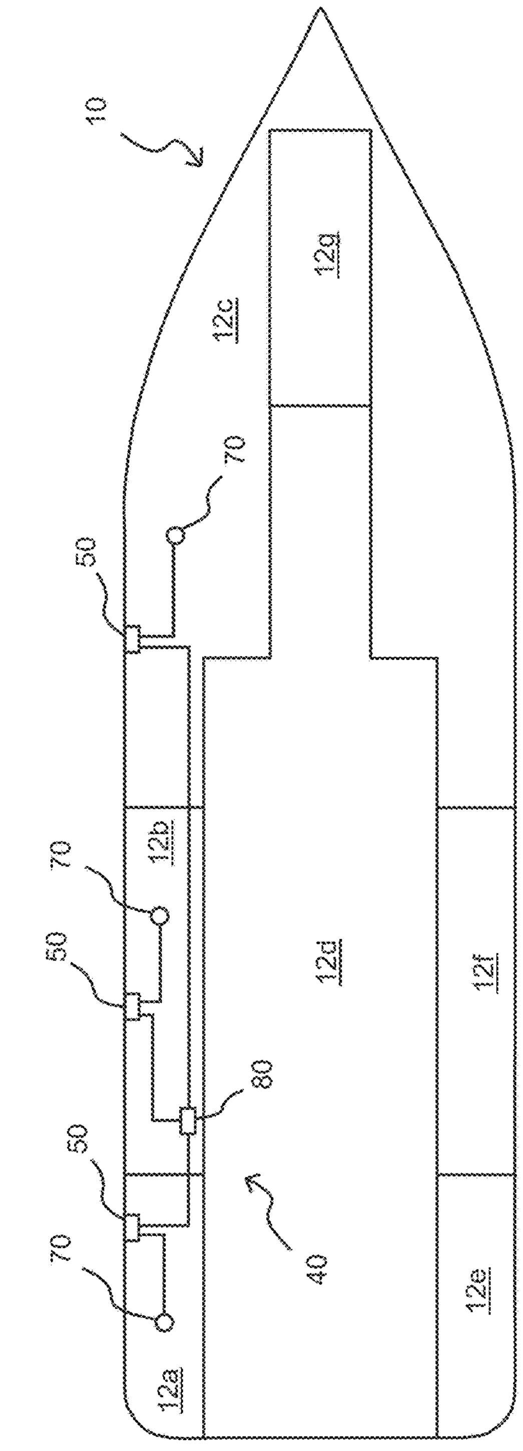
FIG. 5*a* is a diagram of the present invention as utilized according to the embodiment shown in FIG. 5.
Figure 5:
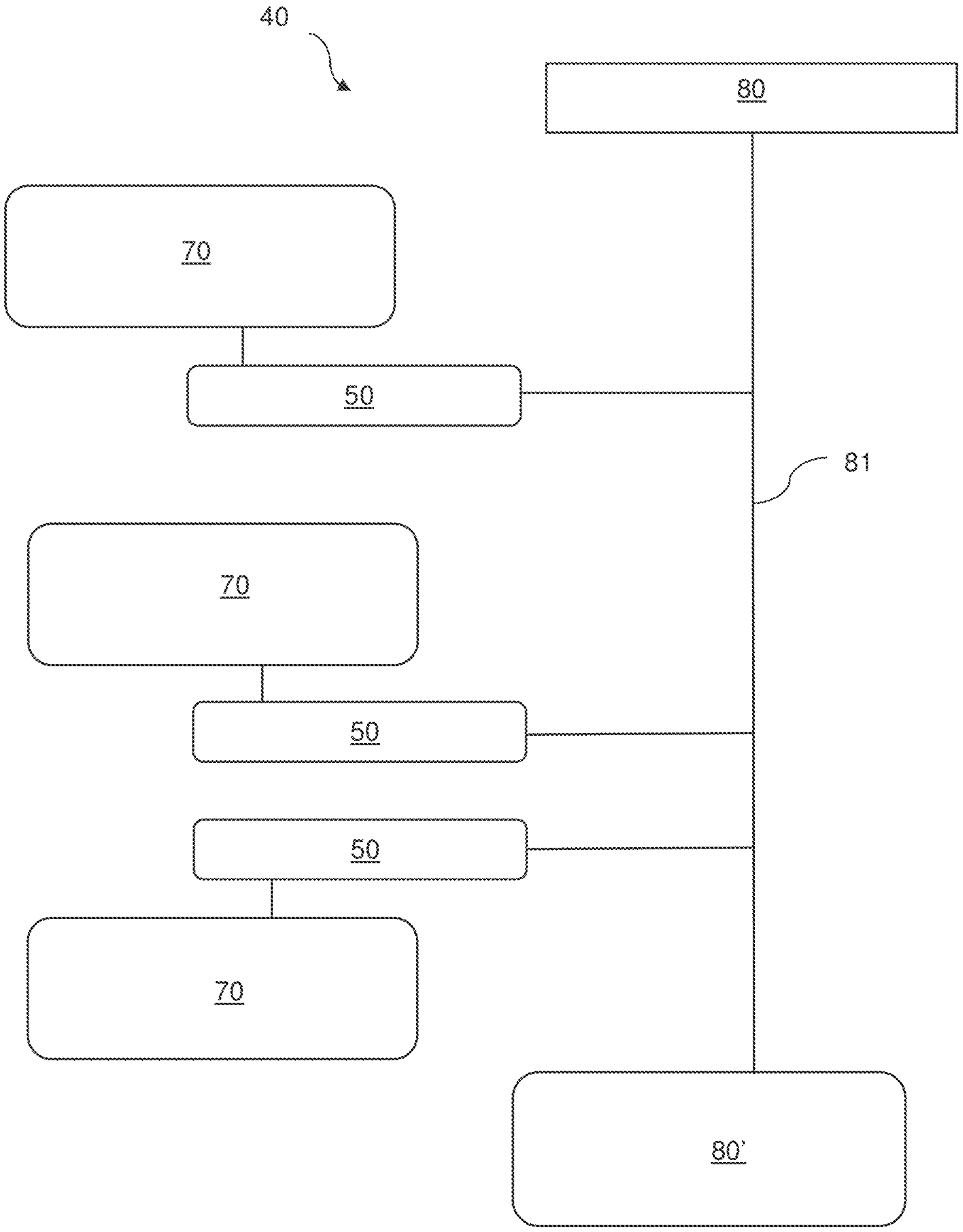
FIG. 5 is a block diagram illustrating one embodiment of the system of the present invention for multiple spaces.

FIG. 5—Systems For Multiple Spaces

FIG. 5 is a block diagram illustrating systems which are capable of handling multiple spaces. As this embodiment is substantially the same as the embodiment shown in FIG. 1, only the differences will be discussed. In this case, a supervisory computer and operator interface is capable of interacting with each of the subsystems. As shown, in this embodiment, there are three control modules 50 communicating with each other and with a supervisory computer and operator interface 80. While this figure illustrates one supervisory computer and operator interface 80, any number of supervisory computer and operator interfaces 80' can be communicated to and with each other.

Each subsystem 40' may have a further supervisory computer and operator interface 80'. Each further supervisory computer and operator interface 80' may have a further three control modules 50 communicating with each other and with the further supervisory computer and operator interface 80'. With each of the further three control modules 50' connected and communicating with further agent delivery assemblies 70'.

FIG. 5*a*—Use of the System in Multiple Spaces

FIG. 5*a* illustrates system 40 as shown in FIG. 5, as in use upon ship 10. Ship 10 again has multiple spaces 12*a*, 12*b*, 12*c*, 12*d*, 12*e*, 12*f*, 12*g*. As a block diagram, FIG. 5*a* generally illustrates the present system 40 being used to provide multiple sensor data about multiple spaces 12*a*, 12*b*, 12*c* within the ship. FIG. 5*a* also generally illustrates the present system 40 being used to provide fire protection deployment assemblies in each of those multiple spaces 12*a*, 12*b*, 12*c*. As graphically illustrated, in this embodiment, different distances (20 ft, 30 ft, 75 ft) exist between the supervisory computer and operator interface 80 and the various control modules 50 and the multiple delivery assemblies 70. This enables the system 40 to have various control modules 50 and multiple delivery assemblies 70 to be placed throughout multiple areas 12*a*, 12*b*, 12*c* for distribution of firefighting agents.

Figure 6:
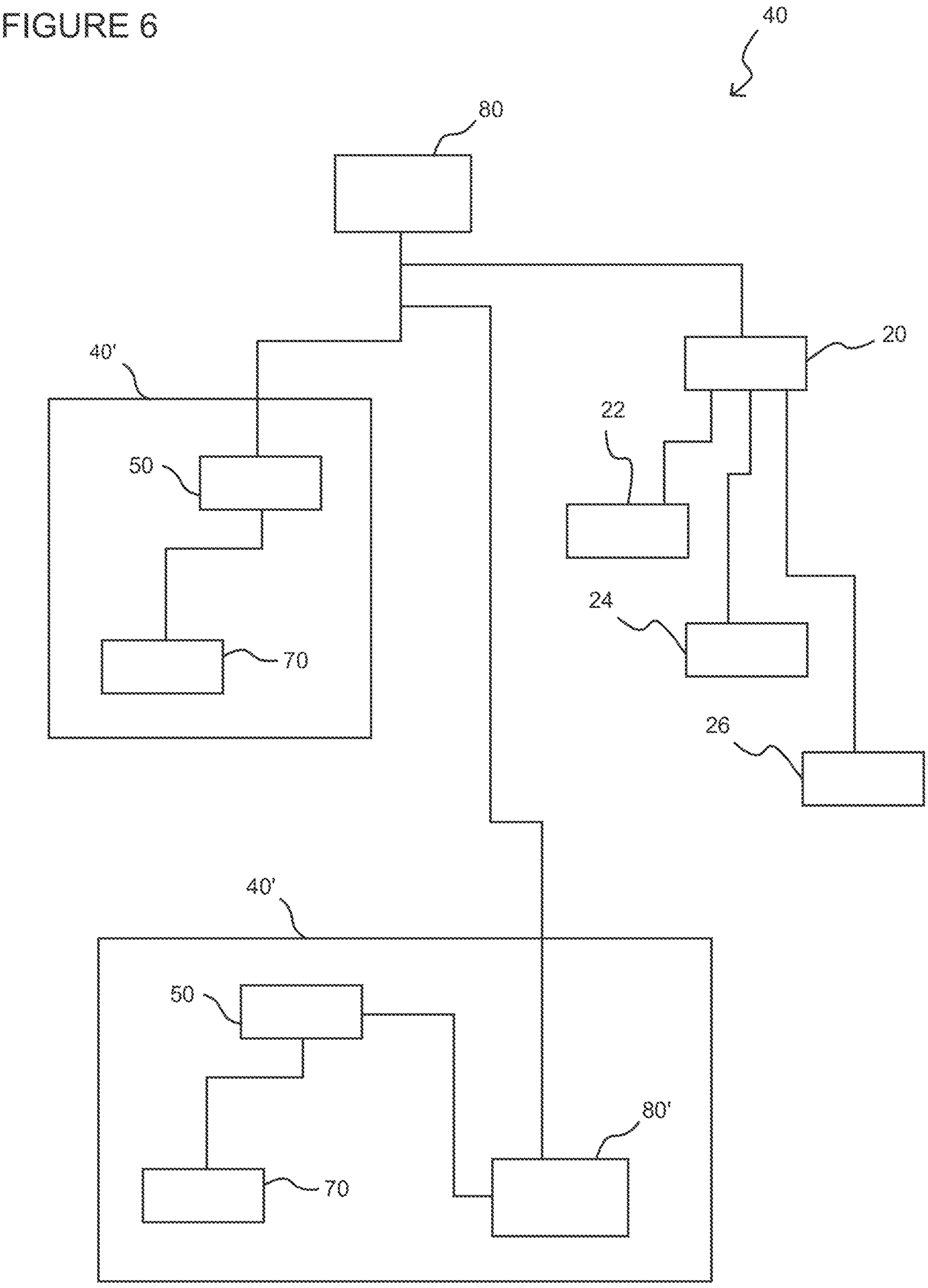
FIG. 6 is a block diagram illustrating one embodiment of the system of the present invention for use with a pre-existing system.

FIG. 6—Systems for Incorporation with Pre-Existing Systems

FIG. 6 is a block diagram illustrating the present system 40 being used with an existing system 20. As this embodiment is substantially the same as the embodiment shown in FIG. 1, only the differences will be discussed. In this embodiment, the system 40 has a supervisory computer and operator interface 80 which is connecting a pre-existing system 20 and a number of subsystems 40'.

The supervisory computer and operator interface 80 according to the present invention is capable of interacting with each of the subsystems 20, 40' and facilitates communication with each of the pre-existing system subcomponents 22, 24, 26 with the new subsystems 40'. In order to facilitate this, the associated data of each of the multiple subcomponents 22, 24, 26 of the pre-existing system 20 must be identified, categorized, and integrated into the present system methodology assessments.

While this figure illustrates one supervisory computer and operator interface 80, and a single pre-existing system 20, it is to be understood that any number of supervisory computer and operator interfaces can be communicated to and with each other, and any number of pre-existing systems and pre-existing subcomponents.

Figure 6A:
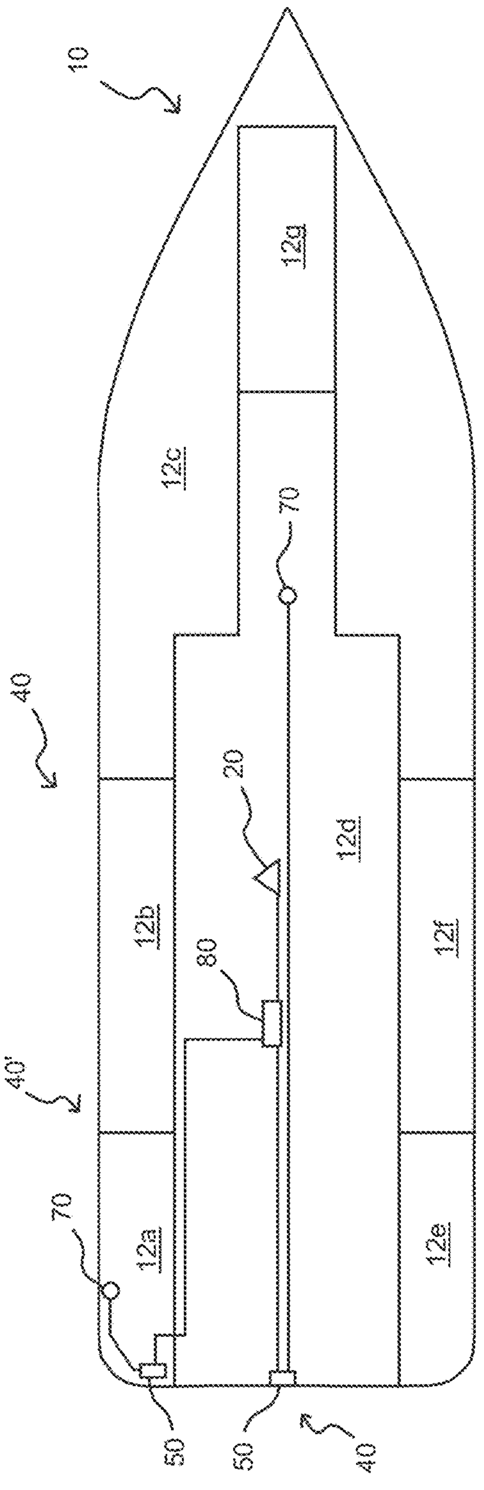
FIG. 6*a* is a diagram of the present invention as utilized according to the embodiment shown in FIG. 6.

FIG. 6*a*—System Cooperation with Pre-Existing Systems

FIG. 6*a* is a block diagram of the present automated system 40 for covering larger spaces 12*d* as modified to be able to communicate with a pre-existing system 20 with a supervisory computer and operator interface 80. Specifically, FIG. 6*a* illustrates system 40 as shown in FIG. 6, as in use upon ship 10 with an existing system 20. Ship 10 again has multiple spaces 12*a*, 12*b*, 12*c*, 12*d*, 12*e*, 12*f*, 12*g*. As a block diagram, FIG. 6*a* generally illustrates the present system 40 being used to cooperate with a pre-existing system 20 to increase the coverage of the large space 12*d* within the ship. Subcomponents 22, 24, 26 are not illustrated in this figure or in FIGS. 6*b*-6*d* in order to increase overall figure clarity.

As graphically illustrated, in this embodiment, different distances (20 ft, 30 ft) exist between the supervisory computer and operator interface 80 and the control module 50 and the pre-existing system 20. This enables system 40 to have various control modules 50 placed in position for optimal sensor collection, while the delivery assembly 70 is placed in the optimal position for distribution of firefighting agents—to best compliment the pre-existing system weak points. The supervisory computer and operator interface 80 is thus capable of interacting with each of the subsystems and facilitates communication with each of the pre-existing system subcomponents.

Figure 6B:
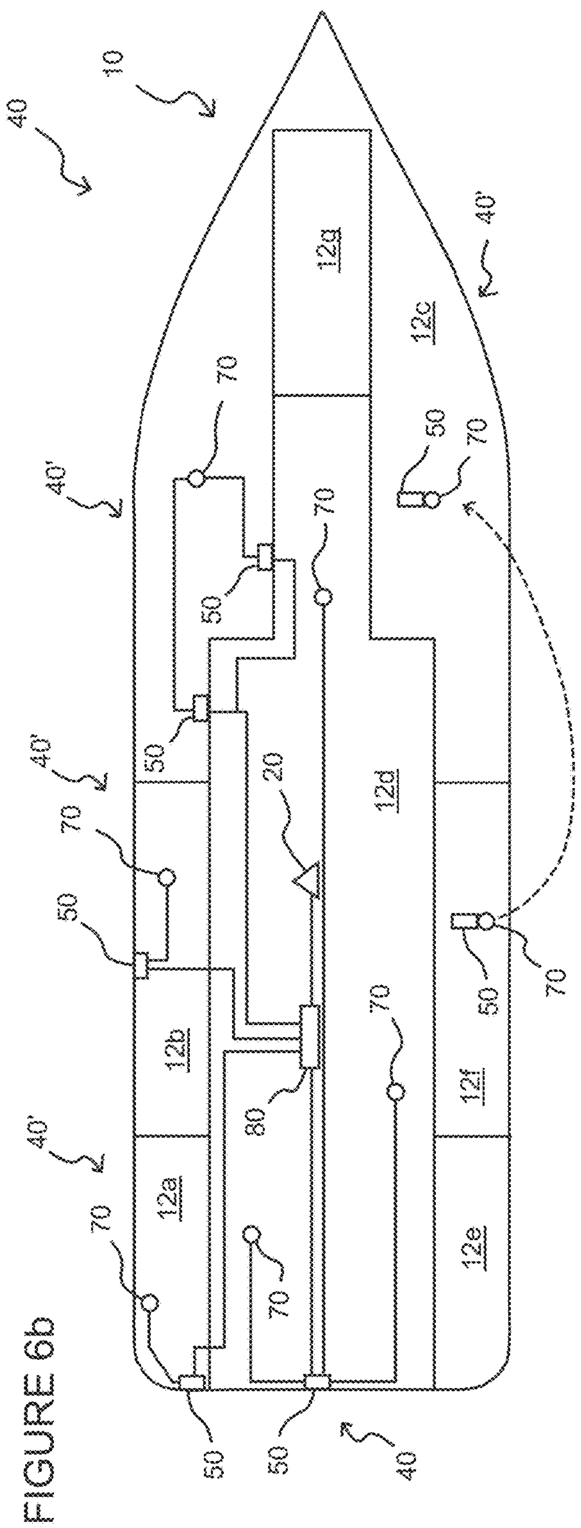
FIG. 6*b* is a diagram of the present invention as utilized according to a further embodiment.

FIG. 6*b*—Integrated System & Subsystems

FIG. 6*b* is a block diagram of the present automated system 40 for covering multiple spaces and larger spaces 12*d* as modified to be able to communicate with a pre-existing system 20 with a supervisory computer and operator interface 80. Specifically, FIG. 6*b* illustrates a combined system 40 according to the present invention, as in use upon ship 10 with an existing system 20, capable of covering multiple spaces 12*a*, 12*b*, 12*c*, 12*d*, 12*e*, 12*f*, 12*g*.

This system 40 shows multiple subsystems 40' fully integrated and incorporated, with a subsystem 40' for larger spaces in space 12*d*. A subsystem 40' is provided in contained smaller spaces 12*a*, 12*b*. A subsystem 40' is provided for overcoming occlusions in a first part of space 12*c*. Each of these subsystems 40' are hardline connected to the supervisory computer and operator interface 80. A temporary subsystem 40' is capable of being moved about the ship 10 from a first space 12*f* to a second space 12*c*. The temporary subsystem 40' is capable of connecting and communicating with the supervisory computer via Bluetooth or other communications array provided in control module 50. The supervisory computer and operator interface 80 is thus capable of interacting with each of the subsystems and facilitates communication with each of the pre-existing system subcomponents.

Figure 6C:
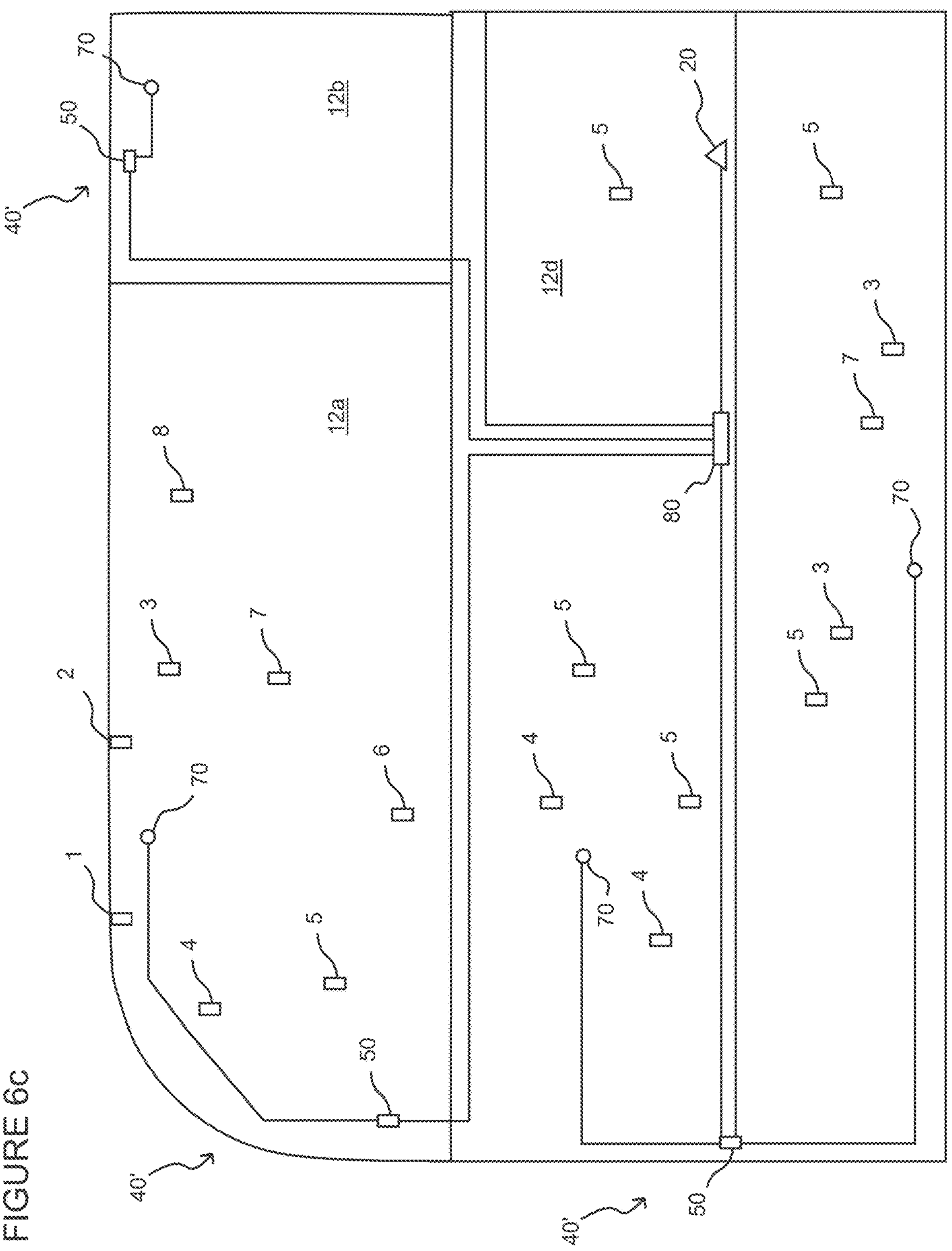
FIG. 6*c* is an enlarged portion of the present invention shown in FIG. 6*b*.

FIG. 6*c*—Enlarged Portion of Integrated System

FIG. 6*c* is an enlarged block diagram of a portion of FIG. 6*b* further showing the potential locations of protected items of importance 1, 2, 3, 4 and potential sources of hazards 5, 6, 7, 8. As graphically illustrated, care was taken with choosing a place for delivery assemblies 70, their location was designed to be closer to those protected items of importance 1, 2, 3, 4 while still maintaining proper placement to address any potential sources of hazards 5, 6, 7, 8. Again this enables the delivery assembly 70 to be placed in the best location for overall disbursement of the firefighting agents over multiple locations 12*a*, 12*b*, 12*d*.

Figure 6D:
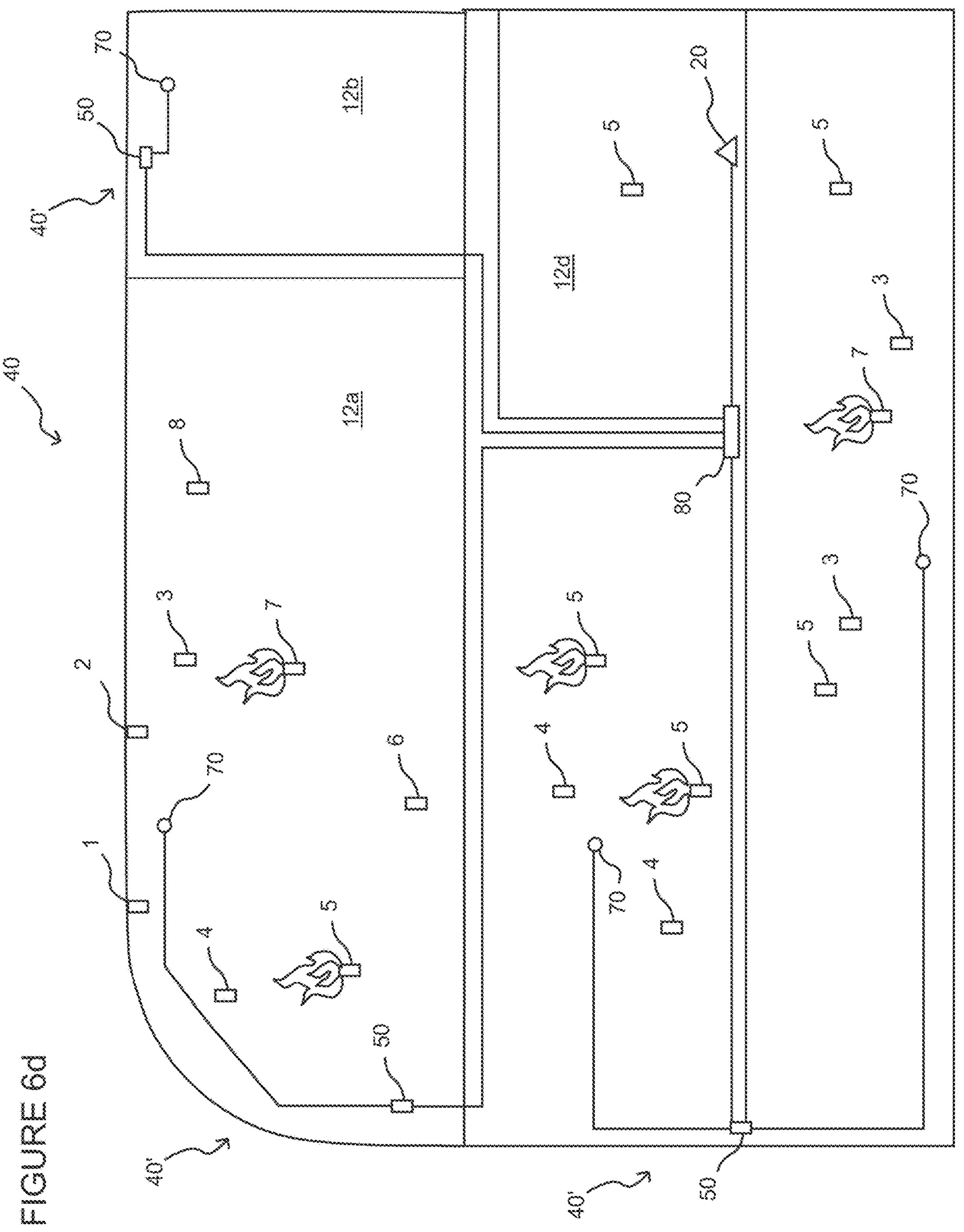
FIG. 6*d* is an enlarged portion of the present invention shown in FIG. 6*b* further showing potential hazards.

FIG. 6*d*—Hazard Events

FIG. 6*d* is the enlarged block diagram of FIG. 6*c* further showing current active hazards 5, 7 in close proximity to preferred protected items of importance 3, 4. As previously mentioned, each agent employed has advantages and disadvantages. In the present case, the typical agent employed by the prior art for hazard 5 is corrosive to protected items of importance 4. The typical application method utilized by the prior art is typically the employment of a whole space flooding approach to extinguishing the fire. This is extremely disadvantageous in the present case because protected items of importance 4 would be completely lost. The present invention not only has steps for classifying the fire, classifying the types of items of importance, and determining the relative locations of each with respect to the closest agent delivery assembly 70, but it also has the ability to monitor the level of preferred agent capable of addressing each type of fire. Furthermore, the present invention can ensure that the agent delivered adjacent to all protected items of importance 1, 2, 3, 4 is capable of addressing both hazards 5, 7.

Of course, the apparatus and method 40 according to the present invention, has the increased advantage of being able to pre-emptively detect an anomalous activity, which may otherwise lead to an active fire event, and employing a means of conducting pre-emptive deterrence, thereby avoiding the hazards 5, 7 shown in FIG. 6*d* from developing into a full fire hazard altogether in most scenarios.

If hazards 5, 7 were to develop into full fire events, the active threat response analysis is able to specifically target the exact locations with respect to the space within 12*a*, 12*d* and relative causes of the fire (hazards 5, 7). The active threat response then classifies the type of fire and responds with the most advantageous extinguishing agent that minimizes the amount of collateral damage to equipment and materials 1, 2, 3, 4 in the areas of the fire. The system is also capable of notifying an operator and taking pre-emptive actions to limit the spread or growth of the fire 5, 7 until additional response activities can be brought to bear (if necessary).

FIGS. 7-30—Method of Operation of the Fire-Assess™ System

Further details regarding the method of operation of the present invention are discussed with particular reference to FIGS. 7-30. To this end, FIGS. 7-29 are block diagrams of the method of the present invention showing processor module processing function events, and general decision trees according to the present invention. FIGS. 7 through 30 also provide further reference to the subprocesses the processor module 52 performs in connection with the steps of executing the threat detection and threat response and communication functions.

Figure 7:
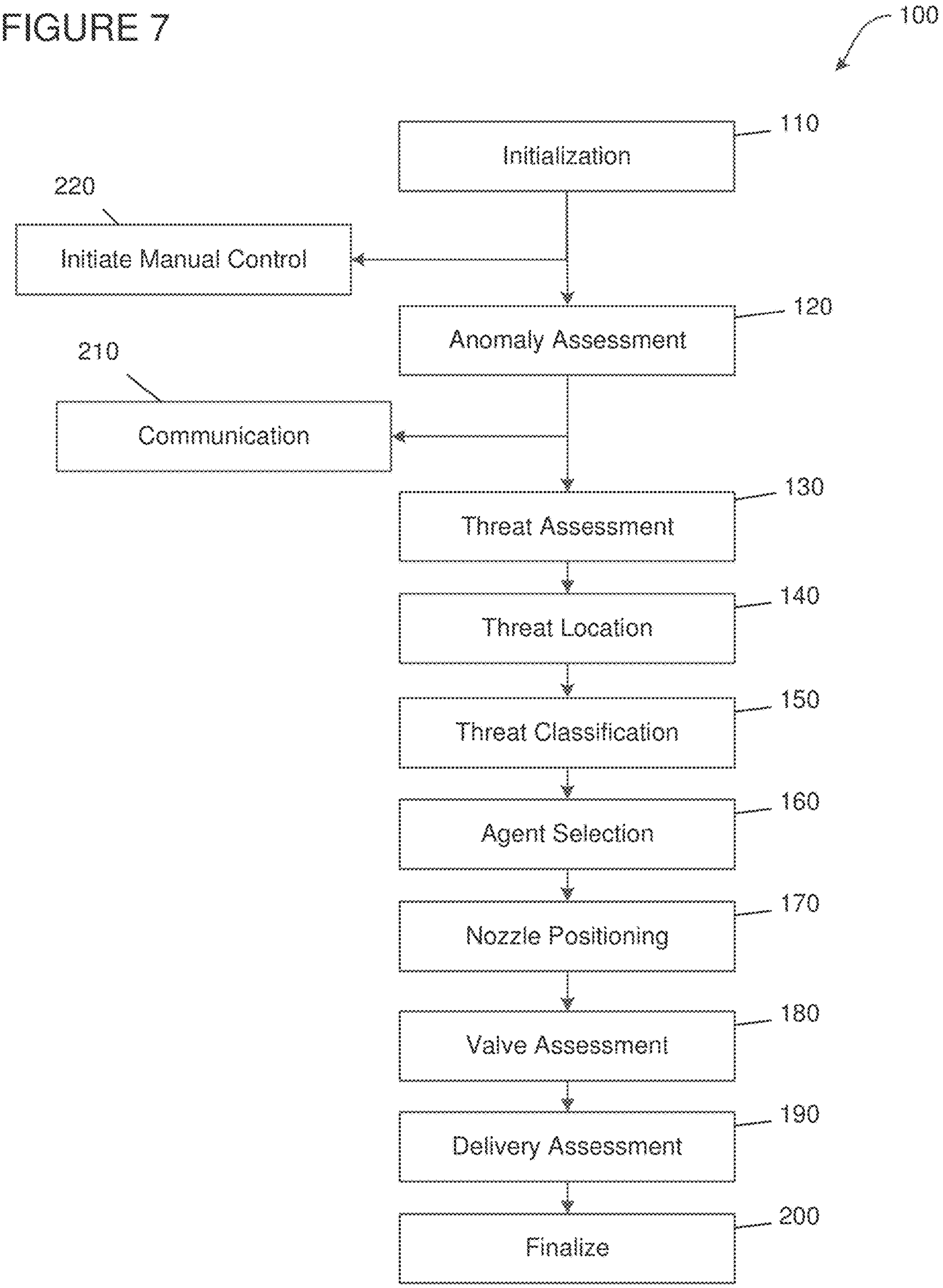
FIG. 7 is a block diagram of an overview of the inventive method according to one embodiment of the present invention.

FIG. 7 shows an overview of the method of the present invention. Initializing 110 the system of the present invention may be followed with continuous autonomous functioning. However, it is possible to initiate manual control 115 if circumstances determine that it is called for. Likewise, the system provides avenues for outside communication 210 such as notifying a supervisor 127 when necessary. While these two options to contact an external system are shown as the second and fourth steps in this example, it is to be understood that these could occur at any point in the process, and in conjunction with any subprocess described herein.

Additional steps performed by the inventive method of the present system include anomaly assessment 120, threat assessment 130, threat location 140, threat classification 150, agent selection 160, nozzle positioning 170, valve assessment 180, delivery assessment 190, and finalization 200 (which could also include reinitialization). It is to be understood that while these are shown and discussed as occurring in a sequential order, many of these steps are actually occurring concurrently. Indeed the outcome from many of these steps are coincidently employed by other steps of the methodology in a reiterative and recursive process.

FIGS. 8-11—Initializing 110

Figure 8:
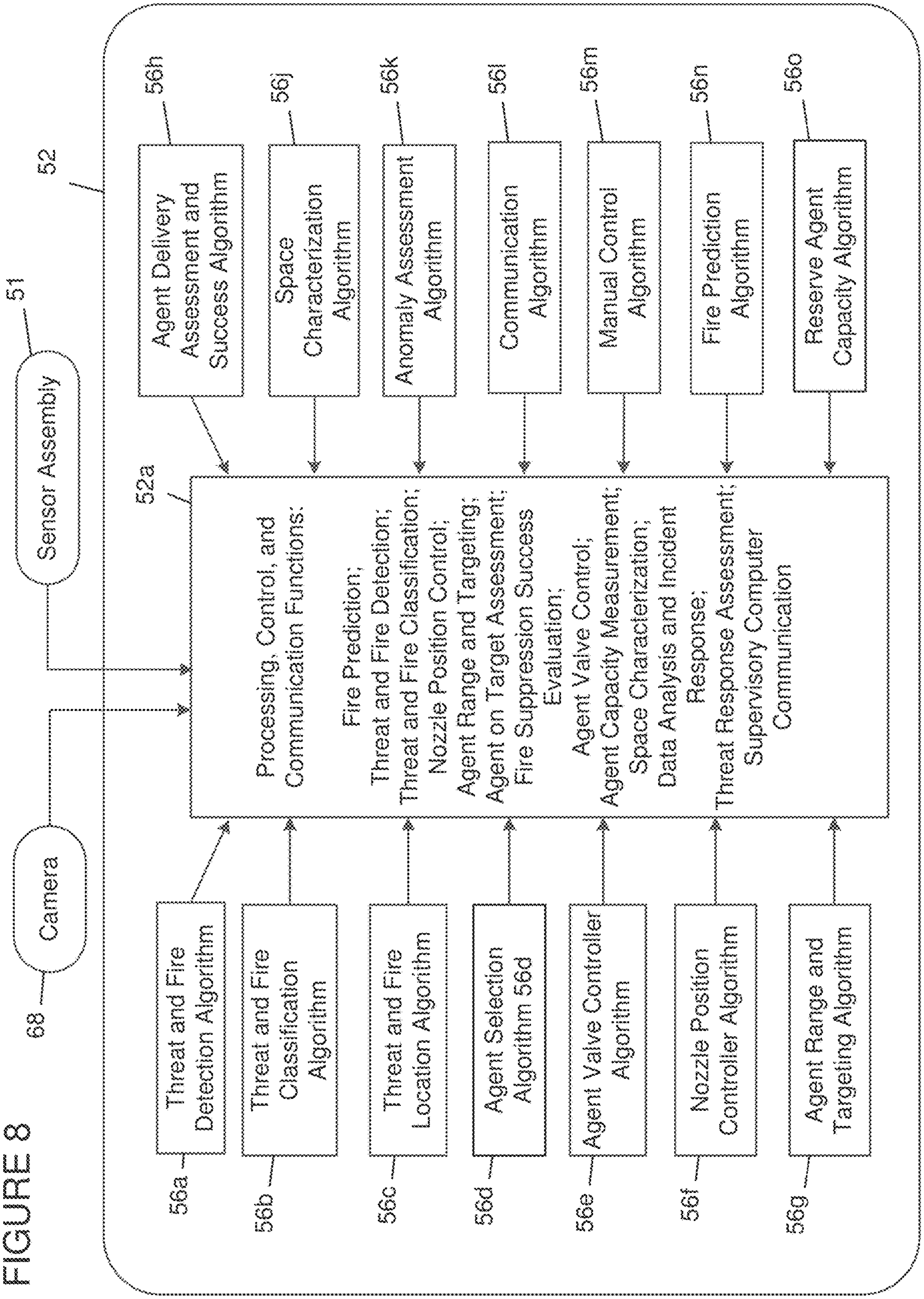
FIG. 8 is a block diagram of the processor module enabling subprocesses which are facilitated by various algorithms to perform functions according to one embodiment of the system of the present invention.

Before the method of the present invention can be initialized, 110, the system components must first be present. FIG. 8 is a block diagram showing how some of the data from the sensor assembly 61 and camera 68 are integrated by the processor module 52 in order to enable the processor functions 52*a* which will be discussed below. The underlying subprocesses, which are facilitated by the algorithms 56*a*-56*o* which are used to perform those functions 52*a* are also shown. The functions performed by the processor module 52 are: threat and fire detection 52*a*, threat and fire classification 52*b*, threat and fire location 52*c*, agent selection 52*d*, agent valve control 52*e*, fire nozzle position control 52*f*, agent range and targeting 52*g*, agent delivery assessment 52*h*, success evaluation 52*i*, space characterization 52*j*, data analysis, anomaly detection, hazard probability assessment, profile deviance assessment, and incident response action 52*k*, communication 52*l*, manual control 52*m*, fire prediction 52*n*, and fire agent reserve agent capacity measurement 52*o*. The processor module contains the algorithms 56*a*-56*o* which facilitate these functions 52*a*-52*o* as previously discussed above with reference to FIG. 1.

Figure 9:
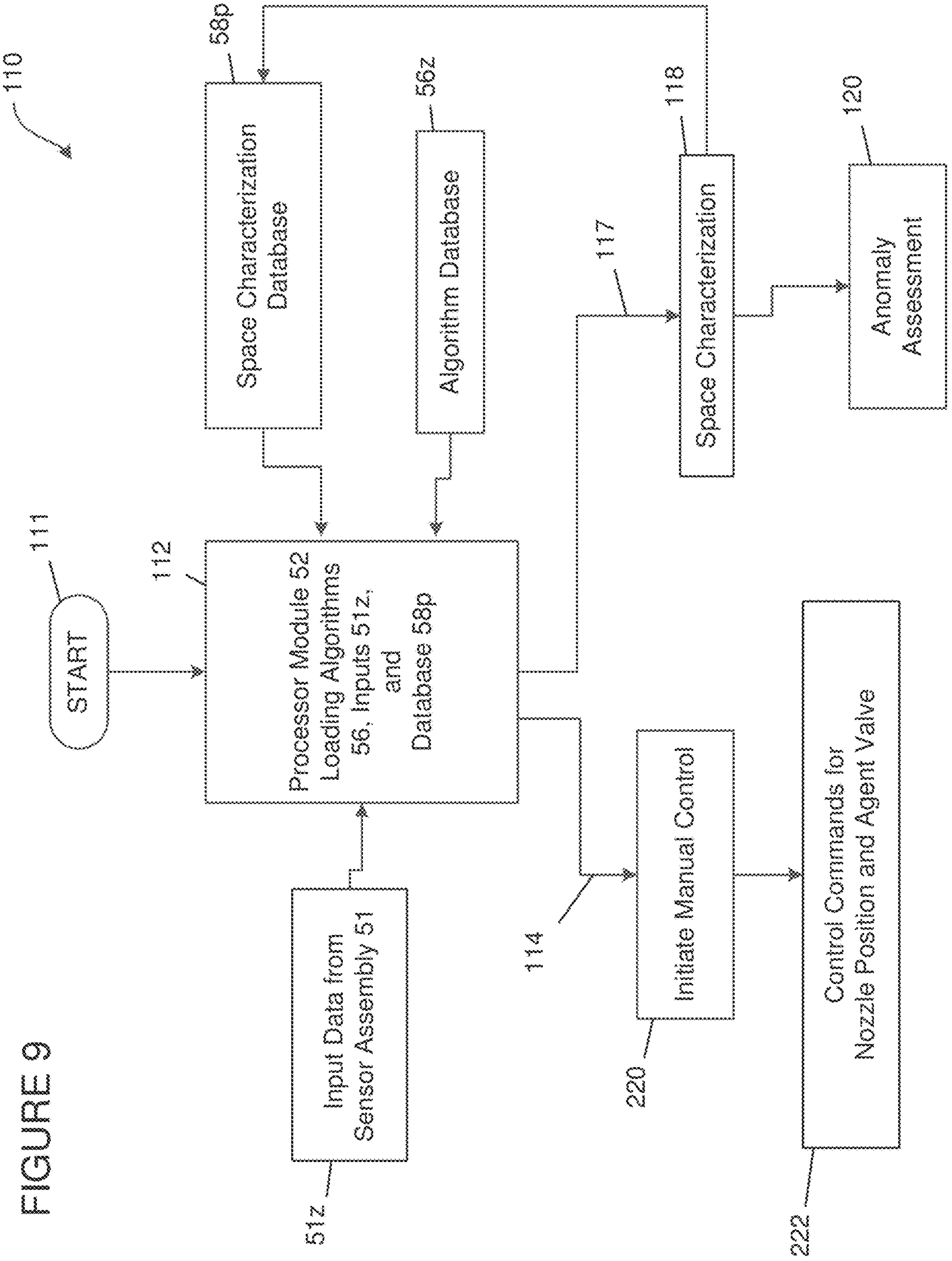
FIG. 9 is a block diagram of an overview of the interactions of the first few steps of the method shown in FIG. 7, initializing autonomous processes, initiating manual control, space characterization, and anomaly assessment.

Moving on to FIG. 9, the method is first initialized 110 by starting the system 111. The processor module 52 then loads the necessary data, subprocesses, algorithms, and inputs from the appropriate sources 112. All of the algorithms 56 are loaded from the algorithm database 56*z*. The incoming sensor data 51*z* from all of the sensors 51*a*-51*g* is loaded from the sensor assembly 51 into the processor module 52.

The processor module 52 then determines whether to proceed with the automated process 117 or to turn over control 114 to a manual operator. The method 100 begins the process to turn over control to a manual operator 114 by initiating manual control 220. Then the processor module 52 receives and sends control commands 222 to nozzle position controller subprocess, and agent valve controller subprocess.

Most often, the system will continue to operate automatically 117 and will proceed to characterize the space 118 and then to assess any potential anomalies 120. Regardless, each of these options are discussed in greater detail below.

Figure 10:
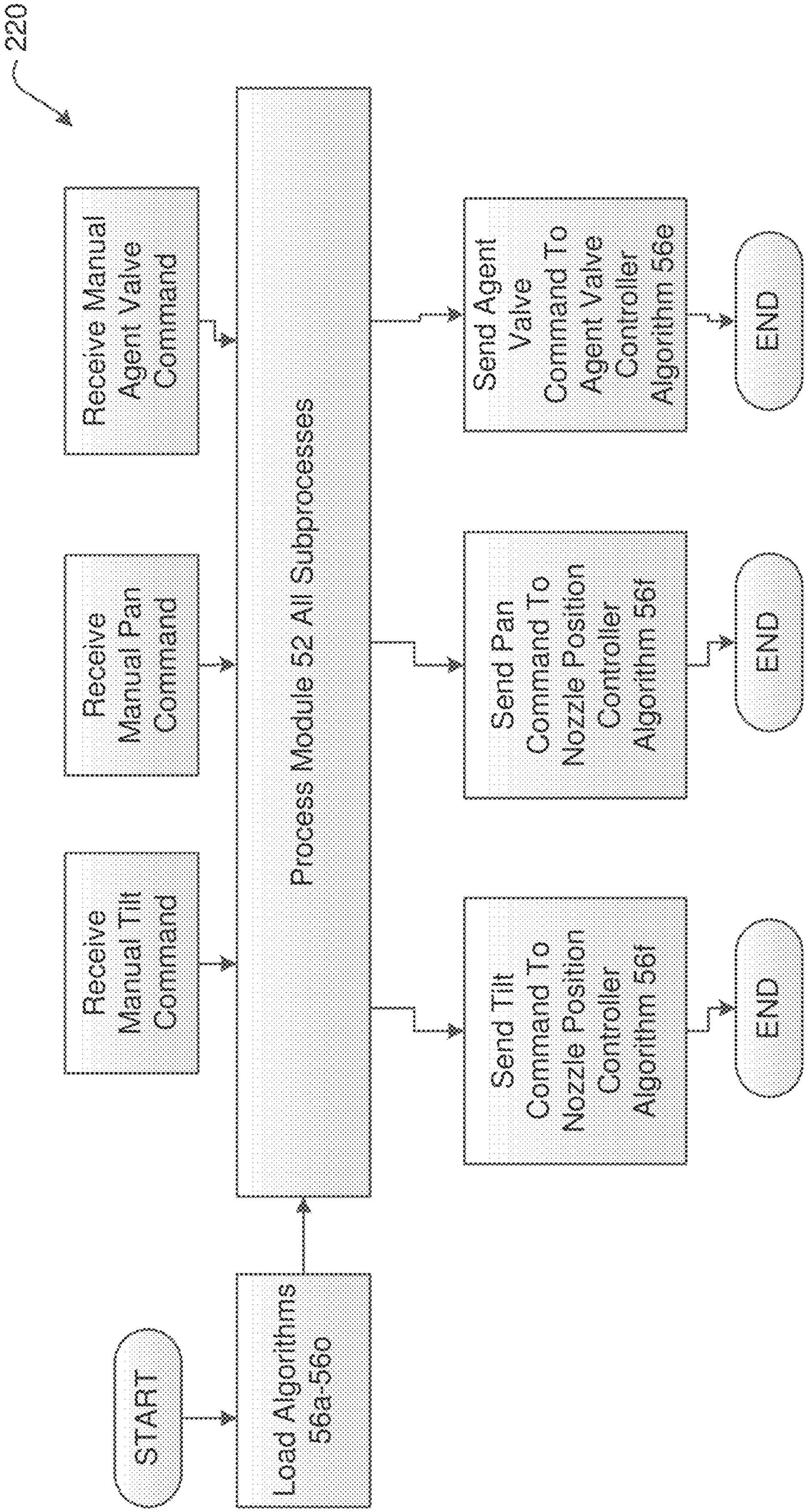
FIG. 10 shows the logic flow of the decision and process functions performed by the processor module during the manual control subprocess 220.

FIG. 10—Manual Control Subprocess 220

FIG. 10 shows the process flow diagram of the functions of the manual control subprocess 220. In this situation, the circumstances have indicated a need to turn over control to a manual operator 114. The manual control process is loaded into the processor module 52, where it is used to permit the manual operation of the agent delivery assembly 70 from a supervisory computer operator. Once indicated, the processor module 51 processor loads the subprocesses, which is facilitated by the algorithms 56*a*-56*o*, specifically, in this case, subprocess 220.

When manual operation is initiated 220, the processor module 52 receives a manual tilt command 220. The processor module 52 sends the tilt command to the nozzle position controller subprocess, which is facilitated by the algorithm 56*f*. The processor module 52 receives a manual pan command 220. The processor module 52 sends the pan command to the nozzle position controller subprocess, which is facilitated by the algorithm 56*f*. The processor module 52 receives a manual agent valve command. The processor module 52 sends the agent valve command to the agent valve controller subprocess, which is facilitated by the algorithm 56*e*.

Figure 11:
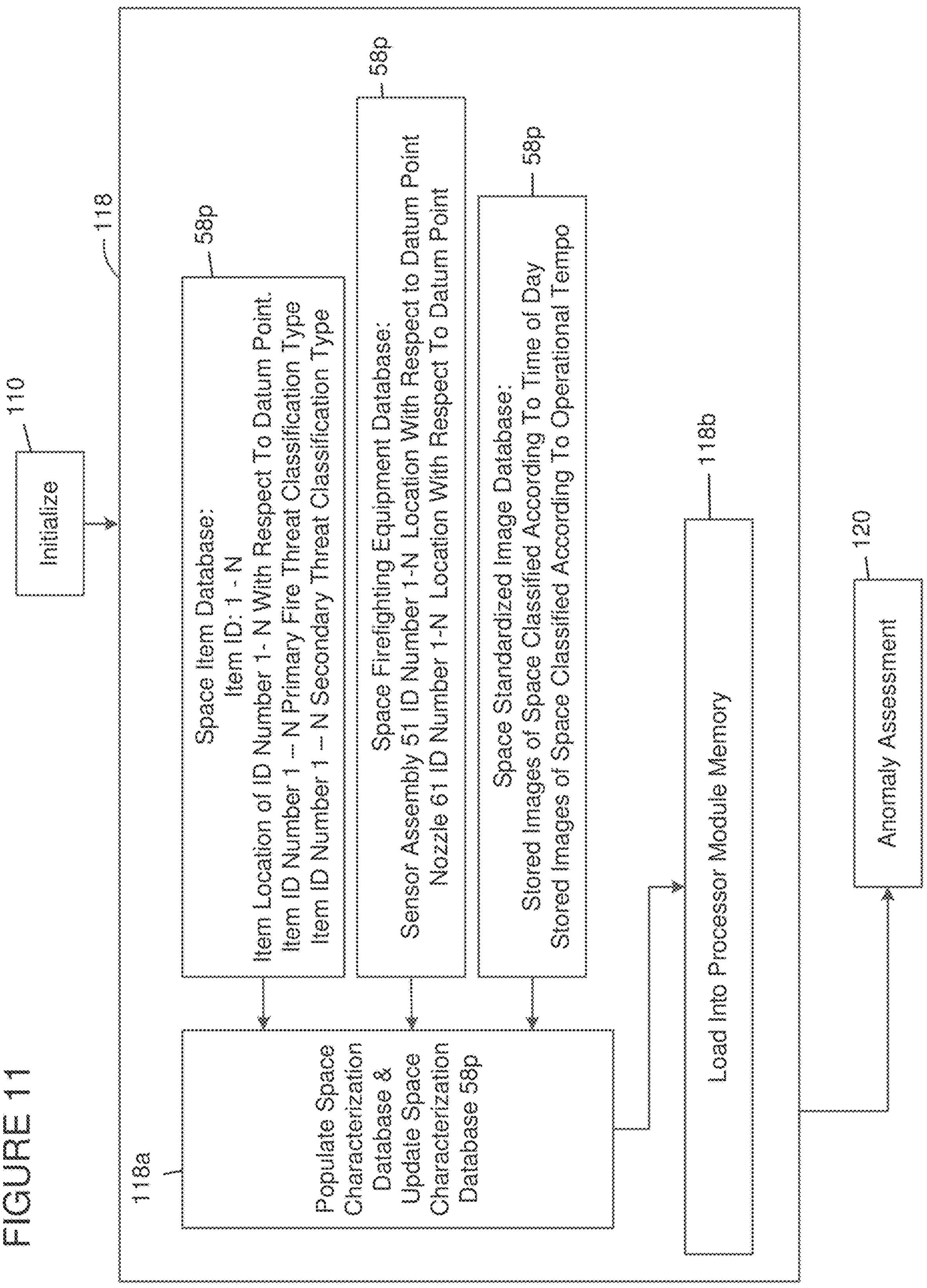
FIG. 11 shows a block diagram of the decisions performed by the processor module during the space characterization subprocess 118.

FIG. 11—Space Characterization 118

The processor module 52 loads the data provided from the space characterization database 58*p* in part of the initialization process 110. However, space characterization 118 is a subprocess of the present inventive method by itself. The processor module 52 characterizes the space for the inventive system for normal operation in various operating conditions using inputs from the sensor assembly 51 and the space characterization algorithm 56*j*.

This subprocess continuously employs the space characterization algorithm 56*j* to locate the position of the agent delivery assembly 70 and the sensor assembly 51 in the space, along with various items of significant equipment. The space characterization algorithm 56*j* utilizes information provided from a space characterization database which can also include information obtained from space drawings and manufacturers data and entered into the space characterization database by an operator.

The space characterization database 58*p* will have the positions of the agent delivery assembly 70 and the sensor assembly 51 in the space, and significant items of equipment in the space. As part of the space characterization step, the processor module 52 assigns a risk factor to the equipment related to its potential as a source of fire, and the classification of the class type of potential fire likely to be associated with the equipment. For example, if there is a significant amount of electrical equipment, an electrical fire (Class C) might be more likely. Whereas in an area with a significant amount of solvents, fuels, or cleaning fluids, a Class B type of fire might be more likely. In a space with multiple types of potential hazards, there might be multiple types of likely hazards 5, 6, 7, 8.

The space characterization subprocess, which is facilitated by the algorithm 56*j*, is used to characterize the space by recognizing fixed items in the space, as may be identified by radio frequency identification (RFID) tags, by camera image recognition, by manual input, or other means. The space characterization subprocess, which is facilitated by the algorithm 56*j*, additionally performs the computations to define nominal space characteristics for 1 or more operating conditions. The space characterization algorithm employs machine learning and other software programs to accomplish the characterization functions. This information is utilized by the processor module 52 to improve the fidelity of locating and characterizing a detected fire event in the space, and in assisting in computing the agent range and targeting subprocess, which is facilitated by the algorithm 56*g*.

FIG. 11 shows one example of the space characterization subprocess 118 employed with respect to item ID 1-N. FIG. 11 is a flow diagram of the functions of the space characterization and database subprocess, which is facilitated by the algorithm 56*j*. The space characterization database subprocess shows the database 58*p* being developed by populating a table of equipment items in a space that are assigned item id numbers.

Data entries of the table are entered by an external operation and provided to the processor module as a populated database table. Each equipment item id location is provided a location that is referenced to an established space datum point. Each equipment id is assigned a primary fire threat classification type that specifies the likely type of fire threat the equipment id represents. Each equipment id is assigned a secondary fire threat classification type that specifies the second likely type of fire threat the equipment id represents.

The space characterization database subprocess identifies the firefighting equipment in the space and identifies each sensor assembly 51 id number and the location of the sensor assembly 51 in the space in relationship to the datum point. The space characterization database subprocess identifies telerobotic fire nozzle assembly 61 id number and the location of the fire nozzle assembly 61 in the space in relationship to the datum point. The space characterization database subprocess stores images of the space that are classified according to an operational tempo and time of day database. These tables are loaded 118*b* into processor module 52 memory for use in further processing functions.

Figure 12:
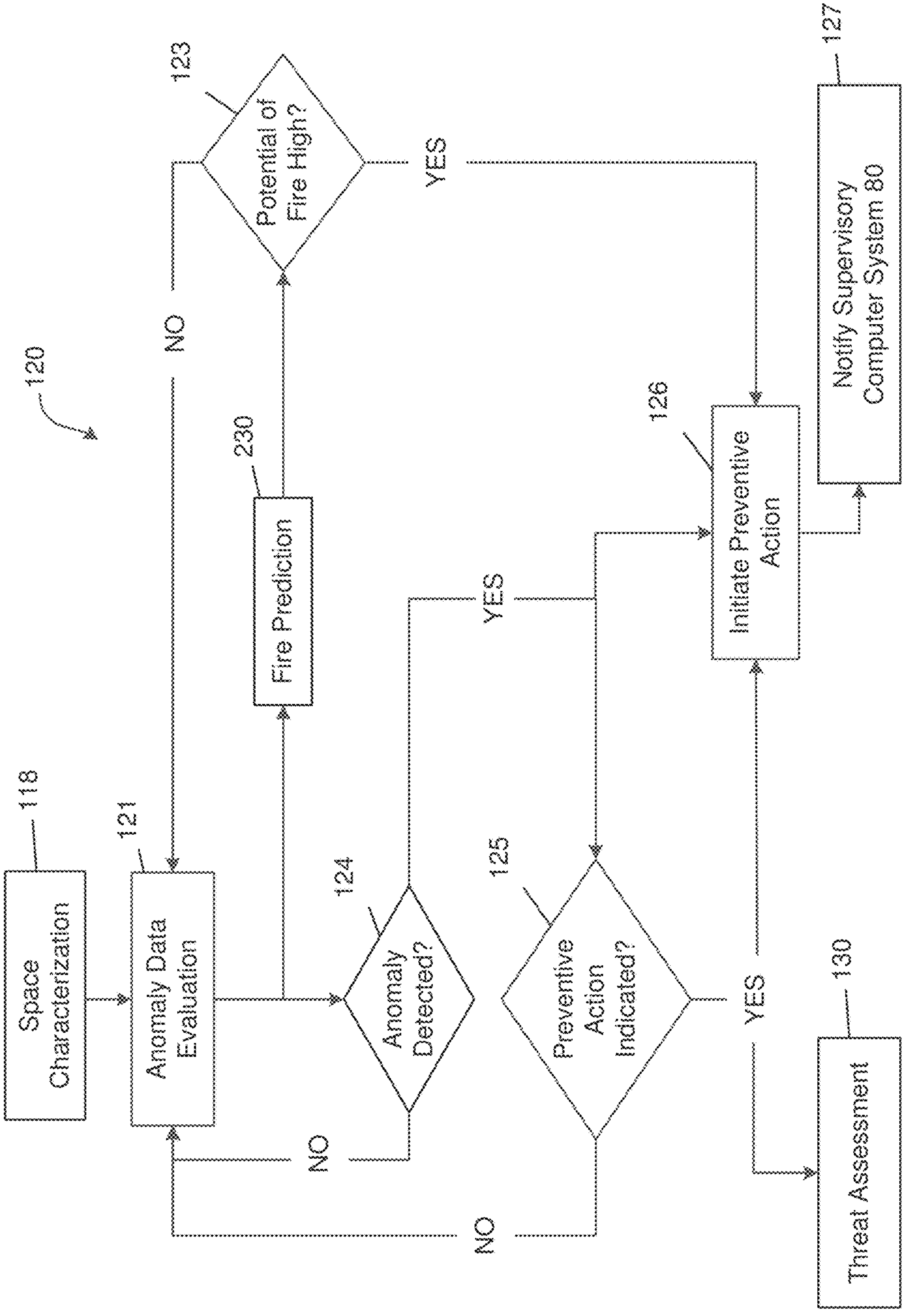
FIG. 12 is a block diagram of an overview of the interactions of the next few steps of the autonomous method shown in FIG. 7, specifically: space characterization 118, fire prediction 230, anomaly assessment 120, and threat assessment 130.
Figure 13:
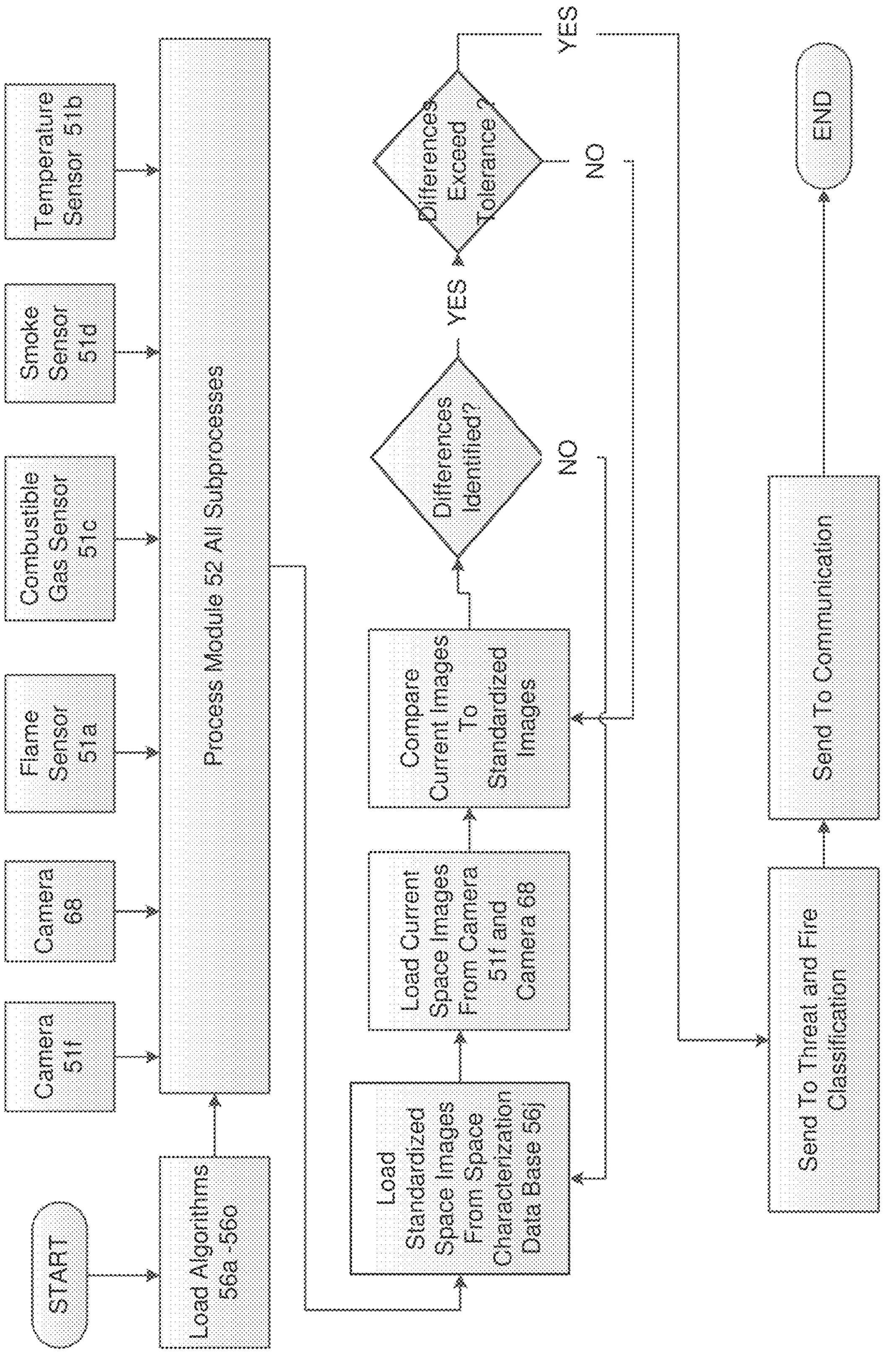
FIG. 13 shows the logic flow of the decision and process functions performed by the processor module during the anomaly assessment 120 subprocess.
Figure 14:
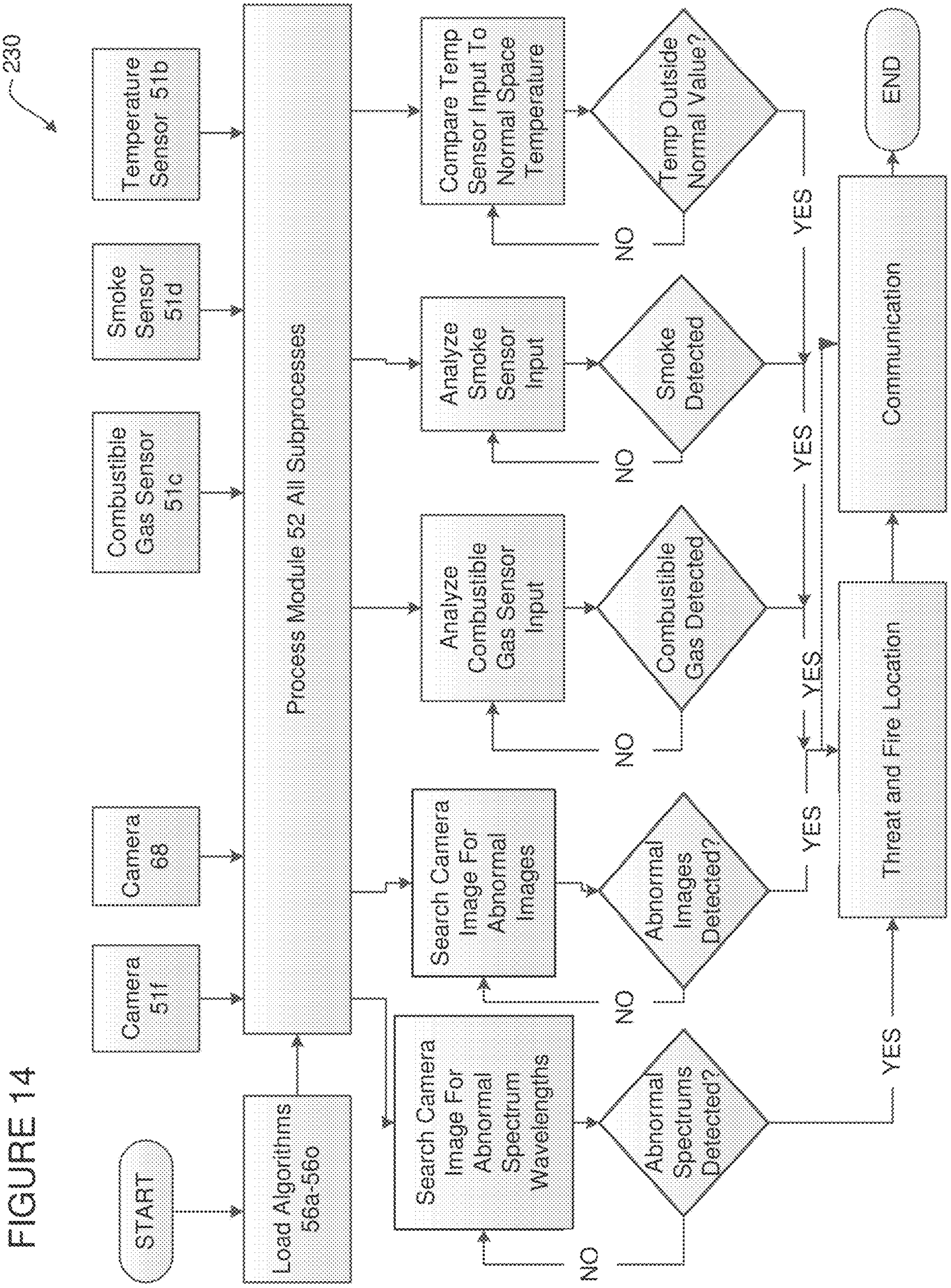
FIG. 14 shows the logic flow of the decision and process functions performed by the processor module during the fire prediction 230 subprocess.

FIGS. 12-14—Anomaly Assessment Overview

FIG. 12 is an overview of the manner in which the anomaly assessment subprocess 120 operates. The processor module 52 processes the anomaly assessment subprocess 120, which is facilitated by the anomaly assessment algorithm 56*k* to determine if an anomaly is detected in the space, and to determine if a preventive action is indicated. The anomaly assessment process could more accurately be identified as the "data analysis, anomaly detection, hazard probability assessment, and profile deviance assessment and incident response action process." This is because the anomaly assessment process is continuously analyzing the data by evaluating the data received to detect deviance from normal operational profiles. It continually provides a probability of a hazardous activity. It then continuously provides a hazard probability assessment by evaluating the potential deviance with respect to the probability of that hazardous activity. Finally, it then provides an assessment of the preferred incident response action by determining the best courses of response for any deviance detected. The process is facilitated by algorithm 56*k* which utilizes artificial intelligence reasoning and other software methodologies to accomplish these functions.

If an action is indicated, the processor module 52 initiates the process to determine the preventive action indicated and notifies the supervisory computer utilizing the communication algorithm 56*l*.

The communication algorithm 56*l* is used by the processor module 52 to assemble and format outgoing messages to the supervisory computer, and to interpret received messages from the supervisory computer. The processor module 52 continuously analyzes the data received from the sensor assembly 51 using the data analysis, anomaly detection, hazard probability assessment, and profile deviance assessment and incident response action algorithm, 56*k*.

FIG. 13—Anomaly Assessment Subprocess 120

FIG. 13 takes a closer look at the anomaly assessment process 120 by providing a decision process and flow diagram of the functions of this subprocess. Input from the camera 51*f*, camera 68, flame sensor 51*a*, combustible gas sensor 51*c*, smoke sensor 51*d*, and temperature sensor 51*b* are processed by the process module 52. The space characterization profile, made up of the standardized space images from space characterization database 58*p*, is loaded. The current space images from camera 51*f* and camera 68 are loaded. The standardized images are compared to the current space images. The process then identifies any differences between these sets of images. If there are no differences, the process simply reinitiates and continues a reiterative process of loading the images, comparing the images, and then determining if there are any differences.

If there are differences identified between the two sets of images, then the process determines the degree of difference. This degree of difference is then compared to a predetermined tolerance level. If the degree of difference does not exceed the predetermined tolerance level then the process simply reinitiates and continues the reiterative process of determining the degrees of difference, comparing the difference with the tolerance levels, and then determining if the degree of difference exceeds the predetermined tolerance level. If the degree of difference ever exceeds the predetermined tolerance level then the data is sent on to be further evaluated by the threat and fire classification subprocess, and then sent on to the communications subprocess.

FIG. 14—Fire Prediction 230

The fire prediction subprocess of the processor module 52 continuously monitors and assesses conditions relative to a probable fire event. FIG. 14 is a closer look at the fire prediction subprocess 230, and provides the decision process flow diagram of the functions of the fire prediction subprocess, which is facilitated by the algorithm 56*n*. The processor module 52 loads the subprocess, which is facilitated by the algorithms 56*a*-56*o*. The processor module 52 receives input from the camera 51*f*, camera 68, combustible gas sensor 51*c*, the smoke sensor 51*d* and the temperature sensor 51*b*.

The processor module 52 analyzes the camera 51 and camera 68 images for abnormal spectrum wavelengths. The processor module 52 provides abnormal wavelengths detected information to the threat and fire location subprocess, which is facilitated by the algorithm 56*b* and the communication subprocess, which is facilitated by the algorithm 56*l*. The processor module 52 analyzes the camera 51 and camera 68 images for abnormal images. The processor module 52 provides abnormal image information to the threat and fire location subprocess, which is facilitated by the algorithm 56*b* and the communication subprocess, which is facilitated by the algorithm 56*l*. The processor module 52 analyzes the combustible gas sensor 51*c* input for the presence of combustible gas.

The processor module 52 provides the presence of combustible gas to the threat and fire location subprocess, which is facilitated by the algorithm 56*b* and the communication subprocess, which is facilitated by the algorithm 56*l*. The processor module 52 analyzes the smoke sensor 51*d* input for the presence of smoke. The processor module 52 provides the presence of smoke to the threat and fire location subprocess, which is facilitated by the algorithm 56*b* and the communication subprocess, which is facilitated by the algorithm 56*l*. The processor module 52 analyzes the temperature sensor 51*b* sensor for the presence of rising or excessive temperatures. The processor module 52 provides the rising temperature or excessive temperature information to the threat and fire location subprocess, which is facilitated by the algorithm, and to the communication subprocess, which is facilitated by the algorithm 56*l*.

Figure 15:
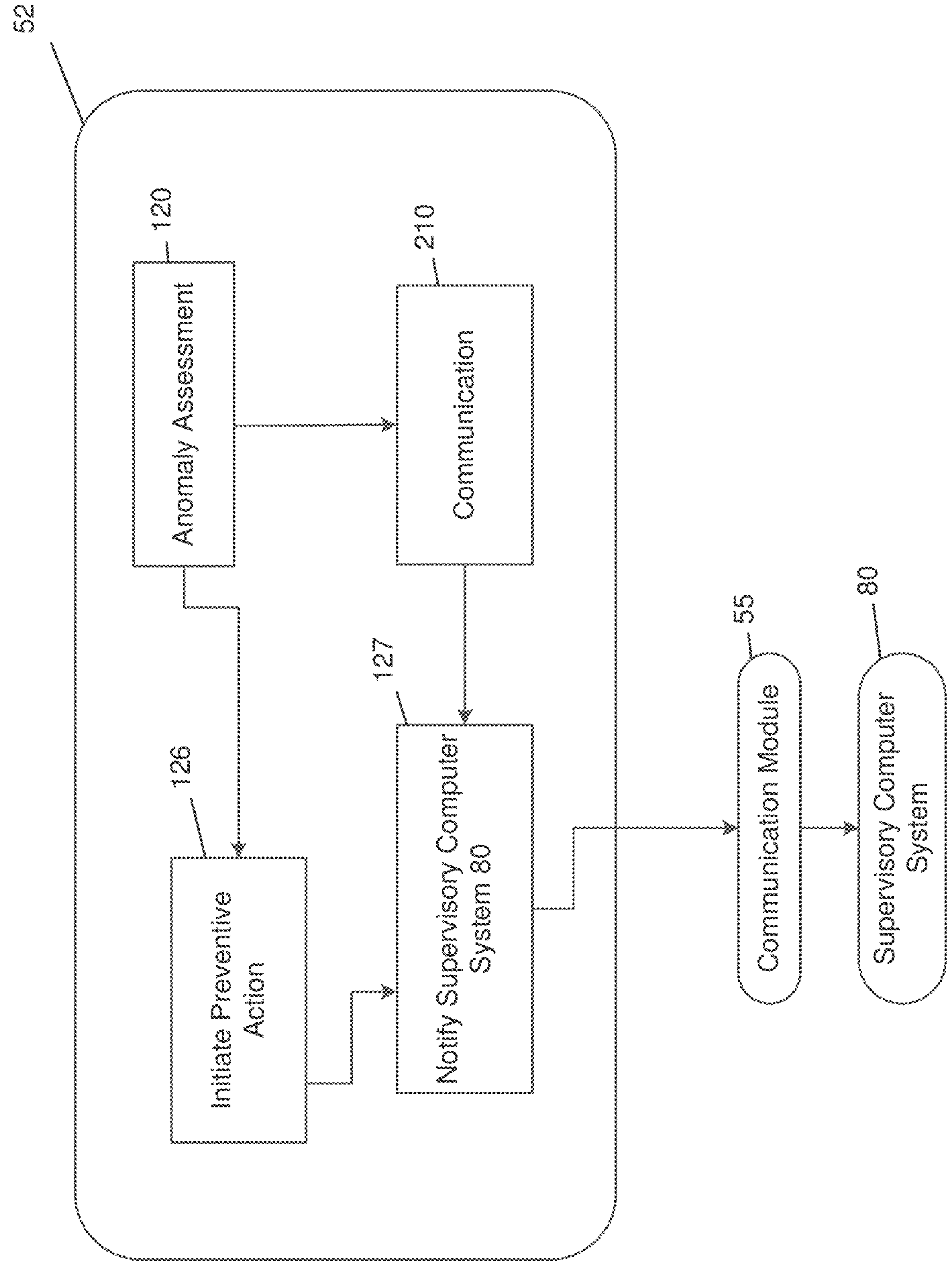
FIG. 15 is a block diagram of an overview of the interactions of the next few steps of the autonomous method shown in FIG. 7, specifically: initiating preventative action 126, anomaly assessment 120, and communication 210.
Figure 16:
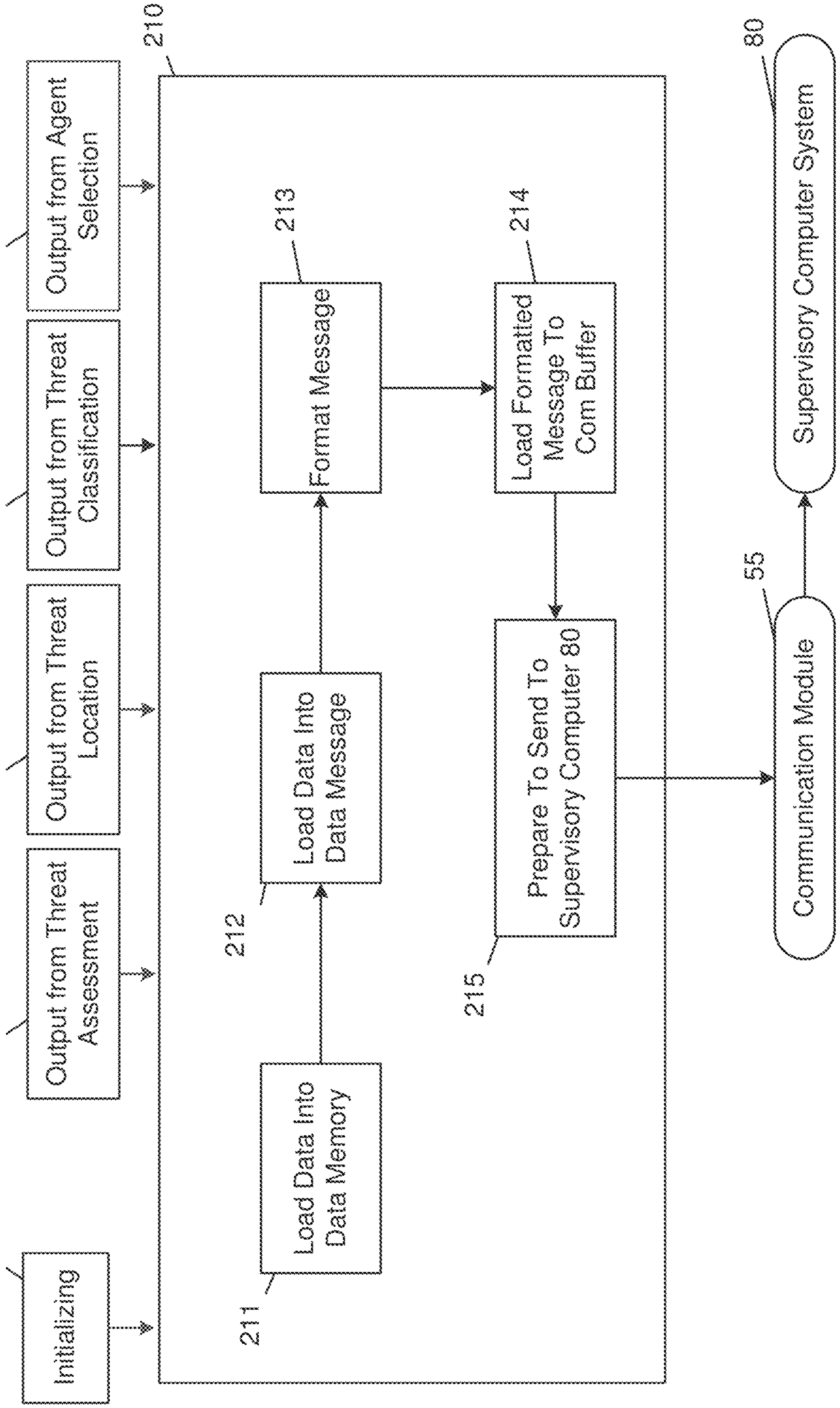
FIG. 16 shows the logic flow of the decision and process functions performed by the processor module during the communication 210 subprocess.

FIGS. 15-16—Communication 210

At several stages, the present inventive method calls for the communication subprocess 210. FIG. 15 diagrammatically shows that if the potential of a fire is high during the step of anomaly assessment 120, it is necessary to initiate preventative action 126, which may also include, or be in addition to initiating the communication subprocess 210. This is also true for later subprocess, for example, upon locating the threat and or fire event in the space in subprocess 140, the processor module 52 also notifies the supervisory system 80 utilizing the communication interface module 55 and the communication subprocess 210.

FIG. 16—Communication Subprocess

FIG. 16 takes a closer look at the communication subprocess 210, by providing the process flow diagram of the functions of the communication subprocess, which is facilitated by the algorithm 56*l*. As shown, the processor module 52 first loads the subprocess, which is facilitated by the algorithms 56*a*-56*o* during the initializing subprocess 110.

While only the output from four subprocesses are shown, namely, output from threat assessment 130, output from threat location 140, output from threat classification 150, and output from agent selection 160, the communications process 210 in the processor module 52 may receive input from all the subprocesses of the present invention. When the data (output/input) is received, the processor module 52 loads the data into the data memory 211. The processor module 52 loads the data from the data memory into a data message 212. The processor module 52 loads the data from the data message 212 into format a message. The processor module 52 loads the formatted message to the communication buffer. The processor module 52 sends the formatted message to the supervisory computer 80.

Figure 17:
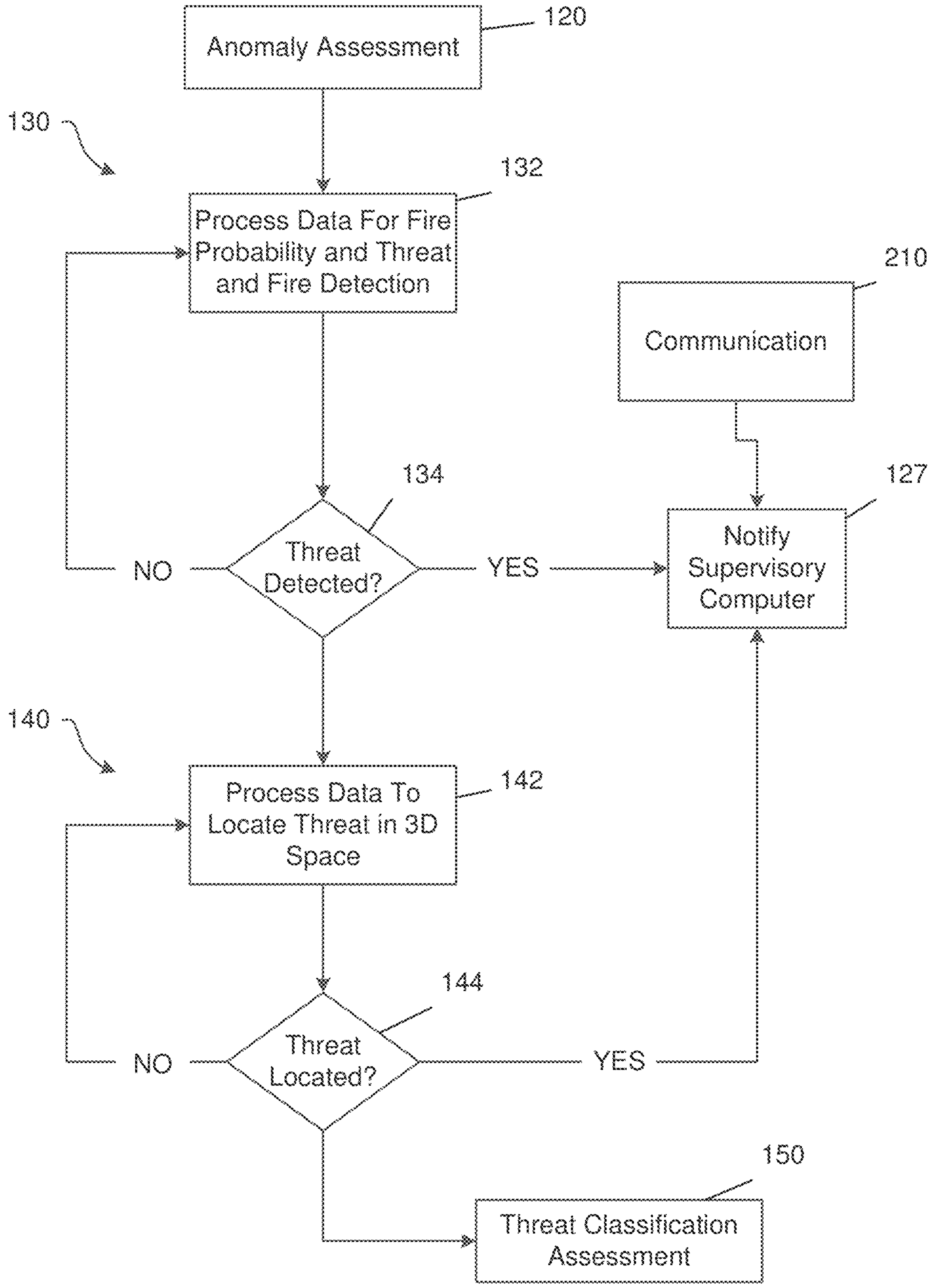
FIG. 17 is a block diagram of an overview of the interactions of the next few steps of the autonomous method shown in FIG. 7, specifically: initiating preventative action 126, anomaly assessment 120, threat event assessment 130, threat location 140, and threat classification 150.
Figure 18:
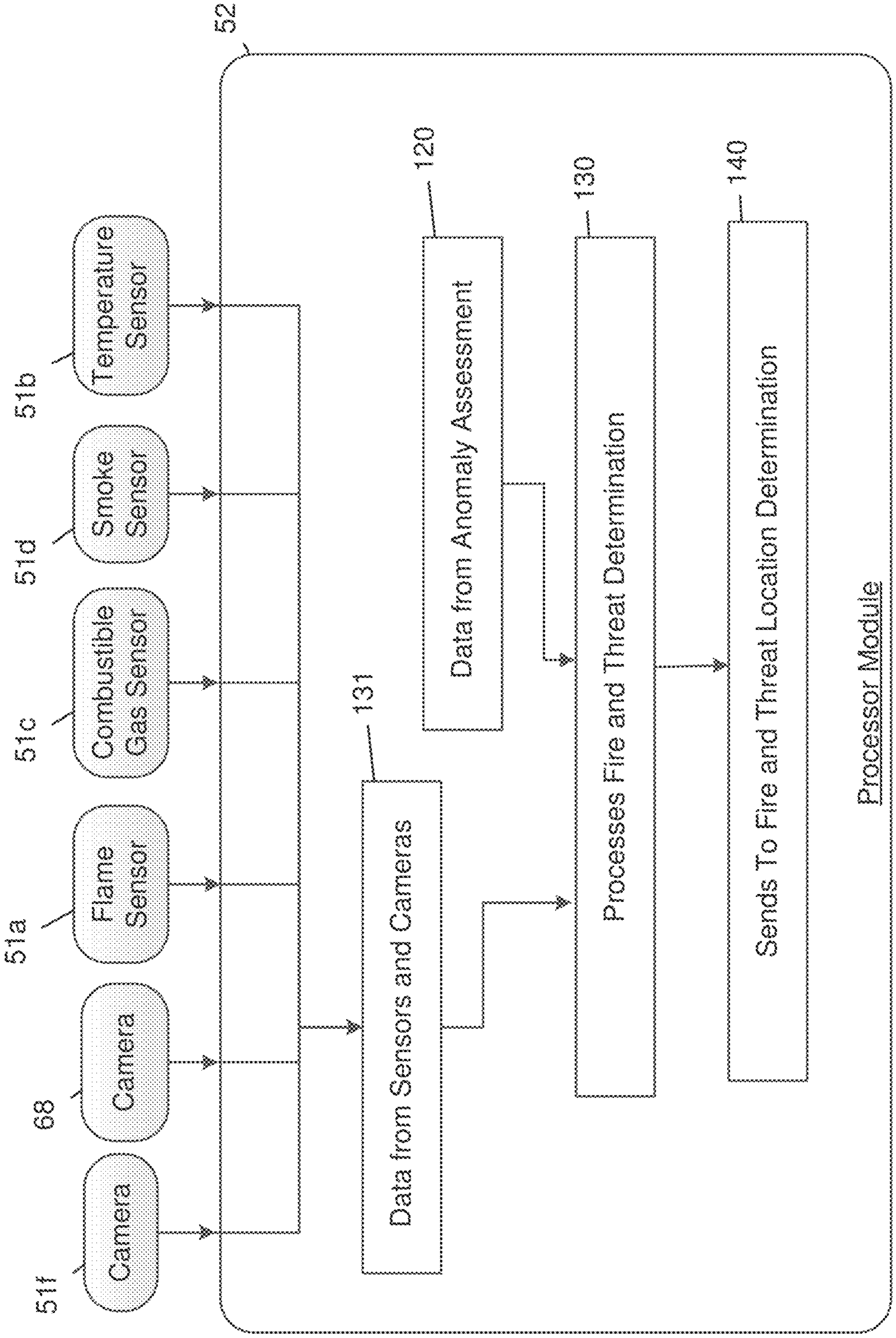
FIG. 18 shows the data input and logic flow of the decision and process functions performed by the processor module during the anomaly assessment 120, threat event assessment 130, and threat location 140 subprocesses.
Figure 19:
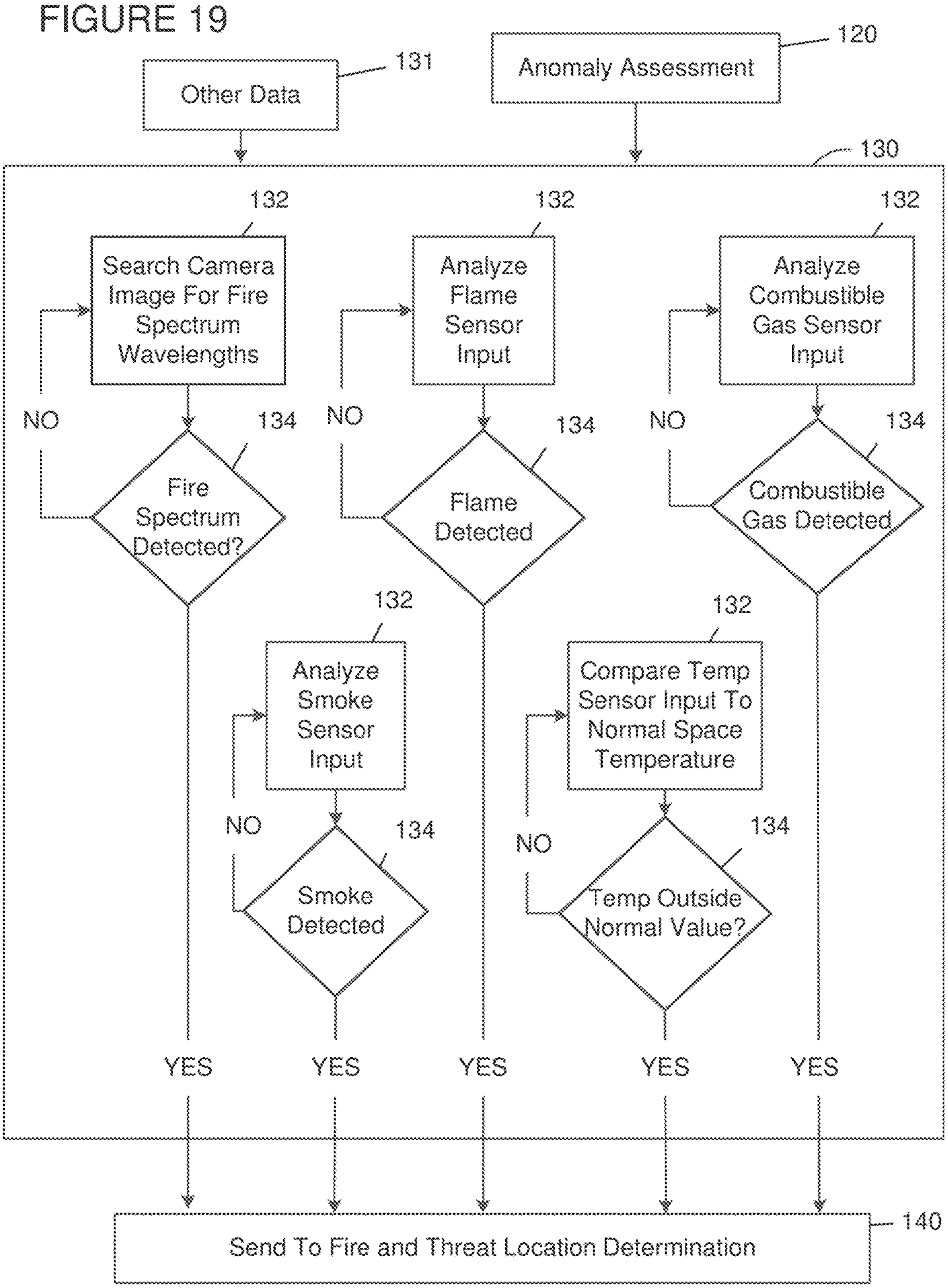
FIG. 19 shows the logic flow of the decision and process functions performed by the processor module during the threat event assessment 130 steps.

FIGS. 17-19 Threat Detection and Location Subprocesses 130, 140

FIG. 17 provides a diagrammatical overview of the interactions between the anomaly assessment subprocess 130, the threat detection subprocess 130, the threat location subprocess 140, and the threat classification subprocess 150 according to the present inventive method.

FIGS. 18-19—Threat and Fire Detection Subprocess 130

The processor module 52 utilizes the inputs from the sensor assembly 51 to continuously search for the presence of a threat, fire event, or the probability of a fire event. The processor module 52 processes the data received from multiple sources to determine the probability of fire or threat, facilitated by the threat and fire detection algorithm 56*a*. Note that while the present invention description sometimes differentiates between an impending threat event, an impending fire event, an existing threat event, and an existing fire event, the term threat event is also used generally to refer generally to each of these, and is distinguished only by circumstances from when the event is a nonthreat event, aka, the sensor picked up an event that was neither a threat, nor a fire, and is thus disregarded by the anomaly assessment subprocess 130.

The processor module 52 utilizes inputs from the flame detection sensor 51*a* to detect presence of a flame, from the temperature sensor 51*b* to measure the space temperature and determine if the temperature has elevated above preset values, or is experiencing a rapid rate of temperature increase; from the smoke detection sensor 51*d* to determine if smoke is present in the space; from the combustible gas detection sensor(s) 51*c*, to determine if combustible gases are present, and to evaluate the rate of increase of these values, indicating the potential for a fire or other explosive event; from the infrared spectrum sensors 51*e*, to determine if a fire is present; and from the camera sensors 51*f*, to determine if a threat, fire image, or telltale signature of an undesirable anomaly is present.

FIGS. 18-19 provide the decision process flow diagram of the functions of the threat and fire detection subprocess according to the present invention. This subprocess is facilitated by the threat and fire detection algorithm 56*a* in the processor module 52. As illustrated in FIG. 18, the processor module processor receives input from the camera 51*f*, the camera 68, the flame sensor 51*a*, the combustible gas sensor 51*c*, the smoke sensor 51*d*, the temperature sensor 51*b*, and loads the algorithms 56*a*-56*o*.

Processor module 52 processes the camera image 51*f*, 68 for the presence of fire spectrum wavelengths. If fire spectrum wavelengths are identified the processor module 52 forwards the identification information to the fire and threat location algorithm 56*b* and sends the information to the communication subprocess, which is facilitated by the algorithm 56*l*. If no fire spectrum wavelengths are identified, the processor module 52 re-processes camera images for fire spectrum wavelengths. Processor module 52 processes the flame sensor 51*a* input for the detection of the presence of a flame.

If the presence of a flame is detected, the processor module 52 forwards the identification information to the fire and threat location subprocess, which is facilitated by the algorithm 56*b* and sends the information to the communication subprocess, which is facilitated by the algorithm 56*l* if no flames are identified, the processor module 52 re-processes flame sensor 51*a* input for the presence of a flame.

Processor module 52 processes the smoke sensor 51*d* input for the detection of the presence of smoke. If the presence of smoke is detected, the processor module 52 forwards the identification information to the fire and threat location subprocess, which is facilitated by the algorithm 56*b* and sends the information to the communication subprocess, which is facilitated by the algorithm 56*l* if no smoke is identified, the processor module 52 re-processes smoke sensor input for smoke detection. Processor module 52 processes the combustible gas sensor 51*c* input for the detection of the presence of combustible gas. If the presence of combustible gas is detected, the processor module 52 forwards the identification information to the fire and threat location subprocess, which is facilitated by the algorithm 56*b* and sends the information to the communication subprocess, which is facilitated by the algorithm 56*l* if no combustible gas is identified, the processor module 52 re-processes combustible gas sensor 51*c* input for combustible gas detection.

Processor module 52 processes the temperature sensor 51*b* input for the space temperature measured and compares the measured temperature to the standard space temperature values stored in the space characterization database subprocess, which is facilitated by the algorithm 56*j*. If the temperature measured is outside the standard space temperature values stored in the space characterization database subprocess, which is facilitated by the algorithm 56*j*, the processor module 52 forwards the identification information to the fire and threat location subprocess, which is facilitated by the algorithm 56*b*, and sends the information to the communication subprocess, which is facilitated by the algorithm 56*l* if no the temperature measured is within the normal space temperature values as stored in the space characterization database subprocess, which is facilitated by the algorithm 56*j*, the processor module 52 re-processes the temperature sensor 51*b* inputs.

Figure 20:
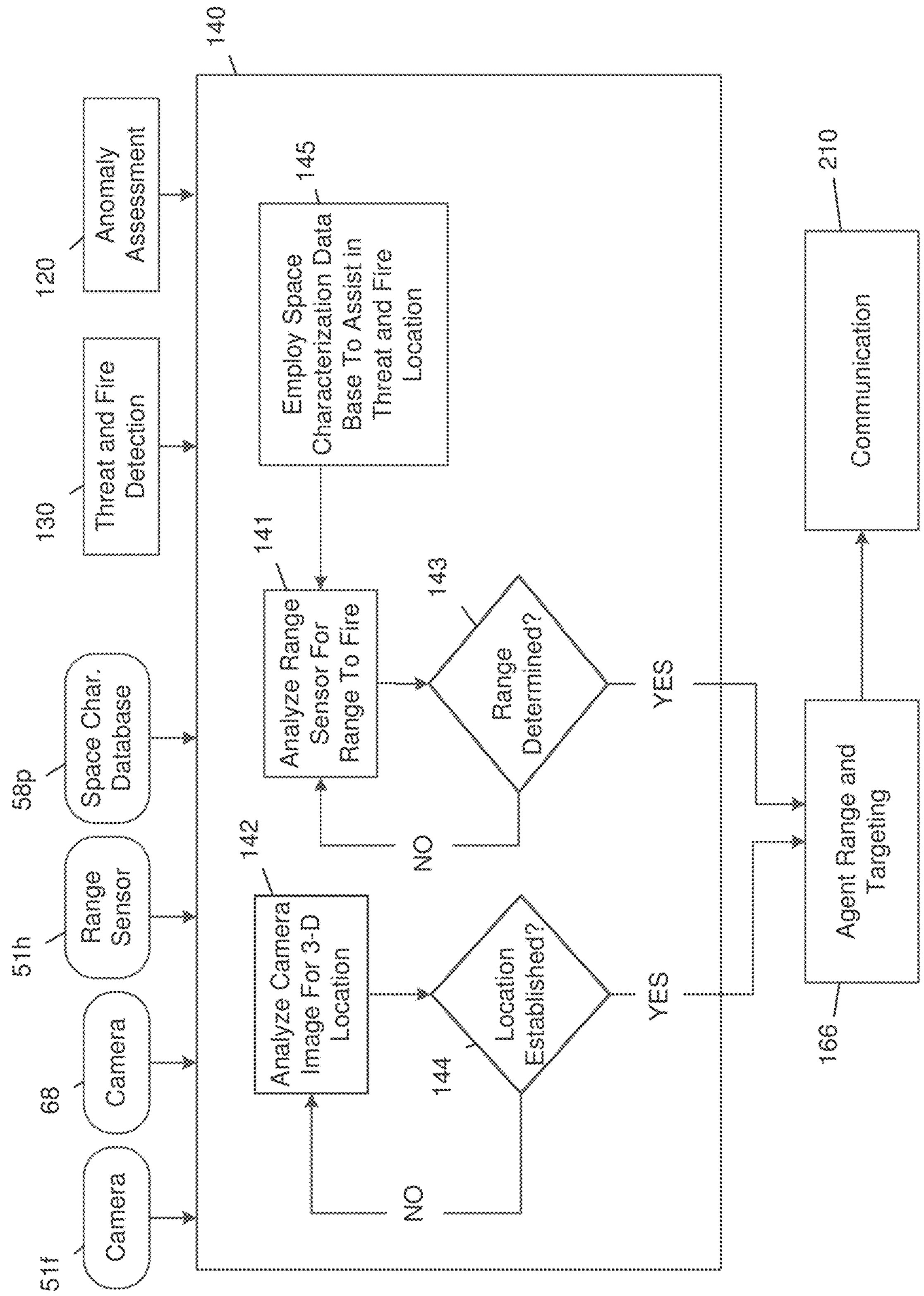
FIG. 20 shows the logic flow of the decision and process functions performed by the processor module during the threat location subprocess 140.

FIG. 20—Threat and Fire Locating Subprocess 140

Upon the detection of a threat or fire event, or the probability of a fire event, the processor module 52 loads the threat and fire location subprocess 140 to determine the location of the threat and or fire event in the space. The processor module 52 utilizes inputs from the sensor assembly 51 and the camera 68, and the space characterization algorithm 56*j* to determine the location.

FIG. 20 provides more details about the threat and fire location subprocess 140, showing the decision process flow diagram of the functions of the threat and fire location subprocess, which is facilitated by the algorithm 56*c*. The processor module 52 receives input from the camera 51*f*, the camera 68, the range sensor 51*h*, and loads the subprocess, which is facilitated by the algorithms 56*a*-56*o*. The processor module 52 utilizes the space characterization database 56*j* to determine the location of a possible fire in the space, and in determining the distance from the fire location to the nozzle 61 locations in the space.

The processor module 52 analyzes the camera 51*f* and camera 68 images to determine the location of the fire in 3-d space. The established location is used by the agent range and targeting subprocess, which is facilitated by the algorithm 56*h*. The processor module 52 employs the input from the range sensor 51*h* to determine the distance from the nozzle 51 locations to the fire. The established distance is used by the agent range and targeting subprocess, which is facilitated by the algorithm 56*h*. The processor module 52 sends the fire location and the range to the fire from the nozzle 61 locations to the communication subprocess, which is facilitated by the algorithm 56*l*.

Figure 21:
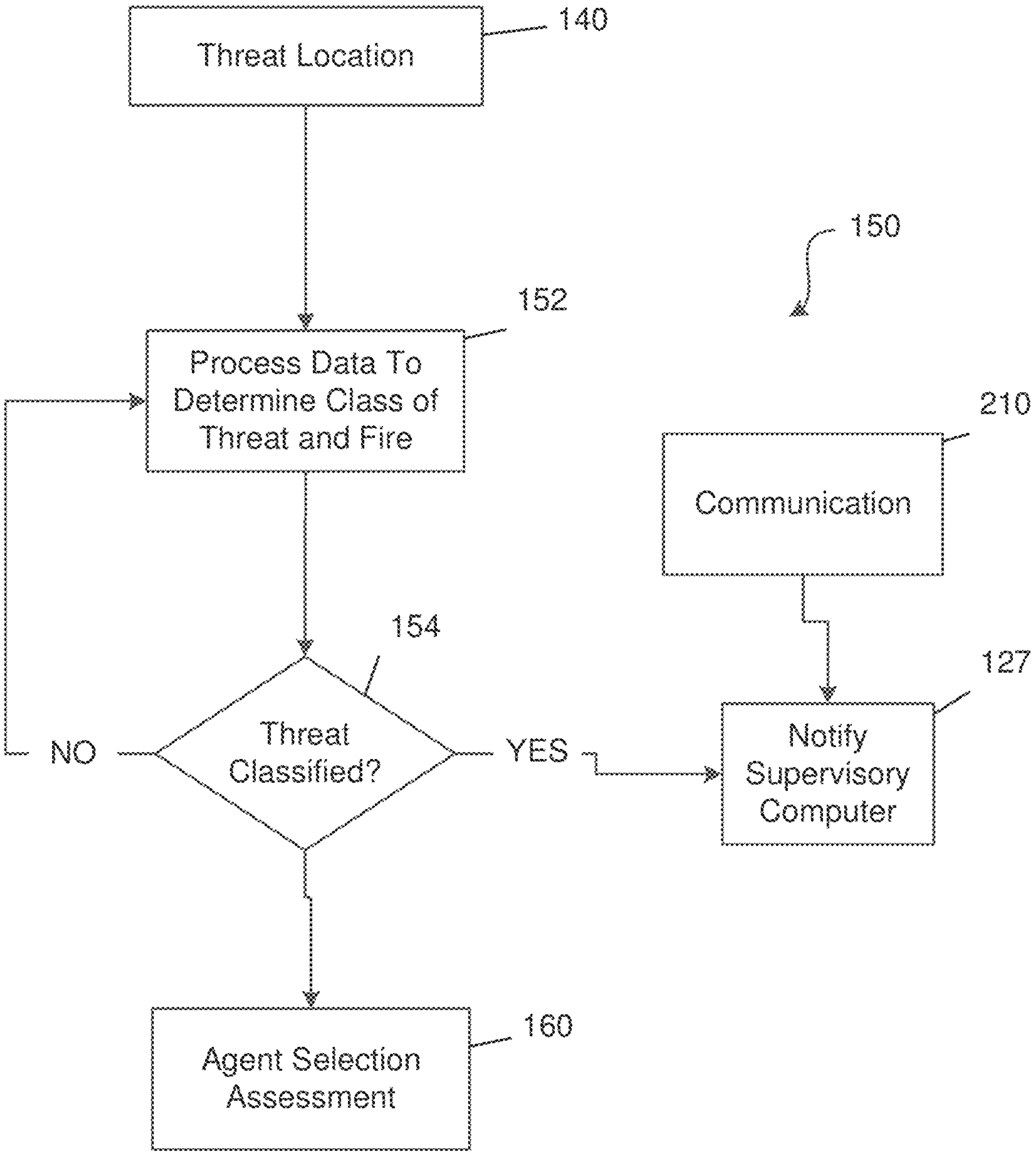
FIG. 21 is a block diagram of an overview of the interactions of the next few steps of the autonomous method shown in FIG. 7, specifically: threat location 140, threat classification 150, and agent selection 160.
Figure 22:
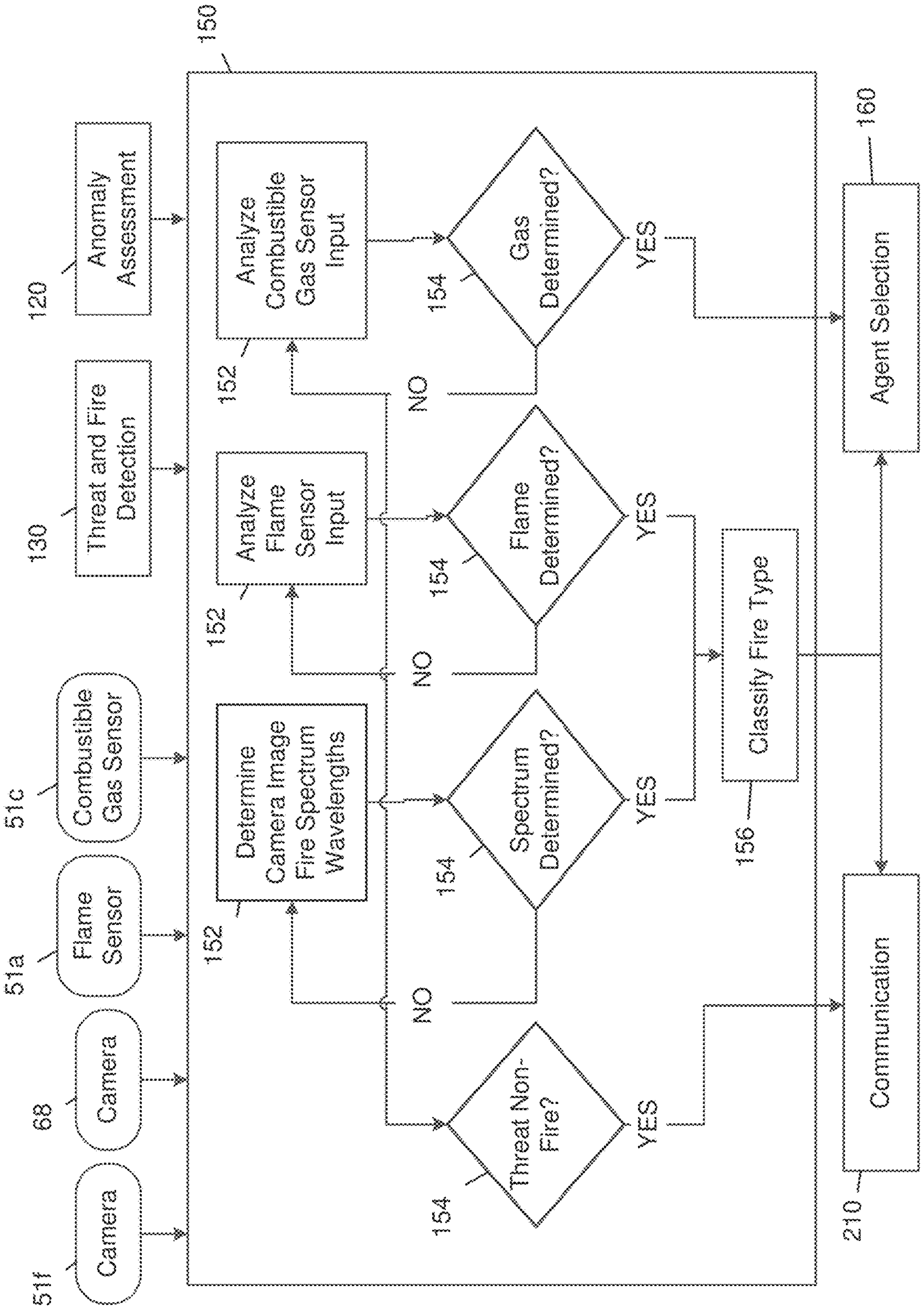
FIG. 22 shows the logic flow of the decision and process functions performed by the processor module during the threat classification assessment 150.

FIGS. 21-22—Threat and Fire Classification 150

The processor module 52 loads the threat and fire classification subprocess 150 to determine the type of threat and or the class of fire detected. The processor module 52 processes the threat and fire classification algorithm 56*b* if the threat and fire detection algorithm 56*a* detects an event. The threat and fire classification algorithm 56*b* is employed by the processor module 52 which receives input from the infrared spectrum sensors 51*e*, and the camera sensors 51*f*, and the camera 68, to determine the type of threat or fire event. This threat and fire classification algorithm 56*b* will also use information from the threat and fire location algorithm 56*c*, and the space characterization algorithm 56*j* to aid in this classification.

As an example, if a fire event is detected, and the information from the threat and fire location algorithm 56*c* locates the fire in the area surrounding an electrical switchboard, the threat and fire classification algorithm 56*b* will use this information along with information from the infrared spectrum sensors 51*e*, and the camera sensors 51*f* and camera 68 in classifying the type of fire, and to determine the probability the fire event is a Class C (electrical) fire. This information will be employed by the processor module 52 to determine which agent to utilize in the threat response action.

It is noted that the US classification schema is adhered to in this description so that the other classification categories include: Class A (combustibles); Class B (flammable gases and liquids, fuels); Class C (electrical); Class D (combustible metals); and Class K (cooking oils).

FIG. 22 shows further details of the threat and fire classification subprocess, by providing the decision process flow diagram of the functions of the threat and fire classification subprocess. In this process, the processor module 52 receives input from the camera 51*f*, the camera 68, the flame sensor 51*a*, the combustible gas sensor 51*c*, the output from the threat and fire detection subprocess, which is facilitated by the algorithm 56*a*, and the output from the anomaly assessment subprocess, which is facilitated by the algorithm 56*k*, and loads the subprocess, which is facilitated by the algorithms 56*a*-56*o*.

Processor module 52 processes the camera images to determine the fire spectrum wavelengths. If fire spectrum wavelengths are determined the processor module 52 determines the classification of the fire type, and sends this information to the agent selection subprocess, which is facilitated by the algorithm 56*d*. If the fire spectrum is not determined, the processor module 52 reprocesses the camera image to determine the fire spectrum of the image.

If the fire spectrum is not identified, the processor module 52 determines if the threat is not a fire threat, and forwards that information to the communication subprocess, which is facilitated by the algorithm 56*l*. Processor module 52 process the flame sensor 51*a* input to determine the fire spectrum wavelengths. If fire spectrum wavelengths are determined the processor module 52 determines the classification of the fire type and sends this information to the agent selection subprocess, which is facilitated by the algorithm 56*d*.

If the fire spectrum is not determined, the processor module 52 reprocesses the flame sensor 51*a* input to determine the fire spectrum of the sensor data. If the fire spectrum is not identified, the processor module 52 determines if the threat is not a fire threat, and forwards that information to the communication subprocess, which is facilitated by the algorithm 56*l*. Processor module 52 processes the combustible gas sensor 51*c* input to determine the type of combustible gas. If combustible gas is detected the processor module 52 determines the combustible gas type and sends this information to the agent selection subprocess, which is facilitated by the algorithm 56*d*. If the combustible gas type is not determined, the processor module 52 reprocesses the combustible gas sensor 51*c* input to determine the combustible gas type. If the combustible gas type is not identified, the processor module 52 determines if the threat is not a combustible gas threat, and forwards that information to the communication subprocess, which is facilitated by the algorithm 56*l*.

Figure 23:
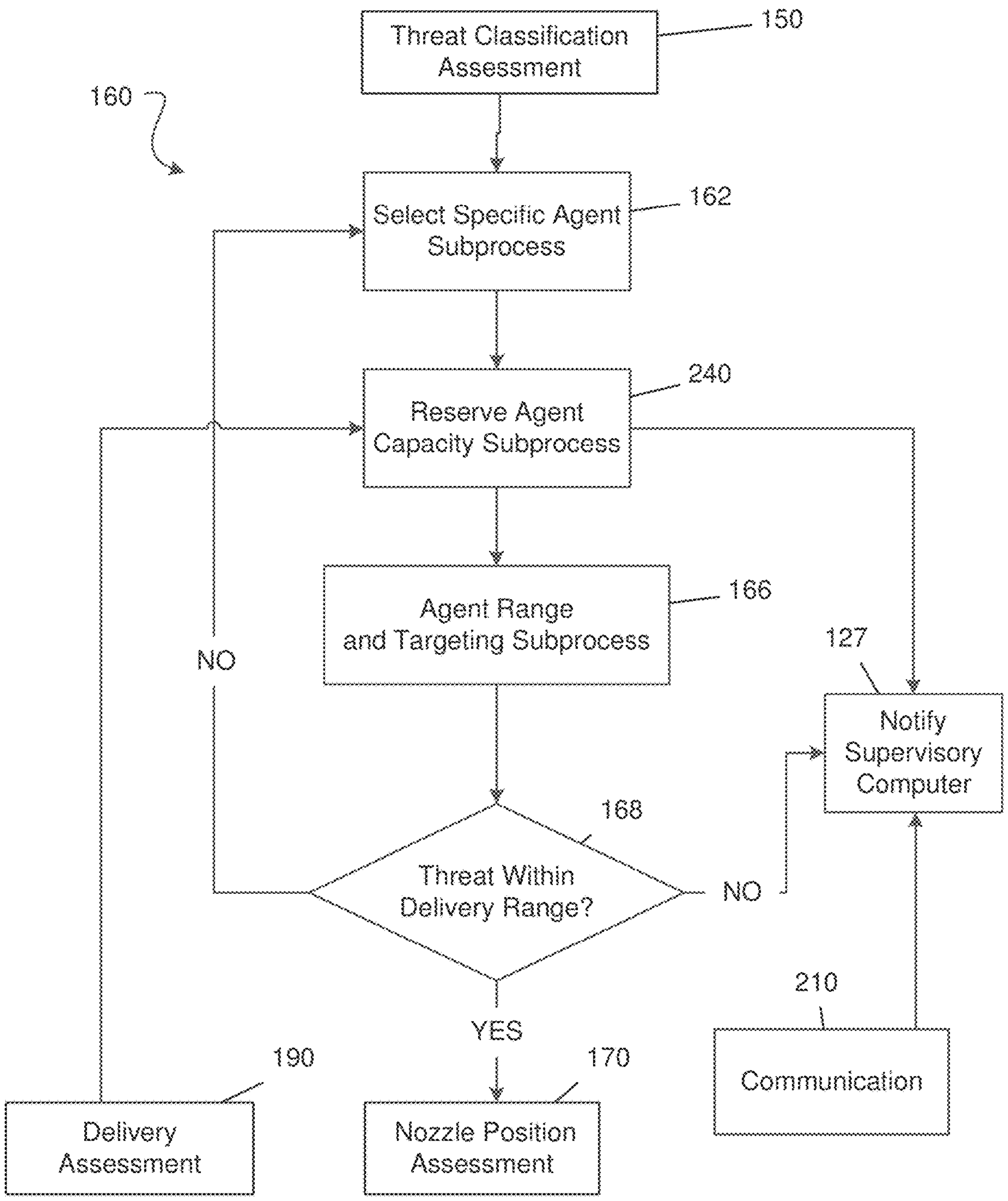
FIG. 23 is a block diagram of an overview of the interactions of the next few steps of the autonomous method shown in FIG. 7, specifically: threat classification 150, agent selection 160, reserve agent capacity 240, agent range and targeting 166, delivery assessment 190, communication 210, and nozzle position assessment 170.
Figure 24:
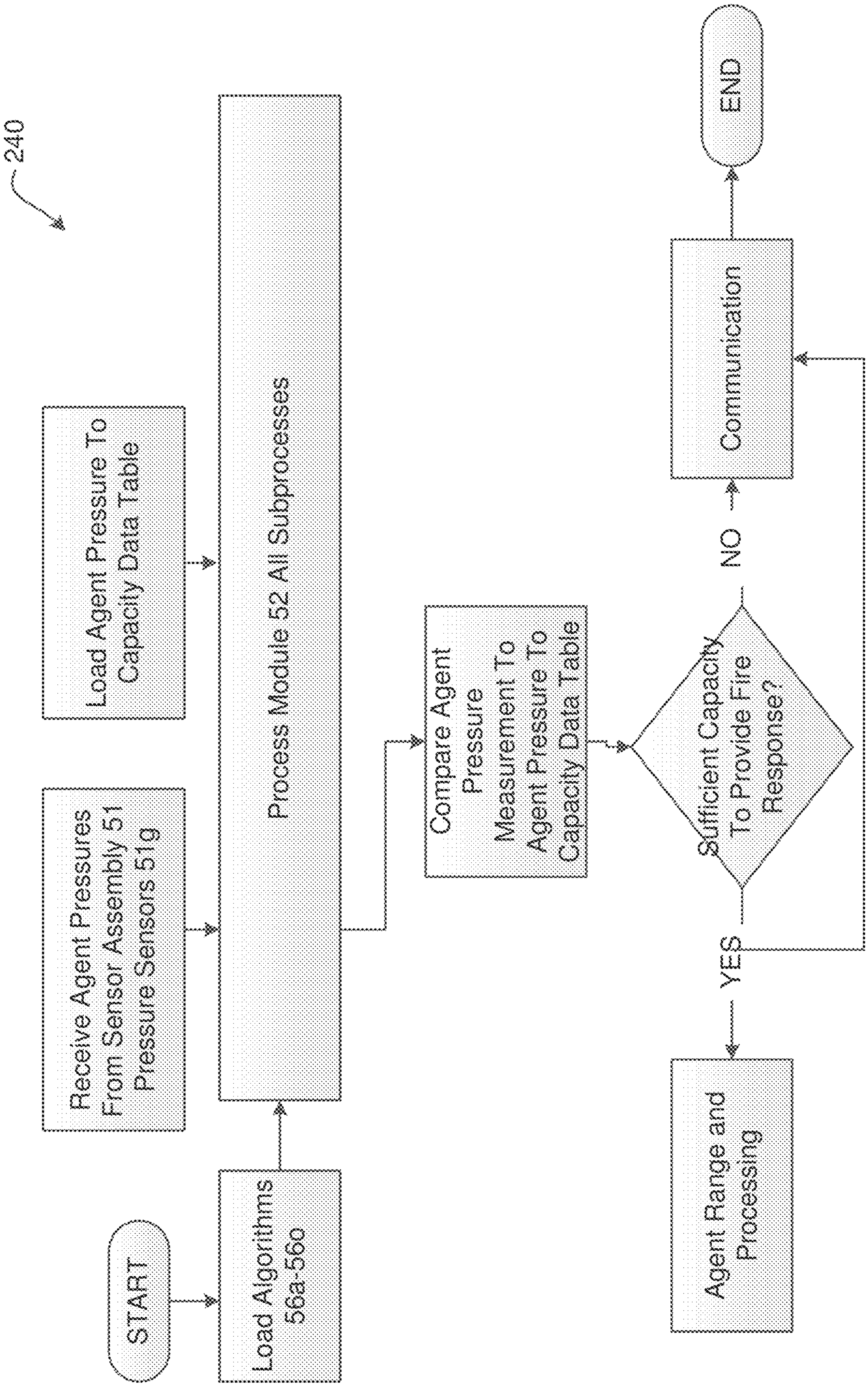
FIG. 24 shows more details of the logic flow of the decision and process functions performed by the processor module during the subprocess for calculating the reserve agent capacity 240.
Figure 25:
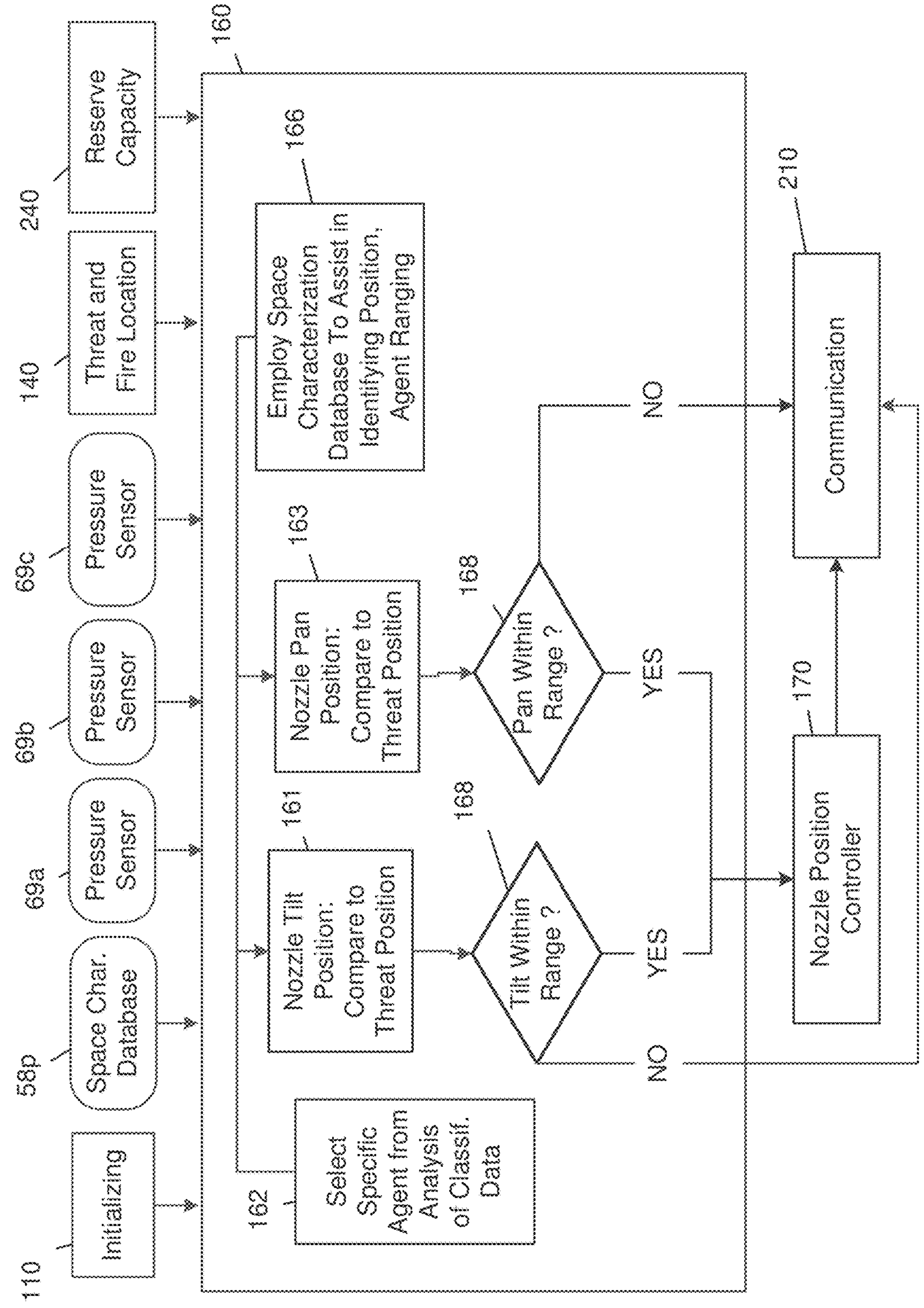
FIG. 25 provides the logic flow of the decision and process functions performed by the processor module during agent selection assessment 160.

FIGS. 23-25—Agent Selection 160

Upon the determination of the location of the threat in the space, the processor module 52 also loads the agent selection subprocess 160 which for purposes of FIG. 23, also includes specific agent selection subprocess 162, reserve agent capacity subprocess 166, and agent range and targeting subprocess 166.

The agent selection process 160 receives input from the threat and fire subprocess, and the threat and fire location subprocess, and other updated data from sensors, to select the specific threat response agent which is applicable to the event. This can also include the pre-emptive application of agent if the threat and fire detection process output has indicated that a threat and or fire event has not yet occurred but is highly probable. The processor module 52 utilizes the specific agent selection process to determine the proper threat response agent to apply to the threat and or class of fire as determined by the threat and fire classification process 150.

The processor module 52 uses inputs from the sensor assembly 51 to determine if there is agent of the type determined by the threat and fire classification algorithm **56*b* to actively respond to the threat and or fire event. If the data from the sensor assembly 51 to the processor module 52 determines that insufficient agent is available to respond to the threat, the processor module 52** notifies the supervisory system.

FIG. 24—Reserve Agent Capacity Calculation Subprocess 240

The reserve agent capacity algorithm **56*o* is processed by the processor module 52 to determine the amount of firefighting agent of the type identified is available to provide a firefighting response and reports this information to the supervisory computer 80. The processor module 52 utilizes information from the pressure sensors 69*a,b,c*** to perform this processing.

FIG. 24 shows a process flow diagram of the functions of the reserve agent capacity subprocess, which is facilitated by the algorithm **56*o*. The processor module 52 loads the subprocess, which is facilitated by the algorithms 56*a*-56*o*. The processor module 52 receives agent pressures from sensor assembly 51 and pressure sensors 51*g*. The processor module 52 loads the agent pressure to capacity data table. The processor module 52 compares the agent pressure measurements of the pressure sensors 51*g* to the agent pressure to capacity data table to determine the agent capacity of the fire bottles 64*a, b, c*. The processor module 52 determines if sufficient agent capacity is available. The processor module 52 provides the capacity to the agent range and processing subprocess, which is facilitated by the algorithm 56*g* and to the communication subprocess, which is facilitated by the algorithm 56*l*. The processor module 52 determines insufficient agent capacity available, and provides this information to the communication subprocess, which is facilitated by the algorithm 56*l***.

FIG. 25—Agent Range Targeting 166

The agent range and targeting algorithm **56*g* is processed by the processor module 52. The agent range and targeting process determines the nozzle position required to place agent on the threat. The agent range and targeting process utilizes information from the reserve agent capacity algorithm 56*o*, and the threat and fire location algorithm 56*c* to determine the pan and tilt positions for the nozzle. The data processed by the processor module 52 for the range of the fire event provided by the agent range and targeting algorithm and provides this information to the nozzle position controller algorithm 56*f* and provides the information to the supervisory computer using the communication algorithm 56*l***.

FIG. 25 illustrates the decision process flow diagram of the functions of the agent range and targeting subprocess 166, which is facilitated by the algorithm **56*g***. The processor employs the agent range and targeting subprocess, and the agent delivery assessment subprocess, to determine how to adjust the nozzle position using the nozzle position controller subprocess.

The processor module 52 employs the agent valve controller subprocess to open and close the agent valves to facilitate moving the nozzle position using the nozzle position controller subprocess 170 to correct for errors in placing the agent onto the threat and or fire. The processor module 52 employs the output from the threat and fire location subprocess 140, the information in the space characterization database process 118, the input from the agent pressure sensors **69*a, b, c* on the fire-fighting bottles 64*a, b, c*, and loads the subprocess, which is facilitated by the algorithms 56*a*-56*o*. The processor module 52 employs this information to determine the nozzle 61** tilt.

If the nozzle tilt required is between 0-90 degrees, the processor module 52 provides the angle of nozzle tilt required to the nozzle position controller subprocess, which is facilitated by the algorithm **56*f* and provides this information to the communication subprocess, which is facilitated by the algorithm 56*l*. If the nozzle tilt is not between 0-90 degrees, the processor module 52 provides this information to the communication subprocess, which is facilitated by the algorithm 56*l*. The processor module 52 employs this information to determine the nozzle pan position. If the nozzle pan position is between 0-340 degrees, the processor module 52 provides the degree of nozzle pan required to the nozzle position controller subprocess, which is facilitated by the algorithm 56*f* and provides this information to the communication subprocess, which is facilitated by the algorithm 56*l*. If the nozzle pan position is not between 0-340 degrees, the processor module 52 provides this information to the communication subprocess, which is facilitated by the algorithm 56*l***.

Figure 26:
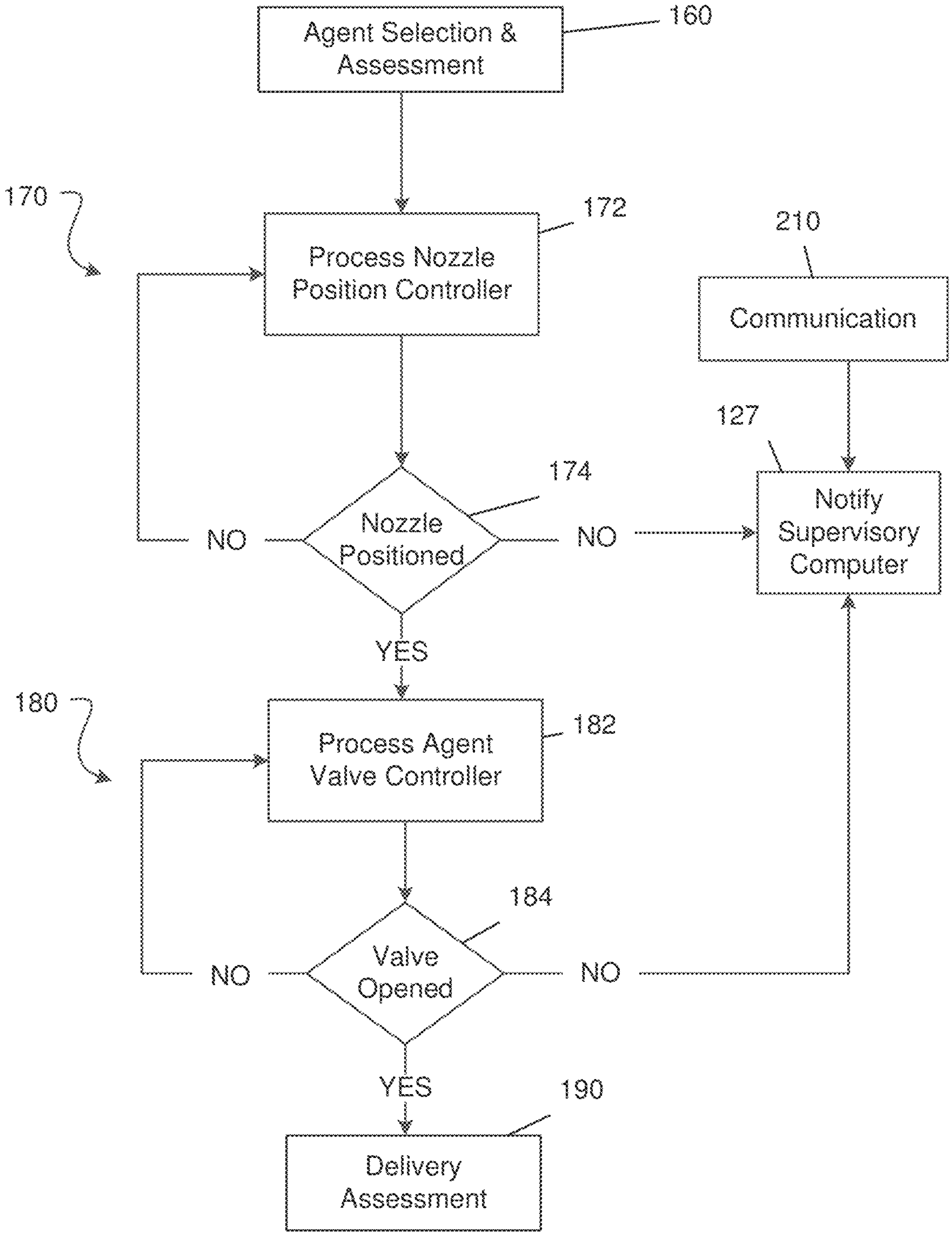
FIG. 26 is a block diagram of an overview of the interactions of the next few steps of the autonomous method shown in FIG. 7, specifically: agent selection 160, nozzle position assessment 170, agent valve controller subprocess 180, delivery assessment 190, and communication 210.
Figure 27:
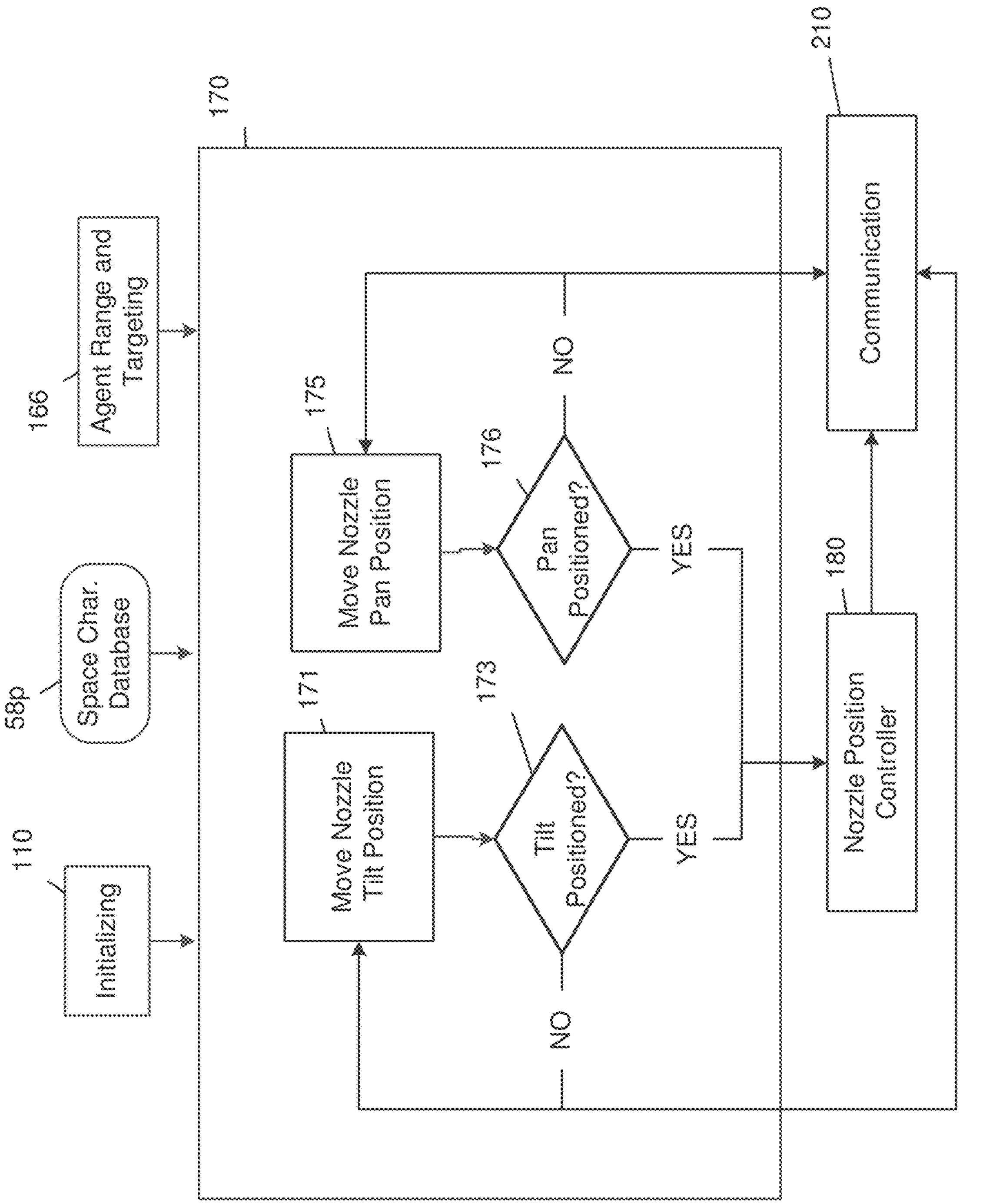
FIG. 27 provides the logic flow of the decision and process functions performed by the processor module during the subprocess for nozzle positioning 170.
Figure 28:
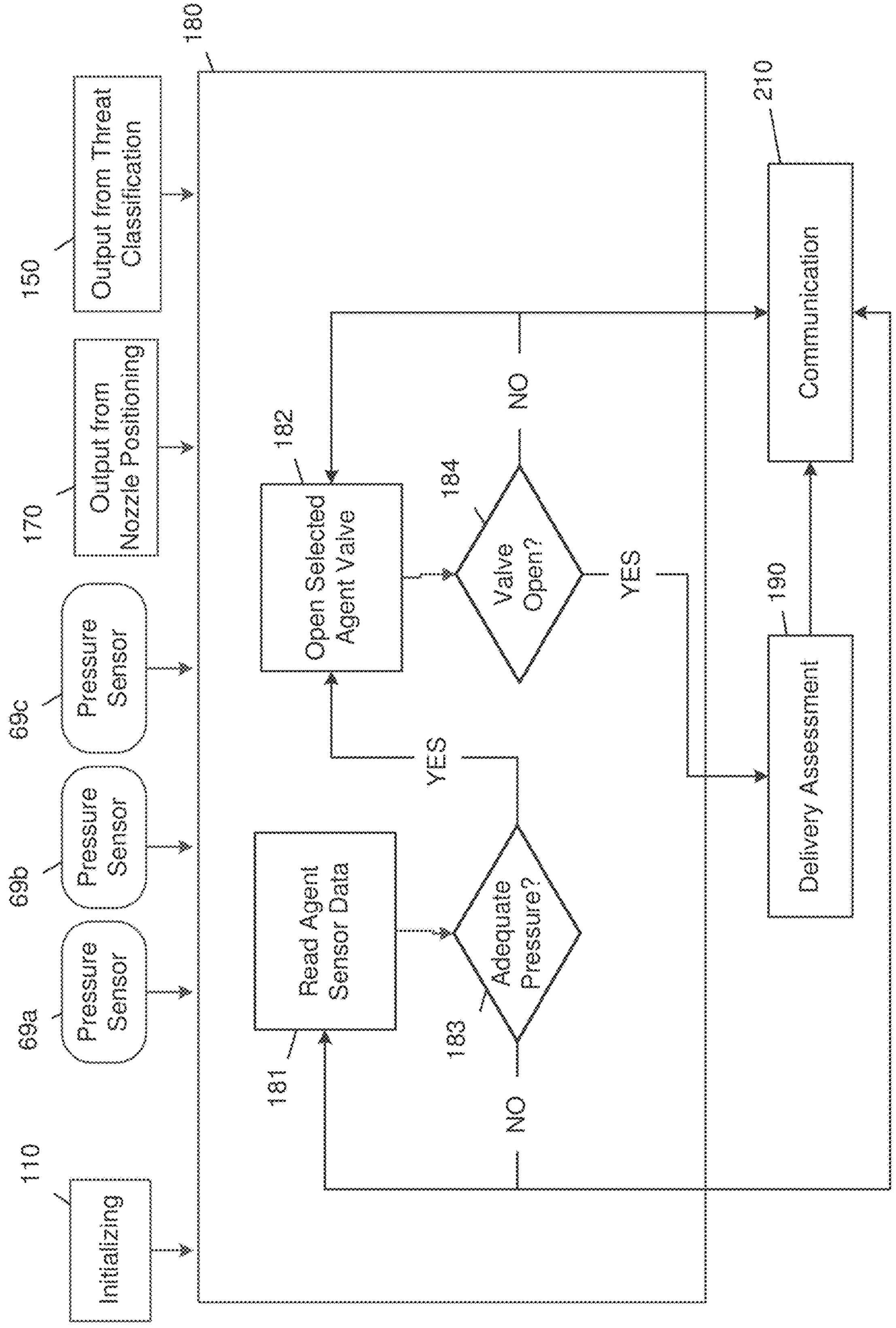
FIG. 28 provides the logic flow of the decision and process functions performed by the processor module during the valve assessment subprocess 180.

FIGS. 26-28—Nozzle & Valve Subprocess 170, 180

Upon the initial selection of an agent to address the threat in the space, the processor module 52 also loads the nozzle position controller subprocess 170, and the agent valve controller subprocess 180. These subprocesses 170, 180, are shown generally in connection with subprocesses agent selection and assessment subprocess 160, and delivery assessment subprocess 190 in FIG. 26.

FIG. 27—Nozzle Position Controller Subprocess 170

FIG. 27 provides the decision process flow diagram of the functions of the nozzle positioning subprocess 170, which is facilitated by the algorithm **56*f*. The nozzle position controller algorithm 56*f* is loaded into the processor module 52, where it is employed by the processor to position the tilt assembly 60, to locate the altitude position of the nozzle assembly 61, and the pan assembly 62 to locate the attitude of the nozzle assembly 61**.

The processor module 52 process loads the subprocess, which is facilitated by the algorithms **56*a*-56*o*, and employs the output from the agent range and targeting subprocess, which is facilitated by the algorithm 56*h* to determine the tilt degree information to send to the nozzle tilt assembly 60, and the pan degree information to send to the nozzle pan assembly 62. Upon the nozzle tilt assembly 60 and the nozzle pan assembly 62 achieving the commanded positions, the processor module 52 provides this information to the agent valve controller subprocess, which is facilitated by the algorithm 56*e*, and to the communication subprocess, which is facilitated by the algorithm 56*l*. If the nozzle tilt assembly 60 does not achieve the commanded position, the processor module 52 provides this information to the communication subprocess, which is facilitated by the algorithm 56L. If the nozzle pan assembly 62 does not achieve the commanded position, the processor module 52 provides this information to the communication subprocess, which is facilitated by the algorithm 56**L.

FIG. 28—Agent Valve Controller 180

FIG. 8 illustrates the decision process flow diagram of the functions of the agent valve controller subprocess, which is facilitated by the algorithm 56*e*. The agent valve controller algorithm 56*e* is processed by the processor module 52, where it is employed by the processor which receives the output of the agent selection algorithm 56*d*, to identify the type of response agent to be employed in addressing the threat and or fire event, and the nozzle position control algorithm 56*f*, which provides information on the status and the positioning of the nozzle. The status of the nozzle, is used by the agent valve controller algorithm 56*e* to determine the open and close scheduling of the agent valves 63, 63*a*, 63*b*, 63*c*.

The processor module 52 loads the subprocess, which is facilitated by the algorithms 56*a*-56*o*. The processor module 52 employs the output from the nozzle positioning subprocess, which is facilitated by the algorithm 56*f* and the output from the threat and fire classification subprocess, which is facilitated by the algorithm 56*b* and the input from the agent pressure sensors 69*a, b, c* to determine the fire agent required for application to the fire and to determine if there is adequate agent capacity in the fire bottles 64*a, b, c*. Processor module 52 determines there is adequate pressure in the required fire agent bottle, and opens the agent valve 63*a, b, or c*. The processor module 52 determines there is insufficient agent in the agent bottle 64*a, b, c*, and provides this information to the communication subprocess, which is facilitated by the algorithm 56*l*. the processor module 52 determines the agent valve is open and provides the information to the success evaluation subprocess, which is facilitated by the algorithm 56*i*, and to the communication subprocess, which is facilitated by the algorithm 56*l*. The processor module 52 determines the agent valve is not open and provides this information to the communication subprocess, which is facilitated by the algorithm 56*l*.

Figure 29:
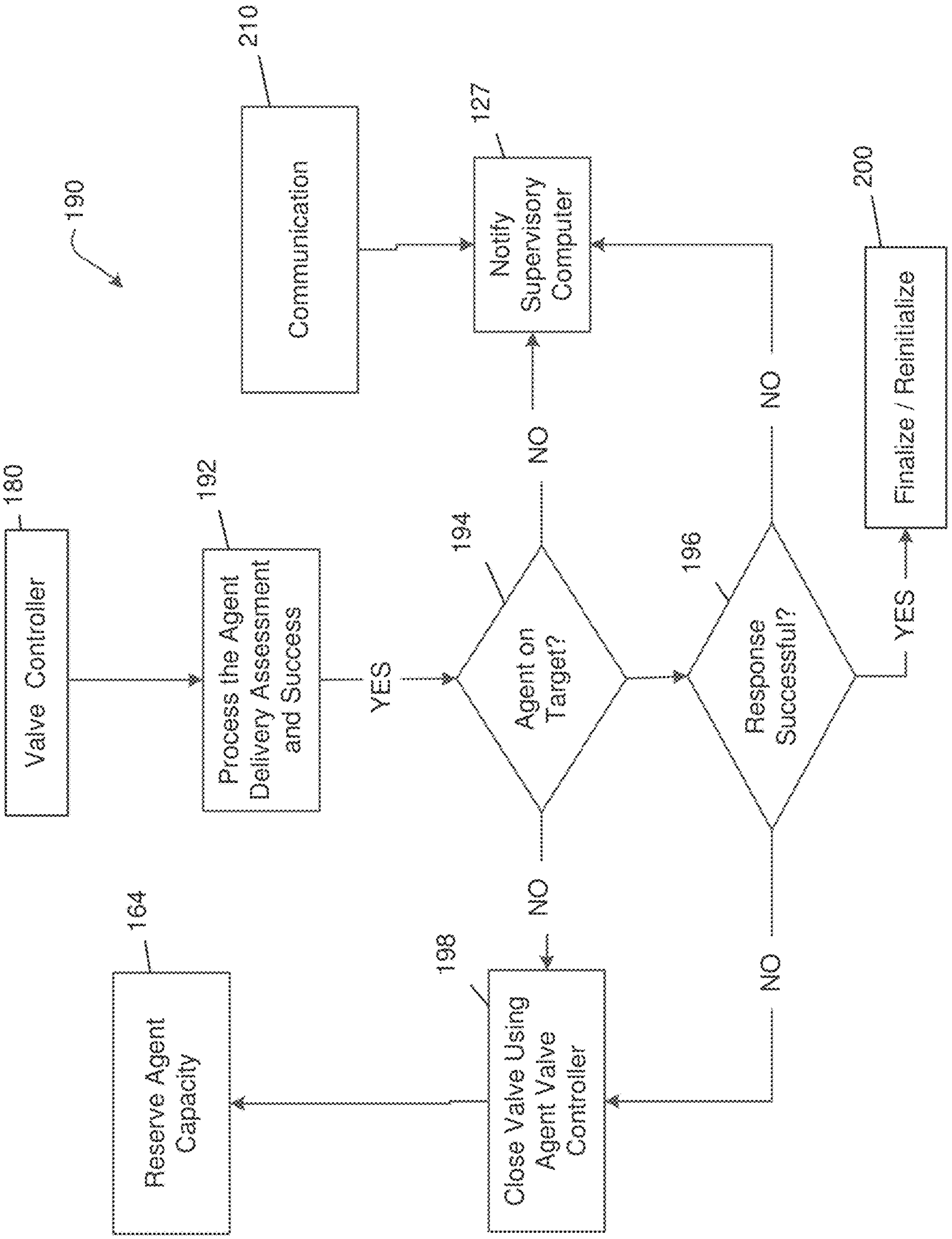
FIG. 29 is a block diagram of an overview of the interactions of the last few steps of the autonomous method shown in FIG. 7, specifically: valve controlling 180, agent delivery assessment 190, reserve agent capacity subprocess 164, communication 210, and finalization 200.
Figure 30:
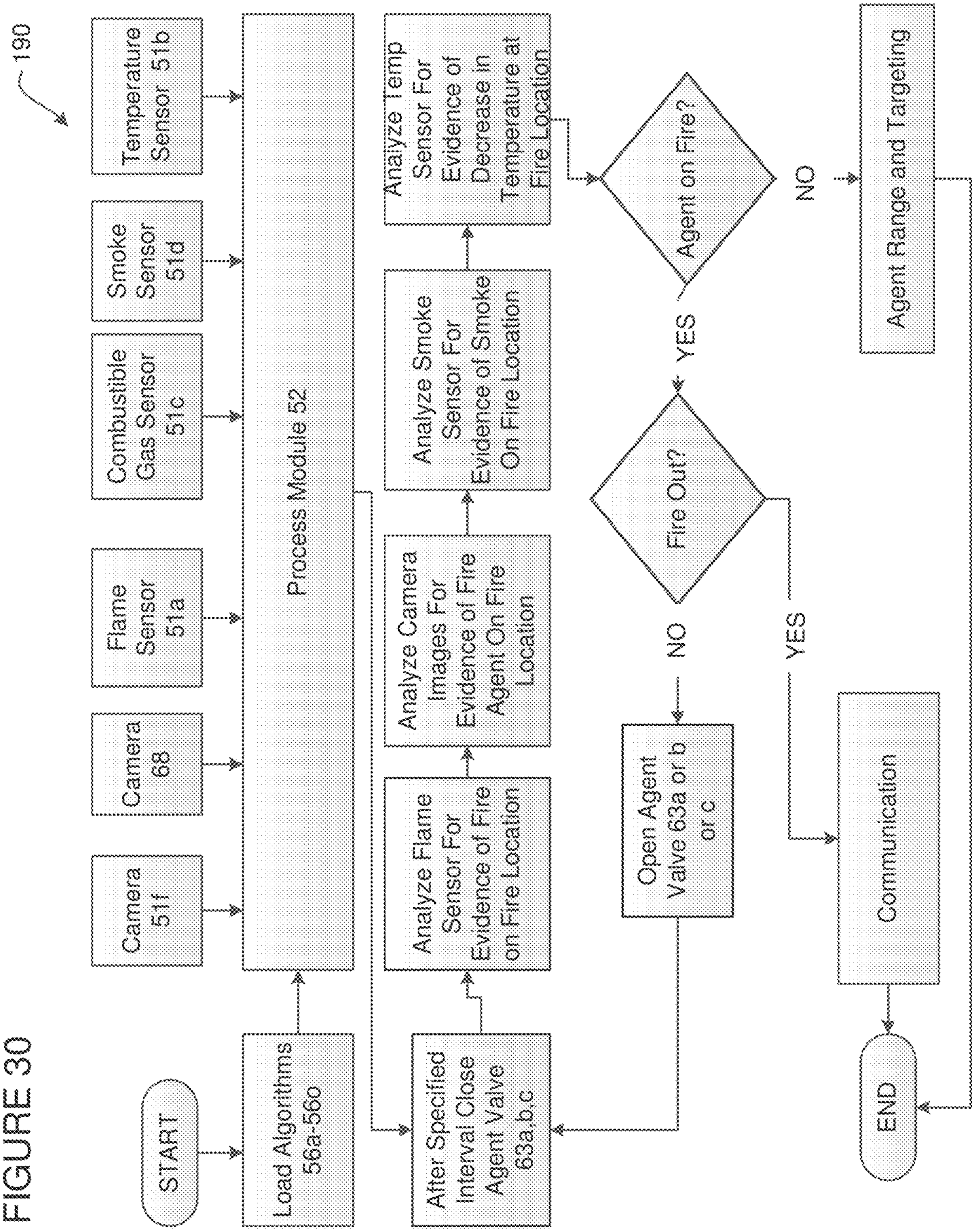
FIG. 30 provides the logic flow of the decision and process functions performed by the processor module during agent delivery assessment 190.

FIGS. 29-30—Agent Delivery Assessment Subprocess 190

Upon the activation of the nozzle and agent valve, the processor module 52 must then determine if the agent was successfully deployed. FIG. 29 is a diagrammatical overview of the interaction between the subprocesses responsible for deploying the agent, 180, the subprocess for assessing the delivery of the agent 190, and the finalization subprocess 200.

The agent delivery assessment algorithm 56*h* is processed by the processor module 52, where it is employed by the processor which receives input from the sensor assembly 51 and the camera 68 to assess the success of the response activity in placing agent onto the threat and or fire.

FIG. 30 provides the decision process flow diagram of the functions of the agent delivery assessment and success subprocess, which is facilitated by the algorithm 56*h*. The processor module 52 loads the subprocess, which is facilitated by the algorithms 56*a*-56*o*. The processor module 52 receives inputs from the camera 51*f*, the camera 68, the flame sensor 51*a*, the combustible gas sensor 51*c*, the smoke sensor 51*d*, and the temperature sensor 51*b*. At a defined tine interval, the processor module 52 commands the agent valve controller 56*e* to close the selected agent valve 63*a, b, c*. The processor module 52 analyzes the input from the flame sensor 51*a* for presence of fire at the fire location. The processor module 52 analyzes the camera 51*f* and camera 68 images for evidence of fire agent on the fire location. The processor module 52 analyzes the smoke sensor 51*d* input for evidence of smoke at the fire location.

The processor module 52 analyzes the temp sensor 51*b* input for evidence of a decrease of temperature at the fire location. The processor module 52 process employs the data to determine if the fire agent is being delivered to the fire location. If the processor module 52 determines agent is not being delivered to the fire location, the processor module 52 provides this information to the agent range and targeting subprocess, which is facilitated by the algorithm 56*h*.

The processor module 52 employs the data to determine if the fire is out. The processor module 52 determines the fire is out and provides this information to the communication subprocess, which is facilitated by the algorithm 56*l*. The processor module 52 determines the fire is not out, and commands the agent valve controller subprocess, which is facilitated by the algorithm 56*e* to open the appropriate agent valve 63*a*, 63*b*, or 63*c*.

Response Success Evaluation Subprocess 196

The response success evaluation subprocess receives inputs from the sensor assembly 51 and the camera 68 to determine if the response action has been successful in eliminating the threat, and or extinguishing the fire event.

The processor module 52 utilizes the agent range and targeting algorithm 56*g* to determine the range from the nozzle 61 to the location of the threat and or fire event. The processor module 52 utilizes the agent range and targeting algorithm 56*g* to determine if the threat event location is within the range. If the processor module 52 determines the threat event is not in range, the processor module 52 utilizes the communication module 55 to notify the supervisory system.

The processor module 52 utilizes the agent range and targeting algorithm 56*g*, and the nozzle position controller algorithm 56*e* to properly position the nozzle 60 using the tilt assembly 60 and the pan assembly 65, to be in position to project agent onto the location of the threat and or fire event.

The processor module 52 utilizes the agent valve controller algorithm 56*e* to open the selected agent valve, 63, 63*a*, 63*b*, 63*c*, as determined by the agent selection algorithm 56*d* once the processor module 52 determines the nozzle 61 is in proper position and has stopped movement.

The processor module 52 utilizes the agent delivery assessment algorithm 56*h* to evaluate the success in delivering agent to the threat and or fire event. In the event the agent delivery assessment algorithm 56*h* determines the agent was not properly delivered to the threat and or fire event, the processor module 52 utilizes the agent valve controller algorithm 56*e* to close the agent valve 63, 63*a*, 63*b*, 63*c*. The processor module 52 utilizes the agent range and targeting algorithm 56*g* to update the proper position for the nozzle 61 and utilizes the nozzle position controller algorithm 56*f* and the tilt assembly 60 and pan assembly 62, to properly reposition the nozzle 61. The processor module 52 utilizes the agent valve controller algorithm 56*e* to open the agent valve 63, 63*a*, 63*b*, 63*c* to provide agent to the nozzle 61.

The processor module 52 utilizes the agent delivery assessment algorithm 56*h*, the agent valve controller algorithm 56*e*, the agent valves 63, 63*a*, 63*b*, 63*c*, the sensor assembly 51, camera 68, and the success evaluation algorithm 56*i* to continuously evaluate the progress in the system response to the threat and/or fire event.

The processor module 52 monitors the agent pressure sensor 69*a*, 69*b*, 69*c* information continuously as the threat response action continues. The processor module 52 also notifies the supervisory system 80 using the communication module 55 if the processor module 52 determines the threat event 5, 6, 7, 8 has not been terminated, and the amount of remaining agent in the agent reservoir bottle is insufficient to continue the threat response action.

The processor module 52 notifies the supervisory system 80 using the communication module 55 if it determines the threat event 5, 6, 7, 8 has been terminated.

LIST OF REFERENCED ELEMENTS

The following reference numbers are adhered to within the specification to refer to those referenced elements within the drawings of the present application.

important equipment 1
irreplaceable equipment 2
food supplies 3
sensitive electrical equipment 4
Threat events 5, 6, 7, 8
ship 10
space 12
preexisting systems 20
preexisting system subcomponents 22, 24, 26
automated system 40
automated subsystems 40'
control module 50
sensor assembly 51
sensors 51*a*-51*g*
all sensor data 51*z*
processor module 52
all processor functions 52*a*
telerobotic position control module 53
agent valve control module 54
agent valve controller 54*a*-54*c*
communication interface module 55
algorithms 56
threat and fire detection algorithm 56*a*
threat and fire classification algorithm 56*b*
threat and fire location algorithm 56*c*
agent selection algorithm 56*d*
agent valve controller algorithm 56*e*
nozzle position controller algorithm 56*f*
agent range and targeting algorithm 56*g*
agent delivery assessment algorithm 56*h*
success evaluation algorithm 56*i*
space characterization algorithm 56*j*
incident response algorithm 56*k*
communication algorithm 56*l*
manual control algorithm 56*m*
threat and fire prediction algorithm 56*n*
reserve agent capacity algorithm 56*o*
space characterization database 58*p*
algorithm database 56*z*
uninterrupted power supply battery 57
tilt assembly 60
nozzle 61
pan assembly 62
agent valves 63*a*, 63*b*, 63*c*
hose assembly 65
control cable assembly 66
manifold 67
camera 68
camera input 68*x*
pressure sensor 69*a*, 69*b*, 69*c*
agent delivery assembly 70
range sensor 71
supervisory computer and operator interface 80
subsystem supervisory computer 80'
method 100
initialize 110
starting 111
loading data 112
determining whether manual control is indicated 114
continuing autonomous function 117
space characterization 118
populating database 118*a*
loading databases 118*b*
anomaly assessment 120
anomaly data received 121
potential of fire reviewed 123
anomaly detection analysis 124
preventative action analysis 125
preventative action initiated 126
notification provided to supervisor 127
threat event assessment 130
processing event data 132
detecting threat analysis 134
threat location 140
analyze ranges 141
processing location data 142
establishing range 143
establishing location 144
incorporating space characterization data 145
threat classification 150
processing classification data 152
analyzing classification data 154
agent selection 160
nozzle tilt position determination 161
selecting specific agent 162
nozzle pan position determination 163
agent range and targeting 166
assessing nozzle delivery range 168
agent positioning 170
move nozzle tilt position 171
positioning nozzle 172
reviewing nozzle tilt position 173
reviewing nozzle position 174
move nozzle pan position 175
reviewing nozzle pan position 176
valve assessment 180
read sensor data 181
open selected agent valve 182
determining adequacy of pressure 183
assessing valve condition 184
delivery assessment 190
review agent delivery data 192
assess agent targeting 194
assess level of success 196
close valve 198
finalize/reinitialize 200
communication 210
loading data 211
loading data message 212
formatting messages 213
loading messages 214
sending messages 215
switching to manual control operation 220
fire prediction 230
reserve agent capacity subprocess 240

CONCLUSION

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims. For example, while the invention has been described with reference to firefighting, the techniques described herein are applicable to applications such as school monitoring, threat assessment, and emergency actions taken.

I claim:

1. A method for autonomously and continuously monitoring and responding to an event within a space, the space having items and firefighting equipment including a first and a second agent delivery assembly, and a control module with a sensor assembly; the method including:

characterizing the space by creating a space characterization profile;

monitoring the space with the sensor assembly, and collecting new sensor data from the sensor assembly for the space;

assessing the new sensor data provided by the sensor assembly;

determining that the event is one of a threat event or a nonthreat event;

initiating a preventative action when the event is determined to be the threat event;

locating the threat event using the new sensor data;

classifying the threat event as an existing fire event using the new sensor data;

selecting one of the first agent delivery assembly and the second agent delivery assembly based on an assessment of the space characterization profile, a first location of the first agent delivery assembly, a second location of the second agent delivery assembly, and the classification of the existing fire event;

receiving further data from sensor assembly;

assessing the further data from the sensor assembly to determine whether the threat event has concluded;

initiating further preventative action if the threat event is determined to be ongoing; and discontinuing preventative action if the threat event is determined to be concluded; and wherein the step of characterizing the space further comprising:

obtaining an item data set containing data regarding the sensitivity of items, and a potential threat presented by items within the space;

populating an item database with the item data set;

obtaining a firefighting equipment data set containing data regarding the firefighting equipment within the space:

populating a firefighting equipment database with the firefighting equipment data set:

obtaining a variable data set containing data regarding variables within the space which alter according to a time of day and an operational tempo;

populating a variable with the variable data set;

obtaining a tolerance data set containing data of predetermined tolerance levels;

populating a tolerance level database with predetermined tolerance levels; and creating a standard space characterization profile from each of the item database, the firefighting equipment database, the variable database, and the tolerance database.

2. The method of claim 1, wherein the steps of assessing the new sensor data, and initiating the preventative action, further comprising:

assessing the new sensor data provided by the sensor assembly by comparing the space characterization profile with the new sensor data; comparing a degree of difference between the space characterization profile and the new sensor data with the predetermined tolerance level; and initiating preventative action if the degree of difference is greater than the predetermined tolerance level.

3. The method of claim 1, wherein the step of assessing the new sensor data further comprising:

continuously analyzing the data by evaluating the data received to detect deviance from the space characterization profile;

continually providing a probability of a hazardous activity based on the space characterization profile;

continuously providing a hazard probability assessment by evaluating the potential deviance between the new sensor data from the space characterization profile with respect to the probability of that hazardous activity;

providing an assessment of a preferred incident response action by determining the best courses of response for any deviance detected.

4. The method of claim 1, wherein the step of locating the threat event further comprising comparing the location of the existing fire event with the first location of the first agent delivery assembly and the second location of the second agent delivery assembly.

5. A method for autonomously and continuously monitoring and responding to an event within a space, the space having items and firefighting equipment including a first and a second agent delivery assembly, and a control module with a sensor assembly; the method including:

characterizing the space by creating a space characterization profile;

monitoring the space with the sensor assembly, and collecting new sensor data from the sensor assembly for the space;

assessing the new sensor data provided by the sensor assembly;

determining that the event is one of a threat event or a nonthreat event;

initiating a preventative action when the event is determined to be the threat event;

locating the threat event using the new sensor data;

classifying the threat event as an existing fire event using the new sensor data;

selecting one of the first agent delivery assembly and the second agent delivery assembly based on an assessment of the space characterization profile, a first location of the first agent delivery assembly, a second location of the second agent delivery assembly, and the classification of the existing fire event;

receiving further data from sensor assembly;

assessing the further data from the sensor assembly to determine whether the threat event has concluded;

initiating further preventative action if the threat event is determined to be ongoing; and discontinuing preventative action if the threat event is determined to be concluded;

wherein the step of characterizing the space further comprising creating a space characterization profile; and obtaining a tolerance data set containing data of predetermined tolerance levels and populating a tolerance level database with predetermined tolerance levels, wherein the steps of assessing the new sensor data, and initiating the preventative action further include assessing the new sensor data provided by the sensor assembly by comparing the space characterization profile with the new sensor data; comparing a degree of difference between the space characterization profile and the new sensor data with the predetermined tolerance level; and initiating the preventative action if the degree of difference is greater than the predetermined tolerance level.

* * * * *